(12) United States Patent
Togino et al.

(10) Patent No.: US 6,208,468 B1
(45) Date of Patent: Mar. 27, 2001

(54) IMAGE-FORMING OPTICAL SYSTEM AND APPARATUS USING THE SAME

(75) Inventors: Takayoshi Togino, Koganei; Tsutomu Uzawa, Hidaka, both of (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/225,306

(22) Filed: Jan. 5, 1999

Related U.S. Application Data

(63) Continuation of application No. 08/872,551, filed on Jun. 10, 1997, now abandoned.

(30) Foreign Application Priority Data

| Jun. 11, 1996 | (JP) | 8-148929 |
| Jun. 18, 1996 | (JP) | 8-156892 |
| Jun. 27, 1996 | (JP) | 8-167148 |

(51) Int. Cl.[7] .................................................. G02B 27/14
(52) U.S. Cl. ..................... 359/637; 359/631; 359/720; 250/494.1; 353/70; 396/352; 396/382
(58) Field of Search ..................... 359/618, 629, 359/631, 637, 630, 676, 634, 720; 250/494.1; 353/70; 396/352, 382

(56) References Cited

U.S. PATENT DOCUMENTS

| 3,583,790 | * | 6/1971 | Baker | 359/676 |
| 3,810,221 | | 5/1974 | Plummer | 396/382 |
| 3,836,931 | | 9/1974 | Plummer | 396/352 |
| 4,650,292 | * | 3/1987 | Baker et al. | 359/676 |
| 5,274,406 | | 12/1993 | Tejima et al. | 353/70 |
| 5,594,588 | * | 1/1997 | Togino | 359/631 |
| 5,706,136 | | 1/1998 | Okuyama et al. | 359/630 |
| 5,875,056 | * | 2/1999 | Takahashi | 359/637 |
| 5,917,656 | * | 6/1999 | Hayakawa et al. | 359/637 |

FOREIGN PATENT DOCUMENTS

| 722 106 | 7/1996 | (EP) . |
| 59-84201 | 5/1984 | (JP) . |
| 62-144127 | 6/1987 | (JP) . |
| 62-205546 | 9/1987 | (JP) . |
| 62-205547 | 9/1987 | (JP) . |
| 6-231466 | 8/1994 | (JP) . |

\* cited by examiner

*Primary Examiner*—Loha Ben
(74) *Attorney, Agent, or Firm*—Pillsbury Winthrop LLP

(57) ABSTRACT

A distortion-free and compact image-forming optical system with a minimal number of optical components which provides a wide image area and which is favorably corrected for ray aberrations and arranged in a compact structure by folding an optical path. A pentagonal prism member (5) has a first surface (1), a second surface (2), a third surface (3), and a fourth surface (4). The first surface (1) and the fourth surface (4) are refracting surfaces. The second surface (2) and the third surface (3) are reflecting surfaces. The first surface (1) is formed from a spherical surface. The second surface (2), the third surface (3) and the fourth surface (4) are formed from three-dimensional surfaces. Light rays from an object plane O provided on the back side of a cover glass (6) pass through the cover glass (6) and enter the prism member (5) through the first surface (1). The incident light rays are reflected successively by the second surface (2) and the third surface (3). The reflected light rays intersect the light rays traveling from the first surface (1) to the second surface (2) and then exit from the, prism member (5) through the fourth surface 4 to reach an image plane I. Each of the three-dimensional surfaces (2) to (4) is a plane-symmetry three-dimensional surface which has no axis of rotational symmetry in nor out of the surface and which has only one plane of symmetry.

36 Claims, 19 Drawing Sheets

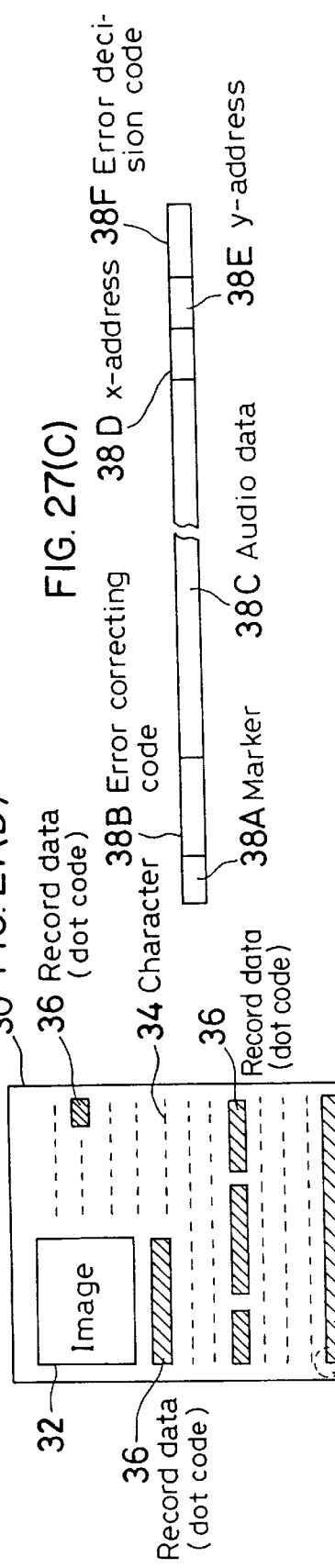
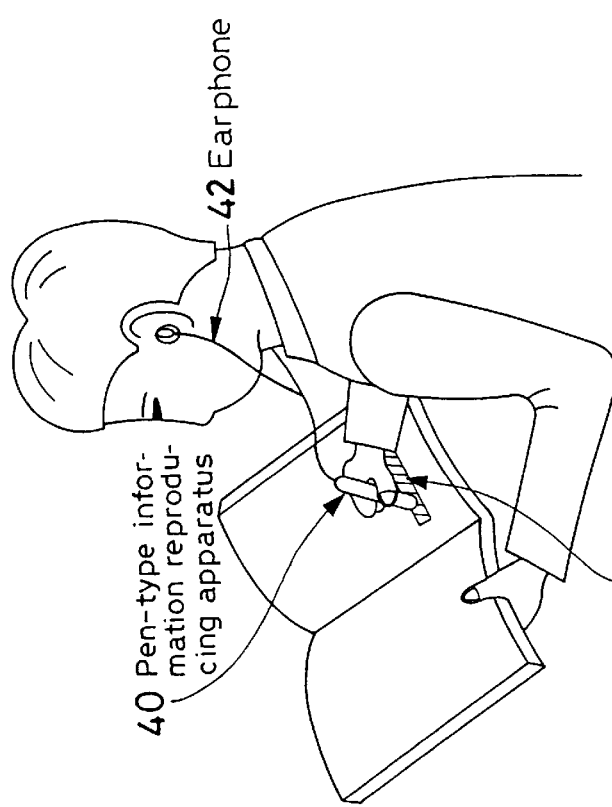
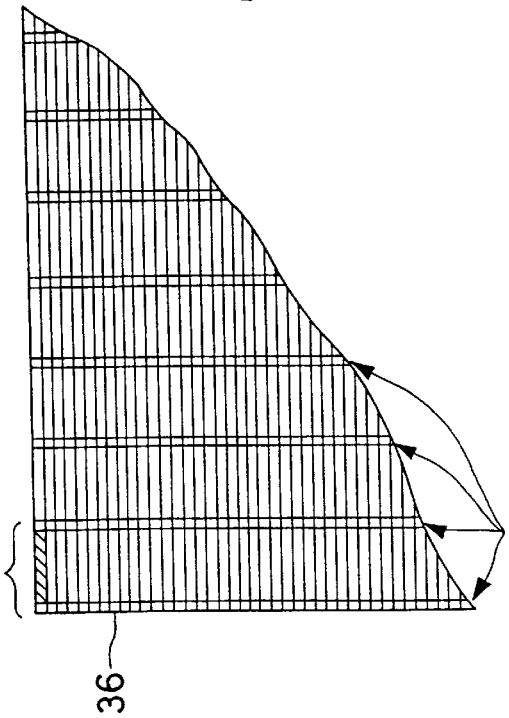
FIG. 27(A)
FIG. 27(B)
FIG. 27(C)
FIG. 27(D)

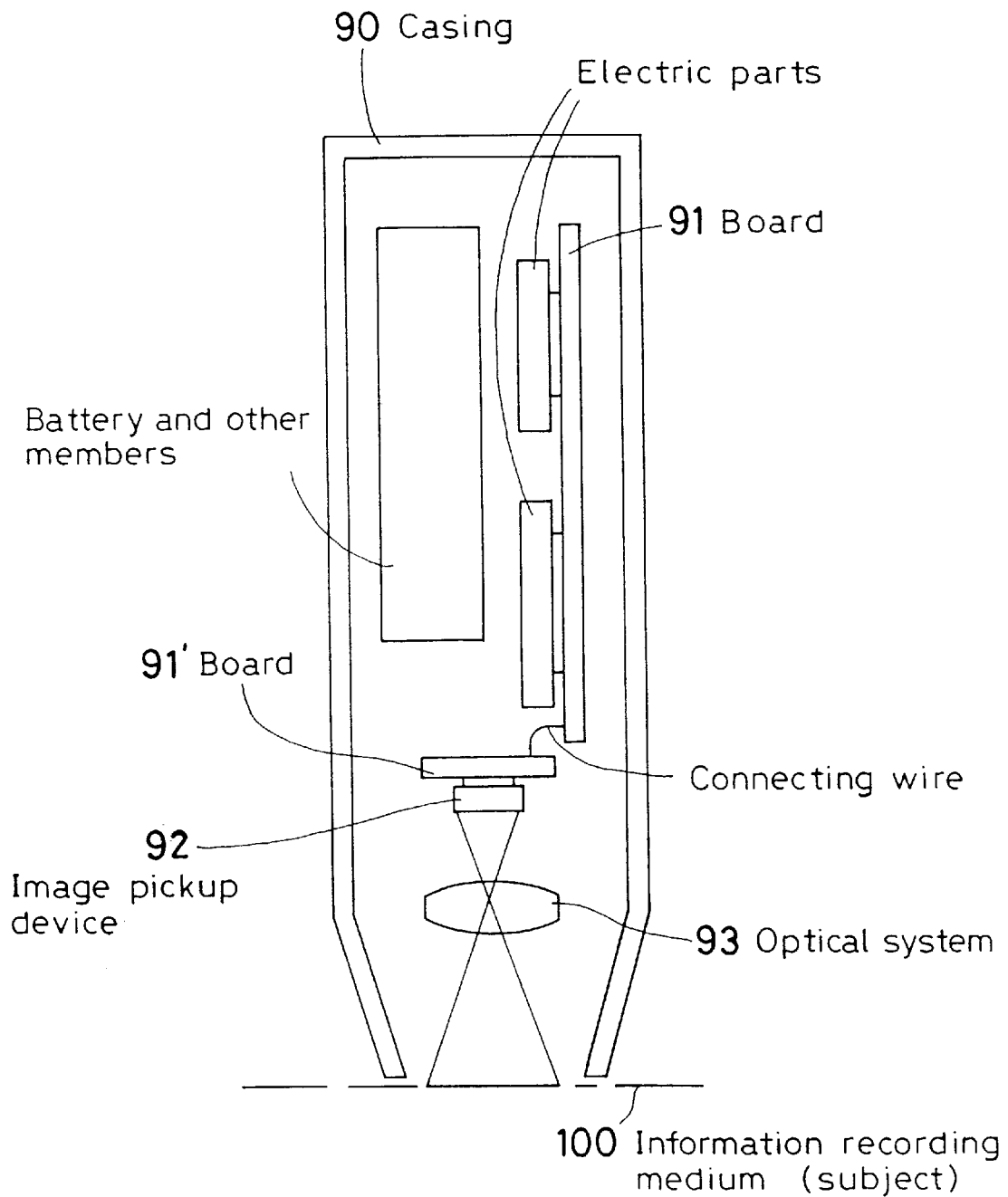

US 6,208,468 B1

IMAGE-FORMING OPTICAL SYSTEM AND APPARATUS USING THE SAME

This is a continuation of application Ser. No. 08/872,551, filed Jun. 10, 1997, now abandoned.

BACKGROUND OF THE INVENTION

The present invention relates to an image-forming optical system and, more particularly, to a compact reflecting decentered image-forming optical system. The present invention also relates to an image read apparatus using such an image-forming optical system. More particularly, the present invention relates to an image read apparatus used to enable an image pickup apparatus to image an information recording medium, e.g. a sheet of paper, a resin film, or a metal sheet, which contains the record of optically readably encoded multimedia information. The present invention also relates to an information reproducing system using the image read apparatus.

There has heretofore been known a compact reflecting decentered optical system as disclosed in Japanese Patent Application Unexamined Publication Number [hereinafter referred to as "JP(A)"] 59-84201. This is an invention of a one-dimensional light-receiving lens comprising a cylindrical reflecting surface; therefore, two-dimensional imaging cannot be effected with this conventional optical system. JP(A) 62-144127 discloses an optical system wherein the identical cylindrical surface is used twice to effect reflection in order to reduce spherical aberration in the above-mentioned invention.

JP(A) 62-205547 discloses the use of an aspherical reflecting surface as a reflecting surface, but makes no mention of the configuration of the reflecting surface. U.S. Pat. Nos. 3,810,221 and 3,836,931 both disclose an example in which a rotationally symmetric aspherical mirror and a lens system having a surface which has only one plane of symmetry are used to constitute a finder optical system of a reflex camera. In this example, however, the surface having only one plane of symmetry is utilized for the purpose of correcting the tilt of a virtual image for observation.

JP(A) 1-257834 (U.S. Pat. No. 5,274,406) discloses an example in which a surface having only one plane of symmetry is used for a reflecting mirror to correct image distortion in a rear projection type television. In this example, however, a projection lens system is used for projection onto a screen, and the surface having only one plane of symmetry is used for correction of image distortion.

JP(A) 7-333551 discloses an example of a back-coated mirror type decentered optical system using an anamorphic surface and a toric surface as an observation optical system. However, the decentered optical system is not sufficiently corrected for aberrations, including image distortion.

None of the above-described prior arts use a surface having only one plane of symmetry as a back-coated mirror to form a folded optical path.

Incidentally, as mediums for recording audio information such as speech and music, various mediums are known in addition to magnetic tapes and optical disks. However, the unit costs of these mediums are high to some extent even when they are mass-replicated. Moreover, the audio information recording mediums require some space for storage. To hand a speech-recorded medium to a person in a remote place, someone will take it with him or her, or the medium will be mailed. Accordingly, it takes some time for the medium to reach the person in the remote place. The same is true of information other than audio information, for example, image information obtained from cameras, video equipment, etc., and digital code data obtained from personal computers, word processors, etc.

In view of these circumstances, the present applicant has proposed an information processing system in JP(A) 6-231466. According to the information processing system, multimedia information, e.g. audio information such as speech or music, image information obtained from a camera, video equipment, etc., or digital code data obtained from a personal computer, a word processor, etc., is recorded on a resin film, a metal sheet or the like in the form of optically readable code information (image), e.g. an encoded dot pattern. To read the information recording medium having the multimedia information recorded thereon, illuminating light is applied to the dot pattern, and the reflected light from the dot pattern is read and processed by using an optical device, thereby reproducing the recorded multimedia information.

In the information processing system, multimedia information is recorded on a sheet of paper, which is considered to be the most economical medium, or a sheet-shaped medium that is equivalent to it. The use of such sheet-shaped mediums is considerably useful for achieving low-cost and space-saving mediums. Information that is recorded in the form of dot patterns can be readily transmitted by facsimile. Thus, information can be readily transferred to a person residing in a remote place. This is particularly significant for speech information. That is, the information processing system enables the exchange of speech information, which has heretofore been made by the delivery of a medium itself, to be carried out instantaneously and easily with a person residing in a distant place by facsimile.

However, the conventional technology suffers from problems as stated below. To construct a distortion-free image-forming optical system having a wide field angle and satisfactorily corrected for aberrations, if a rotationally symmetric optical system is used, the number of lens constituent elements becomes undesirably large, and the resulting optical system inevitably becomes large in size and costly.

Incidentally, JP(A) 6-231466 shows a pen-type information reproducing apparatus as a form of information reproducing apparatus [for example, see FIG. 41(B) of the publication].

However, the pen-type information reproducing apparatus suffers from some problems. The first problem is concerned with mounting of electric boards. Regarding the layout (mounting) of the interior of an information reproducing apparatus, it is preferable from the viewpoint of minimizing the number of boards that, as shown in FIG. 31, electric boards 91 and 91' equipped with an image processing unit, a data processing unit, an image pickup device 92, etc. should be disposed in the longitudinal direction of the pen and approximately parallel to a casing 90. In this case, however, the image pickup device 92 is disposed approximately perpendicular to the electric board 91 under the necessity of lying face-to-face with an information recording medium 100. Therefore, it is difficult to make the boards 91 and 91' common to each other. This gives rise to problems in terms of mounting efficiency and cost. It is possible to bend the optical path by adding optical members, e.g. mirrors, to an optical system 93 shown in FIG. 31. In this case, however, the number of constituent members of the optical system increases, and thus the cost increases. Moreover, the lens frame arrangement becomes complicated. Therefore, such an approach is unfavorable.

To construct a distortion-free optical system having a wide field angle and satisfactorily corrected for aberrations as an optical system for an image read apparatus, if a rotationally symmetric optical system is used, the number of lens constituent elements becomes undesirably large, and the resulting optical system inevitably becomes large in size and costly.

Another problem is concerned with mounting of an illumination system. When an illumination system is constructed by using a light source, e.g. an LED, to illuminate an information recording medium, illumination nonuniformity is likely to occur because it is necessary to dispose the illumination system in such a manner as to avoid a mechanical interference with a photographic optical system.

This problem arises from the fact that the arrangement of the optical system has an unfavorably low degree of freedom with regard to mounting. Therefore, the same problem may arise not only in pen-type information reproducing apparatuses but also in other forms of information reproducing systems.

SUMMARY OF THE INVENTION

In view of the problems associated with the conventional techniques, an object of the present invention is to provide a distortion-free and compact image-forming optical system with a minimal number of optical components which provides a wide image area and which is favorably corrected for ray aberrations and arranged in a compact structure by folding an optical path.

Another object of the present invention is to provide an image read apparatus using a compact optical system with a minimal number of components which provides a wide image area and which is arranged to have a minimal image distortion and made compact,by bending an optical path.

Still another object of the present invention is to provide an image read apparatus which has a high degree of mounting freedom despite a simple arrangement and is useful for achieving a reduction in the size of the apparatus, and to provide an information reproducing system that uses the image read apparatus.

A further object of the present invention is to provide an image pickup apparatus and an information reproducing apparatus, which use a compact optical system with a minimal number of components which provides a wide image area and is arranged to have a minimal image distortion and made compact by bending an optical path.

A still further object of the present invention is to provide an optical system which has a high degree of mounting freedom despite a simple arrangement and which is useful for achieving a reduction in the size of an apparatus incorporating it, and to provide an apparatus that uses the optical system.

To attain the above-described objects, the present invention provides an image-forming optical system having at least a decentered optical system to image light from an object on a surface of an image pickup device. The image-forming optical system has at least one reflecting surface having a reflecting action, and the surface configuration of the at least one reflecting surface is a plane-symmetry three-dimensional surface which has no axis of rotational symmetry in nor out of the surface and which has only one plane of symmetry.

Assuming that a Z-axis is an optical axis defined by a straight line along which an axial principal ray passing through the center of a pupil of the image-forming optical system from the object side thereof and reaching the center of the image-formation position of the image pickup device travels until it intersects the first surface of the image-forming optical system, and that an axis perpendicularly intersecting the Z-axis in the decentration plane of each surface constituting the image-forming optical system is defined as a Y-axis, and further that an axis perpendicularly intersecting both the Z- and Y-axes is defined as an X-axis, it is desirable for the above-described reflecting surface to satisfy at least one of the following conditions (A-1) and (B-1):

$$|RX|<0.5 \text{ (1/millimeter)} \tag{A-1}$$

$$|RY|<0.5 \text{ (1/millimeter)} \tag{B-1}$$

where RX and RY are curvatures in the directions X and Y, respectively, of a portion of the reflecting surface which is struck by the axial principal ray.

To attain the above-described objects, the present invention provides an image read apparatus that optically reads an optically readable dot code from a recording medium having a portion where multimedia information, including at least one of audio information, image information and digital code data has been recorded in the form of an optically readable dot code. The image read apparatus has a read optical system and an image pickup device. The read optical system has at least one reflecting surface having a reflecting action, and the surface configuration of the reflecting surface is a rotationally asymmetric curved surface which has no axis of rotational symmetry in nor out of the surface. The image pickup device is placed in an image-formation plane where an image of an object plane is formed by the read optical system.

In this case, it is desirable that the surface configuration of the reflecting surface should be a plane-symmetry three-dimensional surface having only one plane of symmetry.

To attain the above-described objects, the present invention provides an image pickup apparatus which has an aperture; an image-forming optical system that images a bundle of light rays entering through the aperture; and an image pickup device disposed at or near a position where the bundle of light rays is imaged by the image-forming optical system. The image-forming optical system has at least one reflecting surface of a non-rotationally symmetric surface configuration having no axis of rotational symmetry in nor out of the surface. Assuming that a light ray emanating from the object center and passing through the center of the aperture to reach the center of the image pickup device is defined as an axial principal ray, and that a Z-axis is taken in the direction of the axial principal ray emanating from the object center and reaching the aperture center, and further that a Y-axis is taken in a direction perpendicular to the Z-axis in a plane containing a folded line segment along which the axial principal ray is reflected by the reflecting surface, and further that an X-axis is taken in a direction perpendicular to both the Z- and Y-axes, the at least one reflecting surface of the image-forming optical system satisfies the following condition:

$$1<CX2/CY2<5 \tag{10-1}$$

where, assuming that the direction of the Y-axis is the vertical direction, CX2 is the curvature of an equation that defines the configuration of the reflecting surface at a portion of the reflecting surface where the axial principal ray intersects the reflecting surface, in a plane containing a line normal to the surface and the X-axis, which corresponds to a direction perpendicular to the decentering direction of the surface, and CY2 is the curvature at that portion of the reflecting surface in a plane containing the line normal to the surface and the Y-axis, which corresponds to the decentering direction.

Another image pickup apparatus according to the present invention has an aperture; an image-forming optical system that images a bundle of light rays entering through the aperture; and an image pickup device disposed at or near a position where the bundle of light rays is imaged by the image-forming optical system. The image-forming optical system has a folded optical path formed from at least two reflecting surfaces. At least one of the at least two reflecting surfaces has a non-rotationally symmetric surface configuration having no axis of rotational symmetry in nor out of the surface.

Still another image pickup apparatus according to the present invention has a light source for applying light to digital code data to read it; an aperture; an image-forming optical system that images a bundle of light rays from the digital code data entering through the aperture; an image pickup device disposed at or near a position where the bundle of light rays is imaged by the image-forming optical system; a data processing unit that converts information concerning the digital code data optically captured by the image pickup device into reproduced information; and a reproducing device that displays the reproduced information obtained by the data processing unit. The image-forming optical system is adapted for information reproduction and has a folded optical path formed from at least two reflecting surfaces. At least one of the at least two reflecting surfaces has a non-rotationally symmetric surface configuration having no axis of rotational symmetry in nor out of the surface.

The reasons for adopting the above-described arrangements in the present invention, together with the functions thereof, will be explained below.

The reason why the first image-forming optical system according to the present invention uses a surface having only one plane of symmetry (hereinafter referred to as "TFC surface") will be explained below in detail.

According to the present invention, the read optical system has at least one reflecting surface having a reflecting action, and the surface configuration of the reflecting surface is a rotationally asymmetric curved surface which has no axis of rotational symmetry in nor out of the surface. With this arrangement, the optical path can be effectively folded, and the size of the optical system can be favorably reduced. By forming the reflecting surface from a rotationally asymmetric surface, aberrations produced by the folded optical path are corrected by the surface itself. Thus, the optical performance of the optical system can be improved. Accordingly, it is possible to provide a compact image read apparatus with a simple arrangement and an information reproducing system using the image read apparatus.

The information reproducing system according to the present invention uses the above-described image read apparatus (image read device) to optically read a dot code from a recording medium having a portion where multimedia information, including at least one of audio information, image information and digital code data, has been recorded in the form of an optically readable dot code. The read dot code is converted into the original multimedia information by a reconstructing device, and the reconstructed multimedia information is outputted by an output device.

The reason why the image-forming optical system according to the first aspect of the present invention uses a surface having only one plane of symmetry (the surface will be hereinafter referred to as "TFC surface) will be explained below in detail.

First, a coordinate system used in the following description will be explained.

The coordinate system is defined as follows: A Z-axis is taken in the direction of an optical axis defined by a straight line along which a principal ray passing through the center of the pupil of a decentered optical system from the object side thereof and reaching the image center travels until it intersects the first surface of the decentered optical system. A Y-axis is taken in a direction perpendicularly intersecting the Z-axis in the decentration plane of each surface constituting the decentered optical system. An X-axis is taken in a direction perpendicularly intersecting both the optical axis, which is defined as the Z-axis, and the Y-axis.

Ray tracing will be described by forward ray tracing in which light rays are traced from the pupil position toward the image-formation position.

Let us make a general survey of conventional aberration correcting techniques.

(1) In general, rotationally symmetric optical systems use aspherical surfaces to favorably effect aberration correction with a minimal number of surfaces. Reflecting optical systems also use rotationally symmetric aspherical surfaces, e.g. paraboloids, to prevent occurrence of spherical aberration which would otherwise be produced by a spherical reflecting mirror. In other words, it is a well-known fact that rotationally symmetric optical systems use rotationally symmetric aspherical surfaces.

(2) It is also a well-known fact that spherical aberration can be reduced by using a back-coated reflecting mirror such as a Mangin mirror (A. Mangin, 1876).

The focal length f of a back-coated reflecting mirror is expressed by $$f = -r/2n$$

where r is the radius of curvature of the back-coated reflecting mirror, and n is the refractive index of the medium.

Thus, when a back-coated reflecting mirror and a surface-coated reflecting mirror are compared with each other in terms of the radius of curvature required to obtain the same focal length f, a back-coated reflecting mirror formed from a glass material having a refractive index of 1.5, for example, may have a curvature radius 1.5 times as large as that of a surface-coated reflecting mirror. Therefore, the amount of aberration produced by the back-coated reflecting mirror is corresponding smaller than in the case of the surface-coated reflecting mirror.

(3) Meanwhile, a decentered concave mirror produces astigmatism even on the axis because the focus positions of rays in the Y- and X-axis directions at a portion of the reflecting mirror that is struck by the rays are displaced relative to each other owing to the decentration.

To prevent the occurrence of axial astigmatism, an anamorphic surface or a toric surface, which has different curvatures for different directions, is used as stated in Japanese Patent Application Numbers [hereinafter referred to as "JP(B)"] 6-211067 and 6-256676, filed by the present applicant.

(4) Next, curvature of field will be explained. It is stated in detail in JP(B) 5-264828, filed by the present applicant, that an arrangement including a concave mirror and a convex mirror produces favorable effects upon the correction of field curvature. Aberrations produced by a tilted concave mirror are described, for example, in JP(B) 6-127453. JP(B) 6-256676 succeeds in favorably correcting field curvature by using two concave mirrors.

(5) Regarding image distortion, favorable results of aberration correction are obtained by using a surface arranged to vary in curvature according to the sign (positive or negative) of the X- and Y-axis directions as stated in JP(A) 5-303056. JP(A) 1-257834 uses in a rear projection television a Fresnel reflecting surface similar to a TFC surface used in the present invention, although the use application of this publication differs from that of the present invention. The Fresnel reflecting surface is used in an arrangement wherein a real image is projected onto a screen through a projection optical system. The image to be projected is reflected by the reflecting surface, and at this time, only a trapezoidal image distortion is corrected. Trapezoidal and bow-shaped image distortions produced by tilted concave mirrors are described in JP(A) 5-303056.

None of the above-described inventions make attempts to correct aberrations and to thereby obtain a satisfactory aberration correcting performance required for an image pickup optical system or an image-forming optical system by using an optical system with a folded optical path and combining the above-described arrangements.

Regarding aberrations produced by a rotationally symmetric optical system, the behavior of light rays entering the lens changes according to only the height from the optical axis, which is the axis of rotation, and this causes aberrations to occur. The question is how to correct these aberrations. In a decentered optical system, however, the height and position at which light rays impinge on the surface vary to a considerable extent in the vertical direction of the surface, which is the decentering direction. That is, although they have no rotational symmetry, cylindrical surfaces, toric surfaces, and anamorphic surfaces, which are based on rotationally symmetric spherical surfaces, cannot cope with the complicated behavior of light rays and are therefore incapable of correcting aberrations.

The term "three-dimensional surface" as used in the present invention means a surface which is defined by the following equation:

$$Z = C_2$$
$$+ C_3 y + C_4 x$$
$$+ C_5 y^2 + C_6 yx + C_7 x^2$$
$$+ C_8 y^3 + C_9 y^2 x + C_{10} yx^2 + C_{11} x^3$$
$$+ C_{12} y^4 + C_{13} y^3 x + C_{14} y^2 x^2 + C_{15} yx^3 + C_{16} x^4$$
$$+ C_{17} y^5 + C_{18} y^4 x + C_{19} y^3 x^2 + C_{20} y^2 x^3 + C_{21} yx^4$$
$$+ C_{22} x^5$$
$$+ C_{23} y^6 + C_{24} y^5 x + C_{25} y^4 x^2 + C_{26} y^3 x^3 + C_{27} y^2 x^4$$
$$+ C_{28} yx^5 + C_{29} x^6$$
$$+ C_{30} y^7 + C_{31} y^6 x + C_{32} y^5 x^2 + C_{33} y^4 x^3 + C_{34} y^3 x^4$$
$$+ C_{35} y^2 x^5 + C_{36} yx^6 + C_{37} x^7 \quad (a)$$

In the above equation, when the decentering direction is assumed to be the direction of the Y-axis, all terms with odd-numbered powers of X are zero.

With this defining equation, it is possible to favorably correct various aberrations as described below, and a refracting power adequate for an optical system to be usable as an image-forming optical system (read optical system) can be added by a reflecting mirror tilted as in the present invention.

Firstly, because a surface serving as a reference surface is based on a paraboloid given by terms of the second power, spherical aberration is unlikely to occur. Secondly, because there are terms with odd-numbered powers of Y and terms with odd-numbered powers of X, it is possible to give a tilt in the Y-axis direction at a desired position on the X-axis.

Because an odd-numbered power and an even-numbered power are multiplied together for each of Y and X, a desired curvature can be given with respect to the positive and negative of each axis.

Thus, the above-described defining equation has various kinds of freedom and makes it possible to correct aberrations satisfactorily even if a power is given to a three-dimensional surface defined by the equation when it is used as a decentered reflecting surface.

How the freedom is important for aberration correction will be explained below. A reflecting mirror that is tilted and has a power produces rotationally asymmetric curvature of field. Regarding the curvature of field, light rays passing through the pupil and diverging in the X-axis direction are reflected by the decentered reflecting mirror. In this case, the distance from that portion of the reflecting mirror struck by the light rays to the image plane is r/2n according to the following equation expressing the focal length of a back-coated reflecting mirror:

$$f = -r/2n$$

where r is the curvature of the portion struck by the light rays, and n is the refractive index.

In other words, the tilted reflecting mirror forms an image surface that is tilted relative to the optical axis in parallel to the tilted reflecting mirror with respect to the direction of travel of light rays reflected from the decentered concave mirror and that is curved with a curvature of r/2n, where r is the curvature of the reflecting mirror.

As has been stated above, a three-dimensional surface has terms with odd-numbered powers of Y which enable the curvature to be changed as desired according to the sign (positive or negative) of the Y-axis. This is effective in correcting a rotationally asymmetric field curvature, particularly the tilt of the image surface, produced by a decentered concave mirror.

Next, rotationally asymmetric field curvature will be explained. In general, a reflecting mirror produces field curvature along the reflecting surface. In the present invention, it is possible to construct an arrangement capable of correcting field curvature by a convex mirror which pairs with a concave mirror, as stated above. Further, the present invention uses two concave surfaces to minimize the field curvature produced by each of them. However, with any conventional surface configuration, the field curvature cannot completely be corrected because of a small number of surfaces. To correct the field curvature remaining uncorrected, it is preferable to use a three-dimensional surface, which can give a desired curvature at a desired position. That is, the curvature can be changed according to the sign (positive or negative) of the Y-axis by a combination of terms with odd-numbered powers of Y and terms with the second and higher powers of X.

Further, it is possible to minimize astigmatism at a desired position by appropriately changing the difference between the curvature in the X-axis direction and the curvature in the Y-axis direction. This is possible owing to the fact that terms with the second power of X and terms with the second power of Y are present independently of each other.

In view of the productivity of optical parts, it is even more desirable to minimize the number of three-dimensional surfaces used. Accordingly, it is preferable to use the above-described three-dimensional surface as at least one of three surfaces and to use a plane surface or a spherical surface or a decentered rotationally symmetric surface as each of the remaining surfaces. By doing so, it is possible to improve the productivity.

It is still more desirable to satisfy the following conditions. By doing so, it is possible to provide a read optical which has a wide field angle and a large pupil diameter and which is favorably corrected for aberrations.

When X-, Y- and Z-axes are determined according to the above definition, an effective area is defined to be an area where light rays passing at the maximum field angles intersect each surface among light rays emanating from the center of the pupil position and entering a read optical system that forms an image, and light rays ① to ⑥ as shown in Table 1 below are traced.

TABLE 1

|  | Field angle zero in direction X | Maximum field angle in direction X |
|---|---|---|
| Maximum field angle in direction +Y | ① | ④ |
| Field angle zero in direction Y | ② | ⑤ |
| Maximum field angle in direction −Y | ③ | ⑥ |

As shown in Table 1: an axial principal ray in an optical axis direction corresponding to the center of the image field is defined as ②; a ray in a field angle direction corresponding to the center of the upper edge of the image field is defined as ①; a ray in a field angle direction corresponding to the upper-right corner of the image field is defined as ④; a ray in a field angle direction corresponding to the center of the right-hand edge of the image field is defined as ⑤; a ray in a field angle direction corresponding to the lower-right corner of the image field is defined as ⑥; and a ray in a field angle direction corresponding to the center of the lower edge of the image field is defined by ③. An equation which defines the configuration of each particular surface [i.e. an expression in which the Z-axis is expressed as an axis of the surface, or an expression in which the surface is expressed in the form of Z=f(X,Y) on the assumption that the surface is not decentered] is solved to determine first-order differential values and curvature values at portions where the rays ① to ⑥ strike the surface. In other words, the first-order differential expresses the tilt of a portion struck by a particular ray relative to the surface defining coordinate system, and the curvature expresses the partial curvature of a portion struck by a particular ray. In a case where each surface of an optical system is decentered, a coordinate system that defines a surface configuration can be set at any position. Accordingly, even if a curvature and so forth at the center of the coordinate system are described, there are cases where no light ray passes through that portion; therefore, the surface configuration cannot adequately be defined.

First, the partial curvature in the direction X at a position of a TFC surface on which the axial principal ray ② impinges will be explained. The reason why a partial curvature of a TFC surface is defined in the present invention is that no matter how favorably a TFC surface can be corrected for aberrations, if the power of the surface is excessively strong, aberrations become excessively large and impossible to correct by another surface. Assuming that RX is the curvature in the direction X of a portion on which the principal ray ② impinges, it is important to satisfy the following condition:

$$|RX|<0.5 \text{ (1/millimeter)} \tag{A-1}$$

When the curvature of the decentered reflecting surface is smaller than the upper limit, i.e. 0.5, it is possible to construct an optical system having minimal aberrations by forming the reflecting surface from a surface having only one plane of symmetry. A reflecting surface having a curvature not smaller than the upper limit, i.e. 0.5, produces various aberrations due to decentration which are extremely large and difficult to correct by another surface.

It is even more desirable to satisfy the following condition:

$$|RX|<0.1 \text{ (1/millimeter)} \tag{A-2}$$

When the above condition is satisfied, it is important to form the reflecting surface from a surface having only one plane of symmetry in order to prevent the occurrence of aberrations due to decentration.

It is still more desirable to satisfy the following condition:

$$|RX|<0.05 \text{ (1/millimeter)} \tag{A-3}$$

When the above condition is satisfied, it is important to form the reflecting surface from a surface having only one plane of symmetry in order to prevent the occurrence of aberrations due to decentration.

Next, the partial curvature in the direction Y at a position of a TFC on which the axial principal ray ② impinges will be explained. The reason why a partial curvature of a TFC surface is defined in the present invention is that no matter how favorably a TFC surface can be corrected for aberrations, if the power of the surface is excessively strong, aberrations become excessively large and impossible to correct by another surface. Assuming that RY is the curvature in the direction Y of a portion on which the principal ray ② impinges, it is important to satisfy the following condition:

$$|RY|<0.5 \text{ (1/millimeter)} \tag{B-1}$$

When the curvature of the decentered reflecting surface is smaller than the upper limit, i.e. 0.5, it is possible to construct an optical system having minimal aberrations by forming the reflecting surface from a surface having only one plane of symmetry. A reflecting surface having a curvature not smaller than the upper limit, i.e. 0.5, produces various aberrations due to decentration which are extremely large and difficult to correct by another surface.

It is even more desirable to satisfy the following condition:

$$|RY|<0.1 \text{ (1/millimeter)} \tag{B-2}$$

When the above condition is satisfied, it is important to form the reflecting surface from a surface having only one plane of symmetry in order to prevent the occurrence of aberrations due to decentration.

It is still more desirable to satisfy the following condition:

$$|RY|<0.05 \text{ (1/millimeter)} \tag{B-3}$$

When the above condition is satisfied, it is important to form the reflecting surface from a surface having only one plane of symmetry in order to prevent the occurrence of aberrations due to decentration.

Next, assuming that, in a reflecting surface, the relation of the first-order differential value DX in the X-axis direction to the tilt $DX_{axis}$ and curvature RX at a position struck by the principal ray ②, which passes through the pupil center and reaches the center of the image plane, is expressed as $DX_{max1}=MAX((DX-DX_{axis})/RX)$ it is important to satisfy the following condition:

$$|DX_{max1}|<100.0 \text{ (millimeter)} \tag{1-1}$$

This condition expresses the tilt of the reflecting surface in the direction X. If $|DX_{max1}|$ is not smaller than the upper limit of the above condition, i.e. 100.0, the tilt of the reflecting surface with respect to a principal ray of each image height becomes excessively large. Consequently, aberrations due to decentration become excessively large and impossible to correct by another surface.

It is even more desirable to satisfy the following condition:

$$|DX_{max1}|<10.0 \text{ (millimeter)} \quad (1\text{-}2)$$

It is still more desirable to satisfy the following condition:

$$|DX_{max1}|<6.0 \text{ (millimeter)} \quad (1\text{-}3)$$

All the above conditions (1-1) to (1-3) are necessary to satisfy in order to obtain a favorable image for observation at a wide field angle. In particular, it is important to satisfy the condition (1-2) when the half field angle is 10 degrees or more. It is preferable to satisfy the condition (1-3) when the half field angle is 15 degrees or more.

Next, assuming that, in a reflecting surface, the relation of the tilt of the surface in the decentering direction, that is, the first-order differential value DY in the Y-axis direction, to the tilt $DY_{axis}$ and curvature RY at a position struck by the principal ray ② which passes through the pupil center and reaches the center of the image plane, is expressed as $DY_{max2}=\text{MAX}((DY-DY_{axis})/RY)$, it is important to satisfy the following condition:

$$|DY_{max2}|<100.0 \text{ (millimeter)} \quad (2\text{-}1)$$

This condition expresses the tilt of the reflecting surface in the direction Y. If $|DY_{max2}|$ is not smaller than the upper limit of the above condition, i.e. 100.0, the tilt of the reflecting surface with respect to a principal ray of each image height becomes excessively large. Consequently, aberrations due to decentration become excessively large and impossible to correct by another surface.

It is even more desirable to satisfy the following condition:

$$|DY_{max2}|<10.0 \text{ (millimeter)} \quad (2\text{-}2)$$

It is still more desirable to satisfy the following condition:

$$|DY_{max2}|<6.0 \text{ (millimeter)} \quad (2\text{-}3)$$

All the above conditions (2-1) to (2-3) are necessary to satisfy in order to obtain a favorable image for observation at a wide field angle. In particular, it is important to satisfy the condition (2-2) when the half field angle is 10 degrees or more. It is preferable to satisfy the condition (2-3) when the half field angle is 15 degrees or more.

Next, assuming that the differences between, on the one hand, the tilts in the direction X at respective positions where the principal rays ④ and ⑥ passing at the maximum field angle in the direction X impinge on the decentered reflecting surface, respectively, and on the other, the tilts in the direction X at respective positions where the principal rays ① and ③ passing at the field angle zero in the direction X impinge on the reflecting surface are denoted by (DX4−DX1) and (DX6−DX3), respectively, and the difference therebetween is denoted by $DX_3=(DX4-DX1)-(DX6-DX3)$, it is desirable to satisfy the following condition:

$$|DX_3|<0.4 \quad (3\text{-}1)$$

The above condition (3-1) expresses a distortion in the direction X of peripheral image portions in the direction X. If $|DX_3|$ is not smaller than the upper limit of the condition, i.e. 0.4, the left and right ends of the observation image change in the X-axis direction. Consequently, a trapezoidal image distortion becomes large and impossible to correct by another surface. Thus, the image for observation is unfavorably distorted.

It is even more desirable to satisfy the following condition:

$$|DX_3|<0.2 \quad (3\text{-}2)$$

It is particularly important to satisfy the condition (3-2) in order to provide an observation image having a minimal image distortion when it is intended to ensure a half field angle of 10 degrees or more.

It is still more desirable to satisfy the following condition:

$$|DX_3|<0.1 \quad (3\text{-}3)$$

It is particularly important to satisfy the condition (3-3) in order to provide an observation image having a minimal image distortion when it is intended to ensure a half field angle of 15 degrees or more.

It is still more desirable to satisfy the following condition:

$$|DX_3|<0.05 \quad (3\text{-}4)$$

It is particularly important to satisfy the condition (3-4) in order to provide an observation image having substantially no image distortion when it is intended to ensure a half field angle of 20 degrees or more.

Next, assuming that the differences between, on the one hand, the tilts in the direction Y at respective positions where the principal rays ④ and ⑥ passing at the maximum field angle in the direction X impinge on the decentered reflecting surface, respectively, and on the other, the tilts in the direction Y at respective positions where the principal rays ① and ③ passing at the field angle zero in the direction X impinge on the reflecting surface are denoted by (DY4−DY1) and (DY6−DY3), respectively, and the difference therebetween is denoted by $DY_4=(DY4-DY1)-(DY6-DY3)$, it is desirable to satisfy the following condition:

$$|DY_4|<0.4 \quad (4\text{-}1)$$

The above condition (4-1) expresses a distortion in the direction Y of peripheral image portions in the direction X. If $|DY_4|$ is not smaller than the upper limit of the condition, i.e. 0.4, the left and right ends of the observation image change in the Y-axis direction. Consequently, an image distortion in which the peripheral image portions are undesirably arched becomes large and impossible to-correct by another surface. Thus, the image for observation is unfavorably distorted.

It is even more desirable to satisfy the following condition:

$$|DY_4|<0.2 \quad (4\text{-}2)$$

It is particularly important to satisfy the condition (4-2) in order to provide an observation image having a minimal image distortion when it is intended to ensure a half field angle of 10 degrees or more.

It is still more desirable to satisfy the following condition:

$$|DY_4|<0.1 \quad (4\text{-}3)$$

It is particularly important to satisfy the condition (4-3) in order to provide an observation image having a minimal image distortion when it is intended to ensure a half field angle of 15 degrees or more.

It is still more desirable to satisfy the following condition:

$$|DY_4|<0.05 \tag{4-4}$$

It is particularly important to satisfy the condition (4-4) in order to provide an observation image having substantially no image distortion when it is intended to ensure a half field angle of 20 degrees or more.

Next, assuming that $DX_{max5}$ denotes the difference ($DX5-DX_{axis}$) between the first-order differential value $DX_{axis}$ in the direction X of the center of the image field and the first-order differential value DX5 in the direction x at the right end at the maximum field angle in the direction X on the X-axis, it is important that the value of $DX_{max5}$ of the reflecting surface should satisfy the following condition:

$$|DX_{max5}|<0.5 \tag{5-1}$$

This condition is concerned with an image distortion in which a horizontal straight line passing through the center of the image field, e.g. a horizontal line, is observed to be a bow-shaped curve. If $|DX_{max5}|$ is not smaller than the upper limit of the condition, i.e. 0.5, a bow-shaped image distortion which is convex downwardly becomes large and impossible to correct by another surface.

It is even more desirable to satisfy the following condition:

$$|DX_{max5}|<0.1 \tag{5-2}$$

It is particularly important to satisfy the condition (5-2) when the half field angle exceeds 10 degrees. It should be noted that the meaning of the upper limit is the same as in the case of the condition (5-1).

It is still more desirable to satisfy the following condition:

$$|DX_{max5}|<0.05 \tag{5-3}$$

It is particularly important to satisfy the condition (5-3) when the half field angle exceeds 15 degrees. It should be noted that the meaning of the upper limit is the same as in the case of the condition (5-1).

It is still more desirable to satisfy the following condition:

$$|DX_{max5}|<0.02 \tag{5-4}$$

It is particularly important to satisfy the condition (5-4) when the half field angle exceeds 20 degrees. It should be noted that the meaning of the upper limit is the same as in the case of the condition (5-1).

Next, assuming that $DY_{max6}$ denotes the difference ($DY5-DY_{axis}$) between the first-order differential value $DY_{axis}$ in the direction Y of the center of the image field and the first-order differential value DY5 in the direction Y at the right end at the maximum field angle in the direction X on the X-axis, it is important that the value of $DY_{max6}$ of the reflecting surface should satisfy the following condition:

$$|DY_{max6}|<0.5 \tag{6-1}$$

This condition is concerned with an image distortion in which a horizontal straight line passing through the center of the image field, e.g. a horizontal line, is observed to be a bow-shaped curve. If $|DY_{max6}|$ is not smaller than the upper limit of the condition, i.e. 0.5, a bow-shaped image distortion which is convex downwardly becomes large and impossible to correct by another surface.

It is even more desirable to satisfy the following condition:

$$|DY_{max6}|<0.1 \tag{6-2}$$

It is particularly important to satisfy the condition (6-2) when the half field angle exceeds 10 degrees. It should be noted that the meaning of the upper limit is the same as in the case of the condition (6-1).

It is still more desirable to satisfy the following condition:

$$|DY_{max6}|<0.05 \tag{6-3}$$

It is particularly important to satisfy the condition (6-3) when the half field angle exceeds 15 degrees. It should be noted that the meaning of the upper limit is the same as in the case of the condition (6-1).

It is still more desirable to satisfy the following condition:

$$|DY_{max6}|<0.02 \tag{6-4}$$

It is particularly important to satisfy the condition (6-4) when the half field angle exceeds 20 degrees. It should be noted that the meaning of the upper limit is the same as in the case of the condition (6-1).

Next, assuming that $DDX_{max7}$ denotes the difference between the maximum and minimum values of the partial curvatures in the direction X of a TFC surface within the effective area, it is important to satisfy the following condition:

$$|DDX_{max7}<0.5| \text{ (1/millimeter)} \tag{7-1}$$

This condition shows that the fact that it is difficult for the curvature to change in the X-axis direction is important for reducing field curvature, particularly field curvature in the X-axis direction. If the difference between the maximum and minimum curvatures in the direction X of a decentered reflecting surface is not smaller than the upper limit of the condition, i.e. 0.5, the field curvature becomes unfavorably large, and it becomes difficult to obtain a flat image surface.

It is even more desirable to satisfy the following condition:

$$DDX_{max7}<0.1 \text{ (1/millimeter)} \tag{7-2}$$

By satisfying the condition (7-2), it is possible to obtain an image favorably corrected for aberrations as far as the edges of the image field.

It is still more desirable to satisfy the following condition:

$$DDX_{max7}<0.05 \text{ (1/millimeter)} \tag{7-3}$$

By satisfying the condition (7-3), it is possible to obtain an image even more favorably corrected for aberrations as far as the edges of the image field.

Next, assuming that $DDY_{max8}$ denotes the difference between the maximum and minimum values of the partial curvatures in the direction Y of a TFC surface within the effective area, it is important to satisfy the following condition:

$$DDY_{max8}<0.5 \text{ (1/millimeter)} \tag{8-1}$$

This condition shows that the fact that it is difficult for the curvature to change in the Y-axis direction is important for reducing field curvature, particularly field curvature in the Y-axis direction. If the difference between the maximum and minimum curvatures in the direction Y of a decentered reflecting surface is not smaller than the upper limit of the condition, i.e. 0.5, the field curvature becomes unfavorably large, and it becomes difficult to obtain a flat image surface.

It is even more desirable to satisfy the following condition:

$$DDY_{max8}<0.1 \text{ (1/millimeter)} \tag{8-2}$$

By satisfying the condition (8-2), it is possible to obtain an image favorably corrected for aberrations as far as the edges of the image field.

It is still more desirable to satisfy the following condition:

$$DDY_{max8} < 0.05 \text{ (1/millimeter)} \quad (8\text{-}3)$$

By satisfying the condition (8-3), it is possible to obtain an image even more favorably corrected for aberrations as far as the edges of the image field.

Next, assuming that $DD_{xy9}$ denotes | the curvature in the direction X over the curvature in the direction Y|=| DDXn|/|DDYn| (n is 1 to 6 corresponding to the Nos.①to ⑥ of the principal rays) at a position where each ray impinges on a surface within the effective area, it is important that $DD_{xy9}$ should satisfy the following condition throughout the effective area of a reflecting surface:

$$0.01 < DD_{xy9} < 40 \quad (9\text{-}1)$$

$DD_{xy9}$ corresponds to the ratio of the image-formation position in the direction X of the effective area to the image-formation position in the direction Y of the effective area. The condition (9-1) is necessary to satisfy in order for astigmatism to be favorably corrected. If $DD_{xy9}$ is not larger than the lower limit of the condition (9-1), i.e. 0.01, light rays in the direction X are imaged at a position closer to the optical system than light rays in the direction Y, causing astigmatism to occur to a considerable extent. If $DD_{xy9}$ is not smaller than the upper limit of the condition (9-1), i.e. 40, light rays in the direction X are imaged at a position remoter from the optical system than light rays in the direction Y, causing astigmatism to occur to a considerable extent in reverse relation to the above. In either case, astigmatism becomes impossible to correct by another surface. It should be noted that a surface symmetric with respect to both the Y- and X-axes, e.g. a toric surface, satisfies this condition. In this case, however, coma and image distortion occur to a considerable extent.

It is even more desirable to satisfy the following condition:

$$0.1 < DD_{xy9} < 20 \quad (9\text{-}2)$$

It is particularly important to satisfy the condition (9-2) when the half field angle exceeds 20 degrees.

It is still more desirable to satisfy the following condition:

$$0.3 < DD_{xy9} < 10 \quad (9\text{-}3)$$

It is particularly important to satisfy the condition (9-3) when the half field angle exceeds 25 degrees.

It is still more desirable to satisfy the following condition:

$$0.5 < DD_{xy9} < 6 \quad (9\text{-}4)$$

It is particularly important to satisfy the condition (9-4) when the half field angle exceeds 30 degrees.

Next, the image-forming optical system according to the second aspect of the present invention will be described.

In general, aspherical surfaces are used in order to effect favorable aberration correction with a minimal number of surfaces. Spherical lens systems generally adopt an arrangement in which aberrations produced by a spherical surface, such as spherical aberration, coma, and field curvature, are corrected by another surface. In order to reduce various aberrations which would be produced by a spherical surface, an aspherical surface is used. The purpose of using an aspherical surface is to reduce various aberrations which would be produced by one surface and to minimize the number of surfaces used to effect aberration correction, thereby minimizing the number of surfaces constituting the whole optical system.

However, a decentered optical system, such as an image-forming optical system used in the image pickup apparatus according to the present invention, suffers from aberrations due to decentration which cannot be corrected by a conventionally employed rotationally symmetric aspherical surface. Aberrations due to decentration include coma, astigmatism, image distortion, field curvature, etc. There are conventional design examples in which a toric surface, an anamorphic surface, etc. are used to correct such aberrations. However, in the conventional examples, great importance has been placed on the correction of astigmatism caused by decentration, and there has heretofore been proposed no device which is compact and provides a wide field angle and which is satisfactorily corrected for aberrations including image distortion.

These aberrations cannot be corrected simultaneously and satisfactorily by a toric surface, an anamorphic surface, a rotationally symmetric aspherical surface, or a spherical surface.

The present invention is characterized by using a plane-symmetry three-dimensional surface which has no axis of rotational symmetry in nor out of the surface and which has only one plane of symmetry to correct the above-described aberrations simultaneously and favorably.

The term "three-dimensional surface" as used in the present invention means a surface which is defined by the above equation (a).

By using such a three-dimensional surface as at least one reflecting surface having a reflecting action, a tilted reflecting surface, e.g. a second surface in the examples (described later), can be given a desired tilt in the direction Y at a desired position on the X-axis in a coordinate system in which the decentering direction is defined as a Y-axis, and the direction of an axial principal ray emanating from the object center and reaching the aperture center is defined as a Z-axis, and further an axis perpendicularly intersecting both the Z- and Y-axes is defined as an X-axis. This enables correction of image distortions produced by a decentered concave mirror, particularly an image distortion that changes according to the image height in the X-axis direction and occurs in the Y-axis direction. Consequently, it is possible to favorably correct an image distortion in which a horizontal line is observed to be a bow-shaped line.

Next, a trapezoidal distortion produced by a decentered concave mirror will be explained by forward tracing from the object plane. Light rays exiting from the aperture to diverge in the X-axis direction are reflected by the decentered second surface. At this time, light rays impinging on the Y-axis positive side of the second surface and light rays impinging on the Y-axis negative side of the second surface are reflected by the second surface after the two groups of light rays have become largely different from each other in terms of the degree of divergence in the X-axis direction owing to the difference in optical path length. For this reason, the size of an image in the positive direction of the Y-axis and that in the negative direction of the Y-axis become different from each other when these images are formed. As a result, the image for observation is distorted in the shape of a trapezoid.

This distortion can also be corrected by using a three-dimensional surface. This is because, as will be clear from the defining equation (a), a three-dimensional surface has terms with odd-numbered powers of Y and terms with even-numbered powers of X, which enable the curvature to be changed in the X-axis direction as desired according to the sign (positive or negative) of the Y-axis.

Next, a rotationally asymmetric field curvature produced by a decentered concave mirror will be explained by forward tracing from the object plane. Light rays exiting from the aperture to diverge in the X-axis direction are reflected by the decentered second surface. In this case, the distance from a portion of the second surface that is struck by the light rays to the image plane is a half of the curvature of that portion of the second surface. In other words, the decentered concave mirror forms an image surface that is tilted with respect to the direction of travel of light rays reflected from the decentered concave mirror. The use of a three-dimensional surface makes it possible to give desired curvatures in the X- and Y-axis directions at a desired point with respect to the positive and negative directions on the Y-axis. This is because, as will be clear from the defining equation (a), a three-dimensional surface has terms with odd-numbered powers of Y which enable the curvature to be changed as desired according to the sign (positive or negative) of the Y-axis. This is effective in correcting a rotationally asymmetric field curvature, particularly the tilt of the image surface, produced by a decentered concave mirror.

Next, rotationally asymmetric field curvature will be explained. In general, a reflecting mirror produces field curvature along the reflecting surface. The image-forming optical systems according to the present invention are generally arranged such that the field curvature can be corrected by a convex mirror which pairs with a concave mirror as described above. However, the field curvature cannot completely be corrected because the number of surfaces is small. It is preferable in order to correct the field curvature left uncorrected to use a three-dimensional surface, which enables a desired curvature to be given at any position.

Astigmatism can be corrected by appropriately changing the difference between the curvature in the X-axis direction and the curvature in the Y-axis direction.

Comatic aberration can be corrected by giving a desired tilt in the direction Y at a desired point on the X-axis on the basis of the same idea as that for the above-described bow-shaped image distortion.

In view of the productivity of optical parts, it is even more desirable to minimize the number of three-dimensional surfaces used. Accordingly, it is preferable to use the above-described three-dimensional surface as one of at least two reflecting surfaces, for example, the second surface, and to use a plane surface or a spherical surface or a decentered rotationally symmetric surface as at least one other of the reflecting surfaces. By doing so, it is possible to improve the productivity.

The second surface, which is a reflecting surface disposed to face the aperture of the image-forming optical system, has a strong reflective refracting power in comparison to other surfaces. Therefore, the use of a three-dimensional surface as the second surface is effective when it is desired to suppress the occurrence of aberrations.

If a three-dimensional surface is used as the third surface, which is a refracting surface through which light rays exit from the image-forming optical system, or the first surface, which serves also as a reflecting surface, it is possible to suppress the occurrence of comatic aberration. The reason for this is that the first surface is tilted to a considerable extent with respect to the axial principal ray when it operates as a reflecting surface.

By using a three-dimensional surface as the third surface, image distortion can be corrected. The reason for this is that the third surface is disposed close to the image-formation position; therefore, the use of a three-dimensional surface enables image distortion to be favorably corrected without aggravating other aberrations.

If two surfaces are formed from three-dimensional surfaces, various aberrations can be corrected even more favorably, as a matter of course. For example, if the second and third surfaces are formed from three-dimensional surfaces, the first surface can be formed from a plane surface. This makes it possible to improve the productivity of optical elements constituting the image-forming optical system. The first surface may be formed from a spherical surface or a rotationally symmetric aspherical surface.

According to the present invention, the above-described three-dimensional surface is used for at least one reflecting surface having a reflecting action, and the surface configuration of the reflecting surface is a plane-symmetry three-dimensional surface which has no axis of rotational symmetry in nor out of the surface and which has only one plane of symmetry. When a coordinate system is defined as shown for example in FIG. 7, a three-dimensional surface is arranged such that the YZ-plane, which is a plane containing the decentering direction of decentered surfaces, is the plane of symmetry. By doing so, the image on the image-formation plane can be made symmetric about the YZ-plane as a plane of symmetry. Thus, the effort to correct aberrations can be reduced to a considerable extent.

It should be noted that reflecting surfaces having a reflecting action used in the present invention include all reflecting surfaces having a reflecting action, e.g. totally reflecting surfaces, mirror-coated surfaces, and semitransparent reflecting surfaces.

The surface configuration of the at least one reflecting surface used in the present invention is not necessarily limited to a three-dimensional surface having only one plane of symmetry and no axis of rotational symmetry as described above. It is also possible to provide an image-forming optical system having a wide field angle and corrected for aberrations by using a decentered rotationally symmetric aspherical surface, an anamorphic surface, a cylindrical surface, a toric surface, etc., provided that conditions described below are satisfied.

In a case where a plane-symmetry three-dimensional surface having only one plane of symmetry is used as at least one reflecting surface of an image-forming optical system, it is possible to provide an image-forming optical system having a wide field angle and corrected for aberrations by satisfying the following conditions.

As shown in the above Table 1, six principal rays are determined. That is, an axial principal ray emanating from the object center is defined as ②; a principal ray in a field angle direction corresponding to the center of the upper edge of the image field is defined as ①; a principal ray in a field angle direction corresponding to the upper-right corner of the image field is defined as ④; a principal ray in a field angle direction corresponding to the center of the right-hand edge of the image field is defined as ⑤; a principal ray in a field angle direction corresponding to the lower-right corner of the image field is defined as ⑥; and a principal ray in a field angle direction corresponding to the center of the lower edge of the image field is defined by ③. An area where the principal rays 1 to 6 intersect each particular surface is defined as an effective area. An equation which defines the configuration of each particular surface [i.e. an expression in which the Z-axis is expressed as an axis of the surface, or an expression in which the surface is expressed in the form of $Z=f(X,Y)$ on the assumption that the surface is not decentered] is solved to determine tilts in the Y-axis direction, which corresponds to the decentering direction, of the surface at respective positions where the principal rays ① to ⑥ impinge on the surface in the effective area. The tilts are denoted by DY1 to DY6, and the curvatures in the Y-axis direction at these positions are denoted by CY1 to CY6. The tilts of the surface at these positions in the X-axis direction, which perpendicularly intersects the Y-axis direction, are denoted by DX1 to DX6, and the curvatures in the X-axis direction at these positions are denoted by CX1 to CX6.

It is desirable to satisfy the following condition:

$$1 < CX2/CY2 < 5 \tag{10-1}$$

where, assuming the Y-axis direction to be a vertical direction, CX2 is the curvature of the equation defining the configuration of the surface concerned at a portion at which an axial principal ray emanating from the object center in the Z-axis direction intersects the surface, in a plane containing both the X-axis, which is perpendicular to the decentering direction of the surface, and a line normal to the surface, and CY2 is the curvature at the above-described portion of the surface in a plane containing both the Y-axis, which corresponds to the decentering direction, and the line normal to the surface.

The condition (10-1) is necessary to satisfy in order to reduce astigmatism produced by a decentered reflecting surface. In the case of a spherical surface, CX2/CY2=1. However, a decentered spherical surface produces a large amount of aberration such as image distortion, astigmatism, and coma. Therefore, if a decentered surface is formed by using a spherical surface, it is difficult to completely correct astigmatism on the axis, and the residual astigmatism makes it difficult to view a clear observation image even at the center of the image field. To correct these aberrations, it is necessary to use a surface having only one plane of symmetry to constitute a reflecting surface having the strongest reflective refracting power in the optical system and also necessary to satisfy the condition (10-1). By doing so, various aberrations are favorably corrected. Moreover, it is possible to obtain an image free from astigmatism even on the axis. The upper and lower limits of the condition (10-1), i.e. 5 and 1, are the limits within which astigmatism can be prevented from occurring to a considerable extent.

It is even more desirable to satisfy the following condition:

$$1 < CX2/CY2 < 2 \tag{10-2}$$

It is still more desirable to satisfy the following condition:

$$1 < CX2/CY2 < 1.5 \tag{10-3}$$

It is still more desirable to satisfy the following condition $$1 < CX2/CY2 < 1.35 \tag{10-4}$$

The meaning of the upper and lower limits of each of the conditions (10-2) to (10-4) is the same as in the case of the condition (10-1).

It is still more desirable that both at least two reflecting surfaces should satisfy the conditions (10-1) to (10-4).

Next, conditions concerning the tilt of a reflecting surface will be shown. In a decentered optical system according to the present invention in which the principal refracting power of the whole optical system is given to a reflecting surface, which is a feature of the present invention, the occurrence of a rotationally asymmetric image distortion due to decentration gives rise to a problem. The following conditions are particularly necessary to satisfy in order to correct a trapezoidal image distortions such that the respective lengths of the upside and base of a trapezoid are made equal to each other. To correct a trapezoidal distortion, it is necessary to give a different tilt to the reflecting surface at each image position to thereby correct the distortion. The amount of tilt to be given varies subtly from place to place on the reflecting surface. However, it is important to satisfy the following condition from the viewpoint of aberration correction:

$$-0.1 < DXn2 < 0 \tag{11-1}$$

where DXn2 denotes the difference between the tilts in the X-axis direction at respective positions on at least one reflecting surface that are struck by the light rays ④ and ⑥ passing at the maximum field angle in the direction X, i.e. DX4-DX6.

If DXn2 is not smaller than the upper limit of the condition (11-1), i.e. 0, or not larger than the lower limit, i.e. −0.1, the tilt of the surface in the effective area cannot satisfactorily correct image distortions due to decentration. Consequently, a distortion that is not rotationally symmetric becomes undesirably large.

It is even more desirable to satisfy the following condition:

$$-0.05 < DXn2 < 0 \tag{11-2}$$

It is important to satisfy the condition (11-2) when the imaging field angle exceeds 20 degrees.

It is still more desirable to satisfy the following condition:

$$-0.01 < DXn2 < 0 \tag{11-3}$$

It is important to satisfy the condition (11-3) when the imaging field angle exceeds 30 degrees. Both the conditions (11-2) and (11-3) are necessary to satisfy in order to obtain a favorable image-forming performance at a wide imaging field angle.

It is even more desirable that both at least two reflecting surfaces should satisfy the conditions (11-1) to (11-3). As has been stated above, a decentered surface produces a rotationally asymmetric image distortion owing to the difference in height between light rays impinging on the surface. To correct the image distortion, it is important that at least two reflecting surfaces decentered with respect to the axial principal ray should satisfy the above-described conditions.

It is still more desirable that all the decentered reflecting surfaces should satisfy the conditions (11-1) to (11-3), as a matter of course.

Next, conditions for minimizing an asymmetric image distortion due to decentration will be explained. By satisfying the following condition, it is possible to minimize an image distortion in which a horizontal straight line is imaged to be a bow-shaped line. That is, it is desirable from the viewpoint of aberration correction to satisfy the following condition:

$$0 < DY5 - DY2 < 0.1 \tag{12-1}$$

where DY2 and DY5 are the tilts of an equation that defines the configuration of at least one reflecting surface in the Y-axis direction, which corresponds to the decentering direction of the surface, at respective portions where the axial principal ray ② emanating from the object center in the Z-axis direction and the principal ray ⑤ in the field angle direction corresponding to the center of the right-hand edge of the image field intersect the surface concerned.

If the tilt difference DY5−DY2 is not larger than the lower limit of the condition (12-1), i.e. 0, the tilt in the direction Y of the center of the right-end portion of the effect area becomes excessively small, and it becomes impossible to satisfactorily correct bow-shaped field curvature. If DY5−DY2 is not smaller than the upper limit of the condition (12-1), i.e. 0.1, over-correction results. Consequently, the aberration occurs to a considerable extent in the reverse direction.

It is even more desirable to satisfy the following condition:

$$0<DY5-DY2<0.05 \qquad (12\text{-}2)$$

It is important to satisfy the condition (12-2) when the imaging field angle exceeds 20 degrees.

It is still more desirable to satisfy the following condition:

$$0<DY5-DY2<0.01 \qquad (12\text{-}3)$$

It is important to satisfy the condition (12-3) when the imaging field angle exceeds 30 degrees. Both the conditions (12-2) and (12-3) are necessary to satisfy in order to obtain a favorable image at a wide imaging field angle.

It is even more desirable that both at least two reflecting surfaces should satisfy the conditions (12-1) to (12-3).

Next, it is important that at least one of two reflecting surfaces decentered with respect to each other in an image-forming optical system should satisfy the following condition. It is an important condition to flatten curvature of field produced by a surface which is decentered and which has a power.

Assuming that CXn4M denotes each value of the differences CX4−CX1, CX5−CX2 and CX6−CX3 with regard to the curvature CX2 in the direction X of that portion of at least one reflecting surface in the optical system which reflects the axial principal ray ② and the curvatures CXn (n is 1, 3 to 6) in the direction X of portions of the surface on which the rays ①, ③ to ⑥ passing at the maximum imaging field angles impinge, respectively, it is desirable from the viewpoint of aberration correction that all the values CXn4M should satisfy the following condition:

$$-0.1<CXn4M<0.1 \text{ (1/millimeter)} \qquad (13\text{-}1)$$

If CXn4M is not smaller than the upper limit of the condition (13-1), i.e. 0.1, or not larger than the lower limit, i.e. −0.1, the curvatures of the surface in the effective area become excessively different from each other. Consequently, the curvature of the whole effective area of a surface having a reflective refracting power in the image-forming optical system undesirably varies to an excessively large extent, making it impossible to obtain a wide and flat image throughout the imaging field angle.

It is even more desirable to satisfy the following condition:

$$-0.05<CXn4M<0.05 \text{ (1/millimeter)} \qquad (13\text{-}2)$$

It is important to satisfy the condition (13-2) when the imaging field angle exceeds 20 degrees.

It is still more desirable to satisfy the following condition:

$$-0.02<CXn4M<0.02 \text{ (1/millimeter)} \qquad (13\text{-}3)$$

It is important to satisfy the condition (13-3) when the imaging field angle exceeds 30 degrees. Both the conditions (13-2) and (13-3) are necessary to satisfy in order to obtain a favorable image at a wide imaging field angle.

It is even more desirable that both at least two reflecting surfaces should satisfy the conditions (13-1) to (13-3).

Next, it is important that at least one of two reflecting surfaces decentered with respect to each other in an image-forming optical system should satisfy the following condition. It is an important condition to flatten curvature of field produced by a surface which is decentered and which has a power.

Assuming that CYn4M denotes each value of the differences CY4−CY1, CY5−CY2 and CY6−CY3 with regard to the curvature CY2 in the direction Y of that portion of at least one reflecting surface in the optical system which reflects the axial principal ray ② and the curvatures CYn (n is 1, 3 to 6) in the direction Y of portions of the surface on which the rays ①, ③ to ⑥ passing at the maximum imaging field angles impinge, respectively, it is desirable from the viewpoint of aberration correction that all the values CYn4M should satisfy the following condition:

$$-0.1<CYn4M<0.1 \text{ (1/millimeter)} \qquad (14\text{-}1)$$

If CYn4M is not smaller than the upper limit of the condition (14-1), i.e. 0.1, or not larger than the lower limit, i.e. −0.1, the curvatures of the surface in the effective area become excessively different from each other. Consequently, the curvature of the whole effective area of a surface having a reflective refracting power in the image-forming optical system undesirably varies to an excessively large extent, making it impossible to obtain a wide and flat image throughout the imaging field angle.

It is even more desirable to satisfy the following condition:

$$-0.01<CYn4M<0.01 \text{ (1/millimeter)} \qquad (14\text{-}2)$$

It is important to satisfy the condition (14-2) when the imaging field angle exceeds 20 degrees.

It is still more desirable to satisfy the following condition:

$$-0.005<CXn4M<0.005 \text{ (1/millimeter)} \qquad (14\text{-}3)$$

It is important to satisfy the condition (14-3) when the imaging field angle exceeds 30 degrees. Both the conditions (14-2) and (14-3) are necessary to satisfy in order to obtain a favorable image at a wide imaging field angle.

It is even more desirable that both at least two reflecting surfaces should satisfy the conditions (14-1) to (14-3).

Next, it is important that a surface having a particularly strong reflective refracting power in an image-forming optical system should satisfy the following condition. It is an important condition to correct all aberrations produced by a surface decentered and having only one plane of symmetry with good balance and to dispose the imaging plane with a minimal tilt as in the case of the above condition (12-1). This condition is particularly important in an optical system using two decentered concave mirrors as in the image-forming optical system according to the present invention.

Assuming that CXn6M denotes each value of the differences CX3−CX1 and CX6−CX4 with regard to the curvature CX2 in the direction X of that portion of at least one reflecting surface in the optical system which reflects the axial principal ray ② and the curvatures CXn (n is 1, 3 to 6) in the direction X of portions of the surface on which the rays ②, ③ to ⑥ passing at the maximum imaging field angles impinge, respectively, it is desirable from the viewpoint of aberration correction that all the values CXn6M should satisfy the following condition:

$$-0.1 < CXn6M < 0 \text{ (1/millimeter)} \tag{15-1}$$

If CXn6M is not smaller than the upper limit of the condition (15-1), i.e. 0, or not larger than the lower limit, i.e. −0.1, the curvatures of the surface in the effective area become excessively different from each other. Consequently, the curvature of the whole effective area of the second surface, which has a principal reflective refracting power in the image-forming optical system, undesirably varies to an excessively large extent, making it impossible to obtain a wide and flat image throughout the imaging field angle.

It is even more desirable to satisfy the following condition:

$$-0.02 < CXn6M < 0 \text{ (1/millimeter)} \tag{15-2}$$

It is important to satisfy the condition (15-2) when the imaging field angle exceeds 20 degrees.

It is still more desirable to satisfy the following condition:

$$-0.01 < CXn6M < 0 \text{ (1/millimeter)} \tag{15-3}$$

It is important to satisfy the condition (15-3) when the imaging field angle exceeds 30 degrees. Both the conditions (15-2) and (15-3) are necessary to satisfy in order to obtain a favorable image at a wide imaging field angle.

It is even more desirable that both at least two reflecting surfaces should satisfy the conditions (15-1) to (15-3).

Next, it is important that a surface having a particularly strong reflective refracting power in an image-forming optical system should satisfy the following condition. It is an important condition to correct all aberrations produced by a surface decentered and having only one plane of symmetry with good balance as in the case of the above condition (15-1). This condition is particularly important in an optical system using two decentered concave mirrors as in the image-forming optical system according to the present invention.

Assuming that CYn6M denotes each value of the differences CY3−CY1 and CY6−CY4 with regard to the curvature CY2 in the direction Y of that portion of at least one reflecting surface in the optical system which reflects the axial principal ray ② and the curvatures CYn (n is 1, 3 to 6) in the direction Y of portions of the surface on which the rays ①, ③ to ⑥ passing at the maximum imaging field angles impinge, respectively, it is desirable from the viewpoint of aberration correction that all the values CYn6M should satisfy the following condition:

$$-0.1 < CYn6M < 0 \text{ (1/millimeter)} \tag{16-1}$$

If CYn6M is not smaller than the upper limit of the condition (16-1), i.e. 0, or not larger than the lower limit, i.e. −0.1, the curvatures of the surface in the effective area become excessively different from each other. Consequently, the curvature of the whole effective area of the second surface, which has a principal reflective refracting power in the image-forming optical system, undesirably varies to an excessively large extent, making it impossible to obtain a wide and flat image throughout the imaging field angle.

It is even more desirable to satisfy the following condition:

$$-0.02 < CYn6M < 0 \text{ (1/millimeter)} \tag{16-2}$$

It is important to satisfy the condition (16-2) when the imaging field angle exceeds 20 degrees.

It is still more desirable to satisfy the following condition:

$$-0.01 < CYn6M < 0 \text{ (1/millimeter)} \tag{16-3}$$

It is important to satisfy the condition (16-3) when the imaging field angle exceeds 30 degrees. Both the conditions (16-2) and (16-3) are necessary to satisfy in order to obtain a favorable image at a wide imaging field angle.

It is even more desirable that both at least two reflecting surfaces should satisfy the conditions (16-1) to (16-3).

Next, assuming that two surfaces each having a reflective refracting power are denoted by a and b, respectively in order from the aperture side, and that CXab denotes CX2a/CX2b, that is, the ratio between the curvatures in the direction X of those portions of the two reflecting surfaces on which the axial principal ray from the object center impinges, it is important for the value of CXab to satisfy the following condition:

$$0 < CXab \tag{17-1}$$

The condition (17-1) defines the reflecting powers of the two reflecting surfaces as arranged to form a folded optical path therebetween. In the present invention, a direction in which the axial principal ray from the object point travels toward the aperture is defined as a positive direction of the Z-axis for the convenience of explanation. Therefore, when the concave surfaces of both the first and second reflecting surfaces are directed toward the aperture, the curvatures of the surfaces are positive. In this case, the first reflecting surface is a concave mirror with a positive power which has a concave surface directed to incident rays, and the second reflecting surface is a convex mirror with a negative power which has a convex surface directed to incident rays. In other words, the condition (17-1) defines the two reflecting surfaces to be formed from concave and convex surfaces, respectively, and it is important that the two reflecting surfaces should have positive and negative powers, respectively. If CXab is not larger than the lower limit of the condition (17-1), aberration equivalent to the Petzval sum of a coaxial optical system that is corrected by the power distribution of positive and negative powers becomes excessively large. Thus, field curvature that is convex toward the aperture side becomes excessively large and impossible to correct by another surface.

It is even more desirable to satisfy the following condition:

$$0.1 < CXab \tag{17-2}$$

It is particularly important to satisfy the condition (17-2) when the imaging field angle exceeds 20 degrees.

It is still more desirable to satisfy the following condition:

$$0.5 < CXab \tag{17-3}$$

It is particularly important to satisfy the condition (17-3) when the imaging field angle exceeds 25 degrees.

It is still more desirable to satisfy the following condition:

$$0.5 < CXab < 10 \tag{17-4}$$

It is particularly important to satisfy the condition (17-4) when the imaging field angle exceeds 30 degrees. It should be noted that if CXab is not smaller than the upper limit of the condition (17-4), it becomes impossible for the optical system to have a positive power as a whole and hence impossible to construct an image-forming optical system.

Next, assuming that two surfaces each having a reflective-refracting power are denoted by a and b, respectively in order from the aperture side, and that CYab denotes CY2a/CY2b, that is, the ratio between the curvatures in the direction Y of those portions of the two reflecting surfaces on which the axial principal ray from the object center impinges, it is important for the value of CYab to satisfy the following condition:

$$0 < CYab \quad (18\text{-}1)$$

The condition (18-1) defines the reflecting powers of the two reflecting surfaces as in the case of the condition (17-1). The condition (18-1) defines the two reflecting surfaces to be formed from concave and convex surfaces, respectively, as in the case of the condition (17-1), and it is important that the two reflecting surfaces should have positive and negative powers, respectively. If CYab is not larger than the lower limit of the condition (18-1), aberration equivalent to the Petzval sum of a coaxial optical system that is corrected by the power distribution of positive and negative powers becomes excessively large. Thus, field curvature that is convex toward the aperture side becomes excessively large and impossible to correct by another surface.

It is even more desirable to satisfy the following condition:

$$0.1 < CYab \quad (18\text{-}2)$$

It is particularly important to satisfy the condition (18-2) when the imaging field angle exceeds 20 degrees.

It is still more desirable to satisfy the following condition:

$$0.5 < CYab \quad (18\text{-}3)$$

It is particularly important to satisfy the condition (18-3) when the imaging field angle exceeds 25 degrees.

It is still more desirable to satisfy the following condition:

$$0.5 < CYab < 10 \quad (18\text{-}4)$$

It is particularly important to satisfy the condition (18-4) when the imaging field angle exceeds 30 degrees. It should be noted that if CYab is not smaller than the upper limit of the condition (18-4), it becomes impossible for the optical system to have a positive power as a whole and hence impossible to construct an image-forming optical system.

It is even more desirable to satisfy both the two sets of conditions (17-1) to (17-4) and conditions (18-1) to (18-4) simultaneously.

The above conditions (10-1) to (18-4) can be applied not only to a case where any of reflecting surfaces constituting the first image-forming optical system according to the present invention is formed from a plane-symmetry three-dimensional surface which has no axis of rotational symmetry in nor out of the surface and which has only one plane of symmetry, but also to a case where any of the reflecting surfaces is formed from an anamorphic surface having no axis of rotational symmetry in nor out of the surface, i.e. a non-rotationally symmetric surface configuration having no axis of rotational symmetry in nor out of the surface.

The above conditions (A-1) to (9-4) and conditions (10-1) to (18-4) may be used alone or in combination of two or more of them. In either case, various aberrations can be effectively corrected. The present invention anticipates either of the cases.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIGS. 27(A), 27(C) and 27(D) show one example of multimedia information recorded in the form of a dot code.

FIG. 27(B) shows a way in which an information reproducing apparatus is used.

FIG. 31 is a sectional view of an image read apparatus proposed previously by the present applicant.

DETAILED DESCRIPTION OF THE PREFERRED EMBODIMENTS

Figure 1:
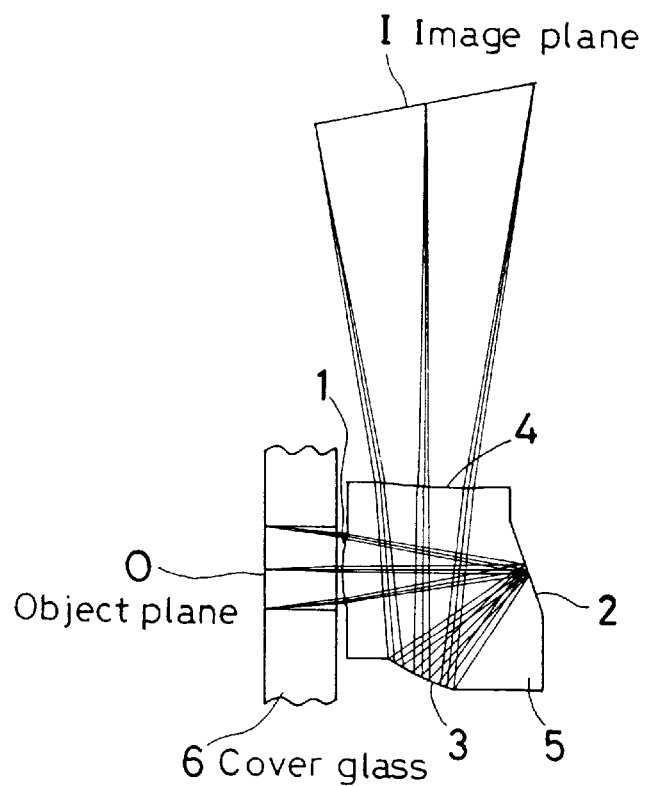
FIG. 1 is a sectional view showing Example 1 of an image-forming optical system according to the present invention.

Examples of an image read apparatus using the first image-forming optical system according to the present invention and an information reproducing system using the image read apparatus will be described below. First, Examples 1 to 6 will be described as examples of a read optical system (image-forming optical system) used in the present invention. Sectional views of Examples 1 to 6 are shown in FIGS. 1 to 6, respectively. In numerical data (shown later), surface Nos. in Examples 1 and 2 are shown as the ordinal numbers of surfaces constituting each optical system in backward tracing from the image-formation plane to the object plane, and surface Nos. in Examples 3 to 6 are shown as the ordinal numbers of surfaces constituting each optical system in forward tracing from the object plane to the image-formation plane. In actuality, therefore, in Examples 1 and 2, the object plane O is an image plane, and the image plane I is an object plane. Surface separation is shown as the distance between each particular surface and the subsequent surface measured along the axial principal ray (it should, however, be noted that the sign is inverted after reflection), and decentration is shown as the tilt angle (°) of the axis defining each particular surface with respect to the axial principal ray incident thereon (in this case, the direction of counterclockwise rotation about the axis is defined as a positive direction). Regarding the refractive index, in Examples 1 to 3, the value of refractive index for the wavelength 660 nanometers is shown. In Examples 4 to 6, the value of refractive index for the spectral d-line is shown. It should be noted that lengths are given in millimeters.

In the numerical data (shown later), the surface configuration of each three-dimensional surface is defined by the above-described equation (a). The Y- and Z-axes of each three-dimensional surface lie in the plane of the drawing. The YZ-plane is the plane of symmetry of a three-dimensional surface having only one plane of symmetry. It should be noted that terms concerning orders for which no data is shown-are zero.

In any of Examples 1 to 6, a pentagonal prism member is made of a medium having a refractive index larger than 1. Of four optical surfaces forming the prism member, two or three optical surfaces including two reflecting surfaces are each formed from a three-dimensional surface having only one plane of symmetry, and the remaining two or one surface is formed from a spherical surface, thereby imparting an image-forming ability to the prism member.

Figure 2:
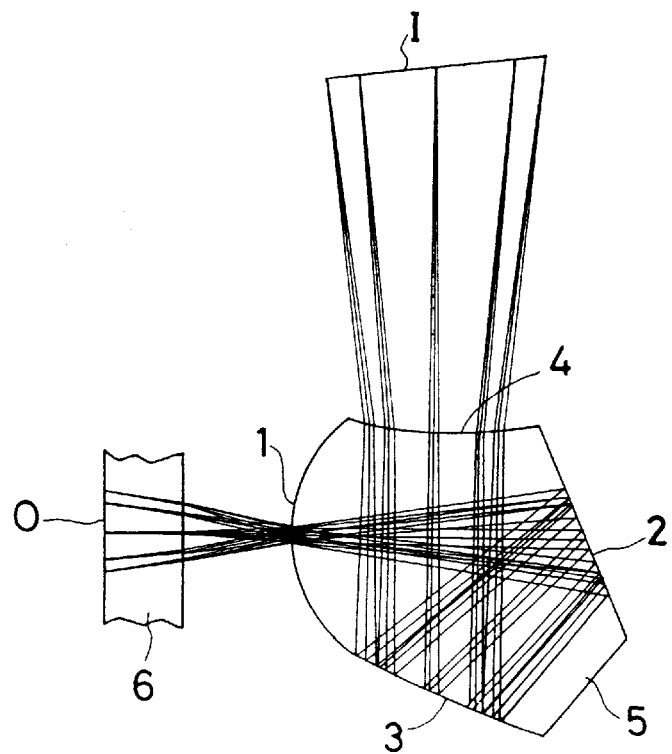
FIG. 2 is a sectional view showing Example 2 of an image-forming optical system according to the present invention.

More specifically, Examples 1 and 2 are, as shown in the sectional views of FIGS. 1 and 2, pentagonal prism members 5 each having a first surface 1, a second surface 2, a third surface 3, and a fourth surface 4. The first surface 1 and the fourth surface 4 are refracting surfaces. The second surface 2 and the third surface 3 are reflecting surfaces. The first surface 1 is formed from a spherical surface. The second surface 2, the third surface 3 and the fourth surface 4 are formed from three-dimensional surfaces. An object plane O is provided on the back side of a cover glass 6. Light rays from the object plane O pass through the cover glass 6 and enter the prism member 5 through the first surface 1. The incident light rays are reflected successively by the second surface 2 and the third surface 3. The reflected light rays intersect the light rays traveling from the first surface 1 to the second surface 2 and then exit from the prism member 5 through the fourth surface 4 to reach an image plane I (in actuality, light rays travel along an optical path reverse to the above, and the image plane I is the object plane, while the object plane O is the image plane). These examples are image-forming optical systems in which the horizontal field angle (the field angle in a direction perpendicular to the plane of the drawing) is 50 degrees; the vertical field angle (the field angle in a direction parallel to the plane of the drawing) is 37 degrees; the focal length as converted into the corresponding focal length of a coaxial system is 6 millimeters; and the pupil diameter is 1.7857 millimeters.

Figure 3:
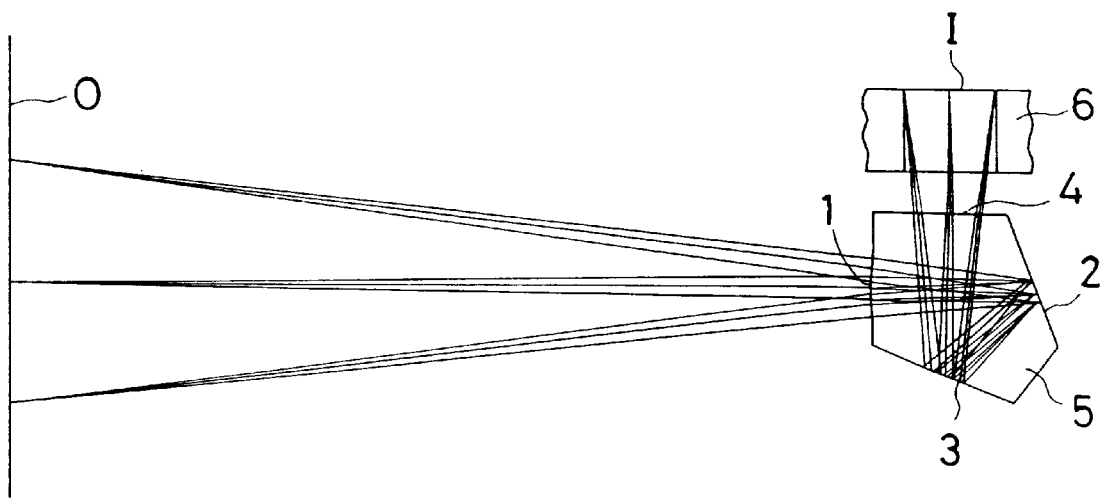
FIG. 3 is a sectional view showing Example 3 of an image-forming optical system according to the present invention.

Example 3 is, as shown in the sectional view of FIG. 3, is a pentagonal prism member 5 having a first surface 1, a second surface 2, a third surface 3, and a fourth surface 4. The first surface 1 and the fourth surface 4 are refracting surfaces. The second surface 2 and the third surface 3 are reflecting surfaces. The first surface 1 and the fourth surface 4 are formed from spherical surfaces. The second surface 2 and the third surface 3 are formed from three-dimensional surfaces. Light rays from an object plane O enter the prism member 5 through the first surface 1 and are reflected successively by the second surface 2 and the third surface 3. The reflected light rays intersect the light rays traveling from the first surface 1 to the second surface 2 and exit from the prism member 5 through the fourth surface 4 to reach an image plane I after passing through a cover glass 6. The image plane I is provided on the back side of the cover glass 6. This example is an image-forming optical system in which the horizontal field angle (the field angle in a direction perpendicular to the plane of the drawing) is 50 degrees; the vertical field angle (the field angle in a direction parallel to the plane of the drawing) is 37 degrees; the focal length as converted into the corresponding focal length of a coaxial system is 6 millimeters; and the pupil diameter is 1.7857 millimeters.

Figure 4:
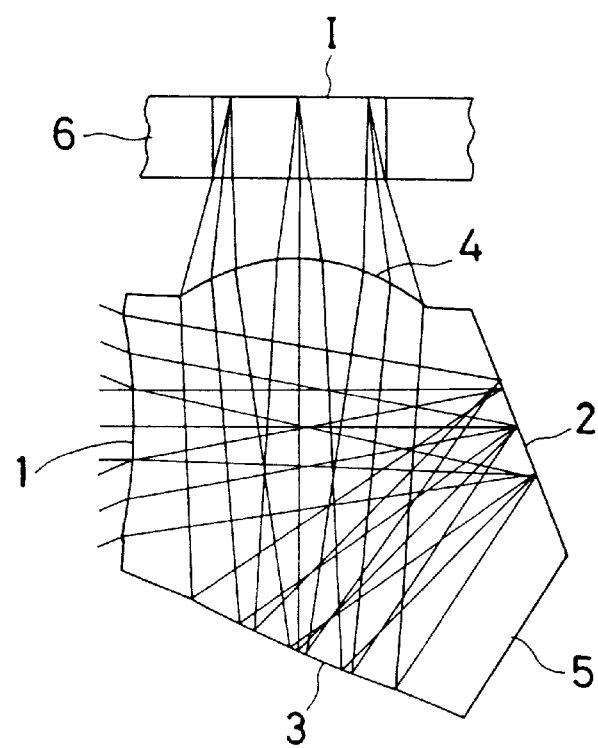
FIG. 4 is a sectional view showing Example 4 of an image-forming optical system according to the present invention.

Example 4 is, as shown in the sectional view of FIG. 4, a pentagonal prism member 5 having a first surface 1, a second surface 2, a third surface 3, and a fourth surface 4. The first surface 1 and the fourth surface 4 are refracting surfaces. The second surface 2 and the third surface 3 are reflecting surfaces. The first surface 1 is formed from a spherical surface. The second surface 2, the third surface 3 and the fourth surface 4 are formed from three-dimensional surfaces. This optical system is a projection optical system. Light rays from an infinitely distant object enter the prism member 5 through the first surface 1 and are reflected successively by the second surface 2 and the third surface 3. The reflected light rays intersect the light rays traveling from the first surface 1 to the second surface 2 and exit from the prism member 5 through the fourth surface 4 to reach an image plane I after passing through a cover glass 6. The image plane I is provided on the back side of the cover glass 6. This example is a projection optical system in which the object height in the X-axis direction (a direction perpendicular to the plane of the drawing) is 1.447 millimeters; the object height in the Y-axis direction (in a direction parallel to the plane of the drawing) is 1.0915 millimeters; and the object-side NA (Numerical Aperture) is 0.0357.

Figure 5:
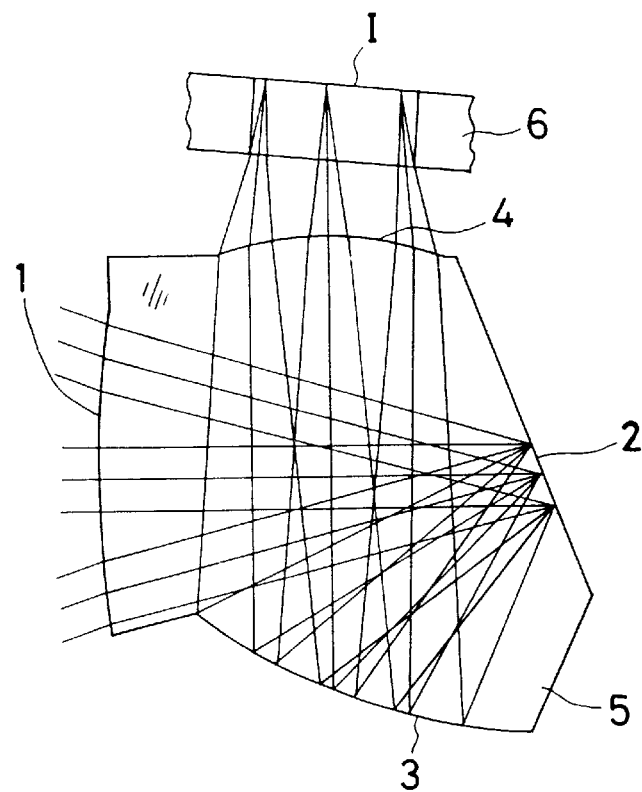
FIG. 5 is a sectional view showing Example 5 of an image-forming optical system according to the present invention.

Example 5 is, as shown in the sectional view of FIG. 5, a pentagonal prism member 5 having a first surface 1, a second surface 2, a third surface 3, and a fourth surface 4. The first surface 1 and the fourth surface 4 are refracting surfaces. The second surface 2 and the third surface 3 are reflecting surfaces. The first surface 1, the second surface 2 and the third surface 3 are formed from three-dimensional surfaces. The fourth surface 4 is formed from a spherical surface. This optical system is a projection optical system. Light rays from an infinitely distant object enter the prism member 5 through the first surface 1 and are reflected successively by the second surface 2 and the third surface 3. The reflected light rays intersect the light rays traveling from the first surface 1 to the second surface 2 and exit from the prism member 5 through the fourth surface 4 to reach an image plane I after passing through a cover glass 6. The image plane I is provided on the back side of the cover glass 6. This example is a projection optical system in which the object height in the X-axis direction (a direction perpendicular to the plane of the drawing) is 1.447 millimeters; the object height in the Y-axis direction (in a direction parallel to the plane of the drawing) is 1.0915 millimeters; and the object-side NA (Numerical Aperture) is 0.0357.

Figure 6:
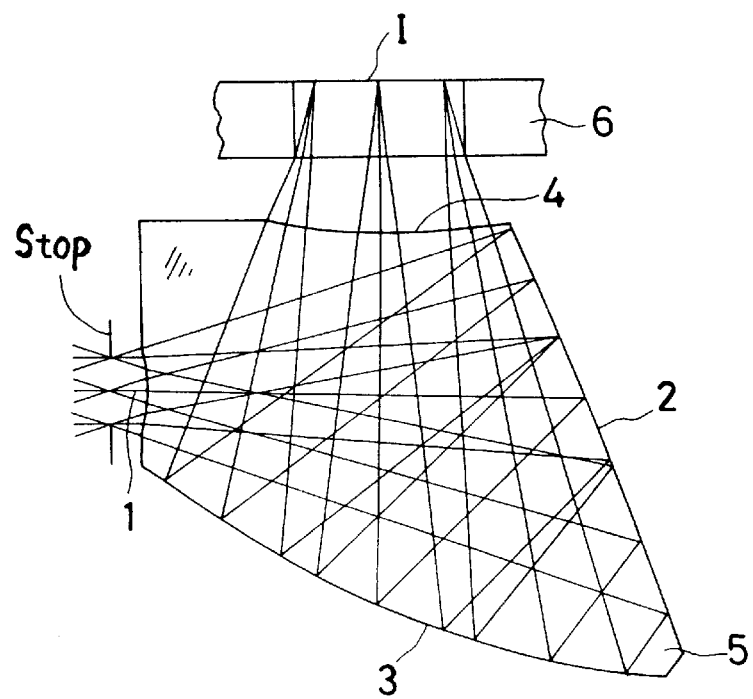
FIG. 6 is a sectional view showing Example 6 of an image-forming optical system according to the present invention.

Example 6 is, as shown in the sectional view of FIG. 6, a pentagonal prism member 5 having a first surface 1, a second surface 2, a third surface 3, and a fourth surface 4. The first surface 1 and the fourth surface 4 are refracting surfaces. The second surface 2 and the third surface 3 are reflecting surfaces. The first surface 1 is formed from a spherical surface. The second surface 2, the third surface 3 and the fourth surface 4 are formed from three-dimensional surfaces. This optical system is a projection optical system. Light rays from an infinitely distant object pass through a stop provided separately from the prism member 5 and enter the prism member 5 through the first surface 1. The incident light rays are reflected successively by the second surface 2 and the third surface 3. The reflected light rays intersect the light rays traveling from the first surface 1 to the second surface 2 and exit from the prism member 5 through the fourth surface 4 to reach an image plane I after passing through a cover glass 6. The image plane I is provided on the back side of the cover glass 6. This example is a projection optical system in which the object height in the X-axis direction (a direction perpendicular to the plane of the drawing) is 4.02 millimeters; the object height in the Y-axis direction (in a direction parallel to the plane of the drawing) is 3.03 millimeters; and the object-side NA (Numerical Aperture) is 0.0129.

Next, Examples 7 to 10 of the second image-forming optical system for an image pickup apparatus and an information reproducing apparatus according to the present invention will be described.

Figure 7:
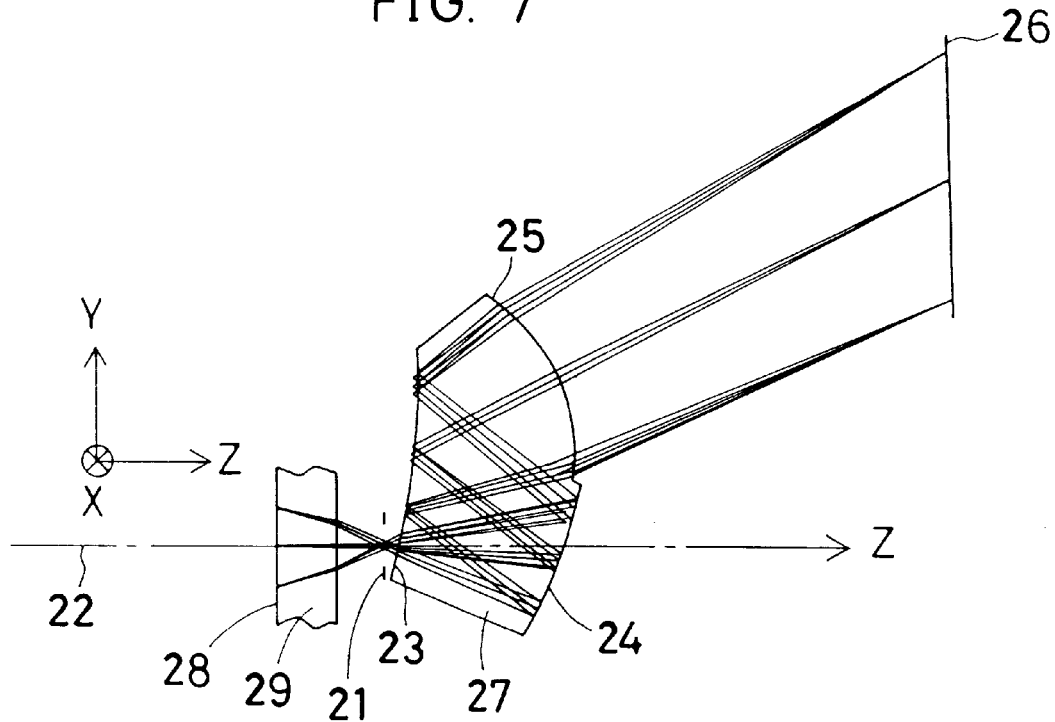
FIG. 7 is a sectional view showing Example 7 of an image-forming optical system according to the present invention.
Figure 8:
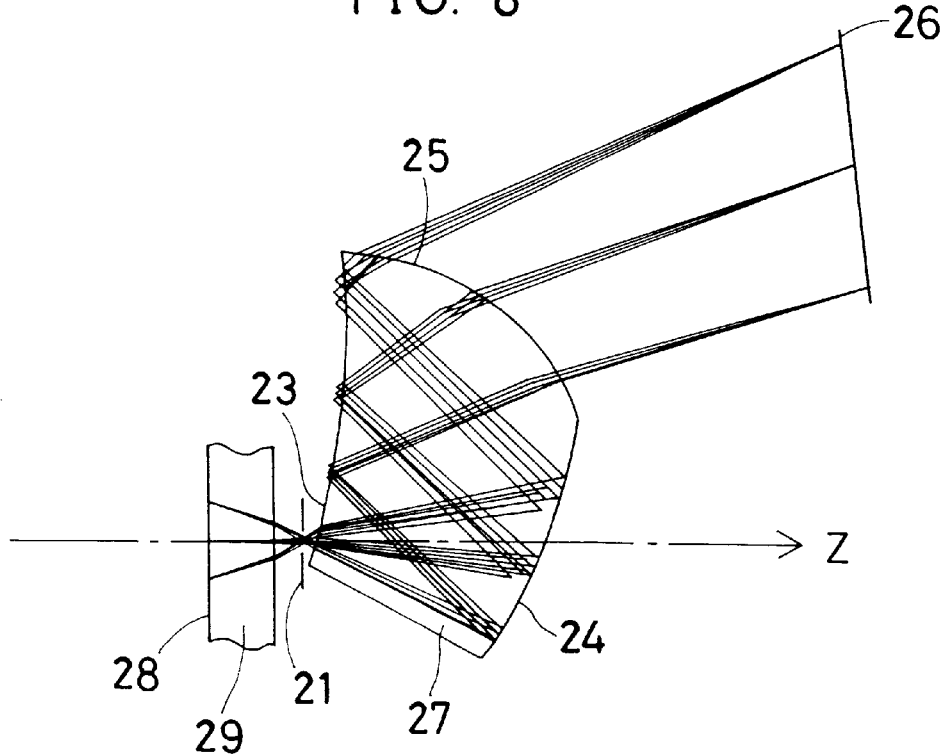
FIG. 8 is a sectional view showing Example 8 of an image-forming optical system according to the present invention.
Figure 9:
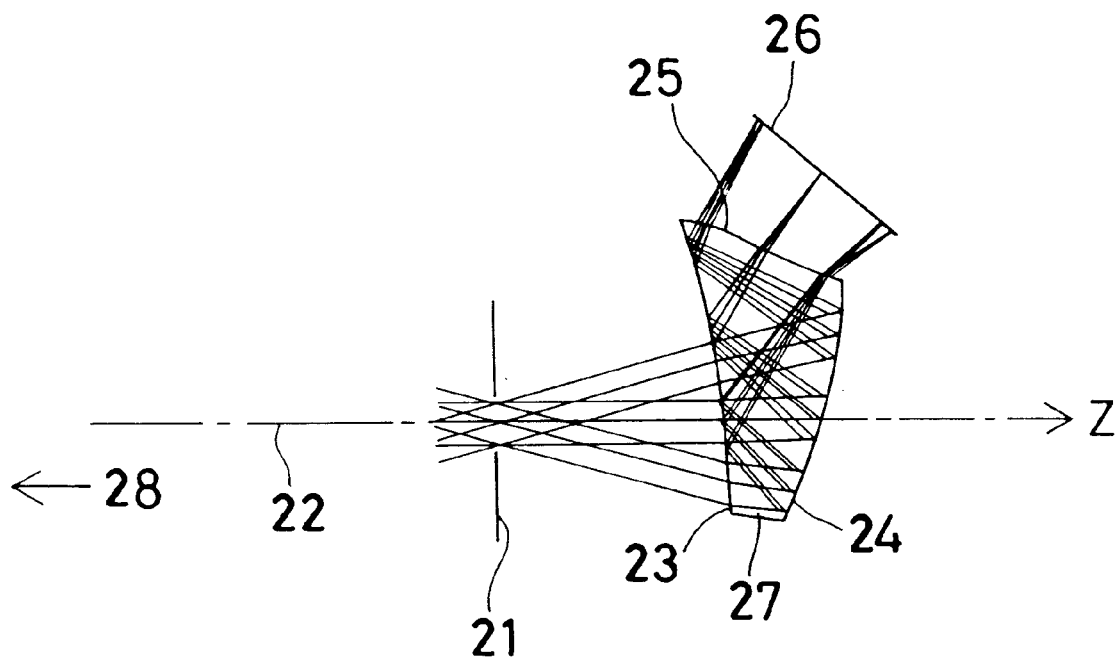
FIG. 9 is a sectional view showing Example 9 of an image-forming optical system according to the present invention.
Figure 10:
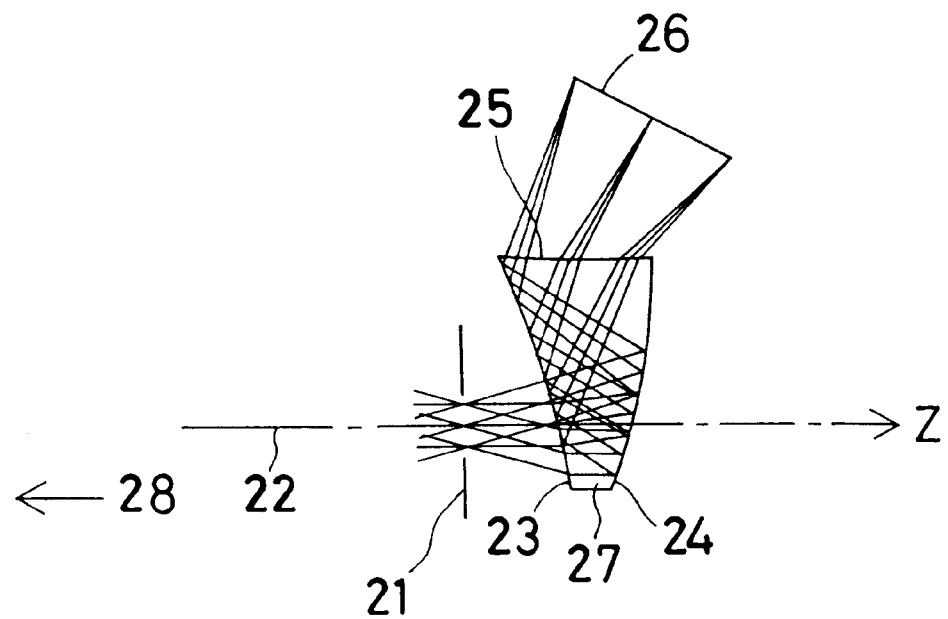
FIG. 10 is a sectional view showing Example 10 of an image-forming optical system according to the present invention.
Figure 11:
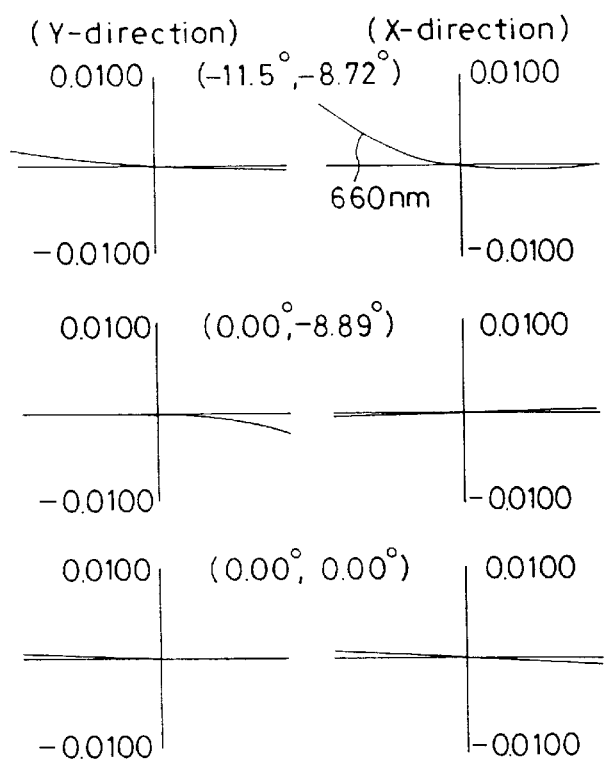
FIG. 11 is one part of an aberrational diagram illustrating lateral aberrations in the image-forming optical system according to Example 2 of the present invention.
Figure 12:
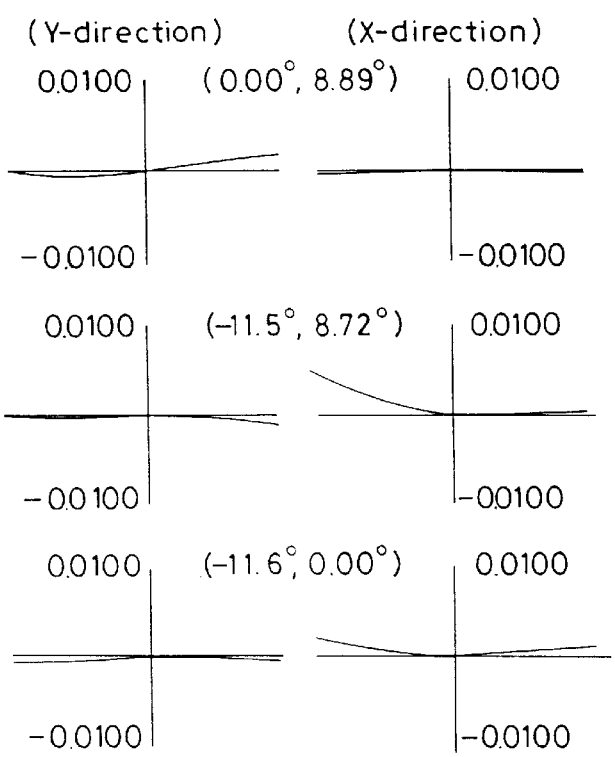
FIG. 12 is the other part of the aberrational diagram illustrating lateral aberrations in the image-forming optical system according to Example 2 of the present invention.
Figure 13:
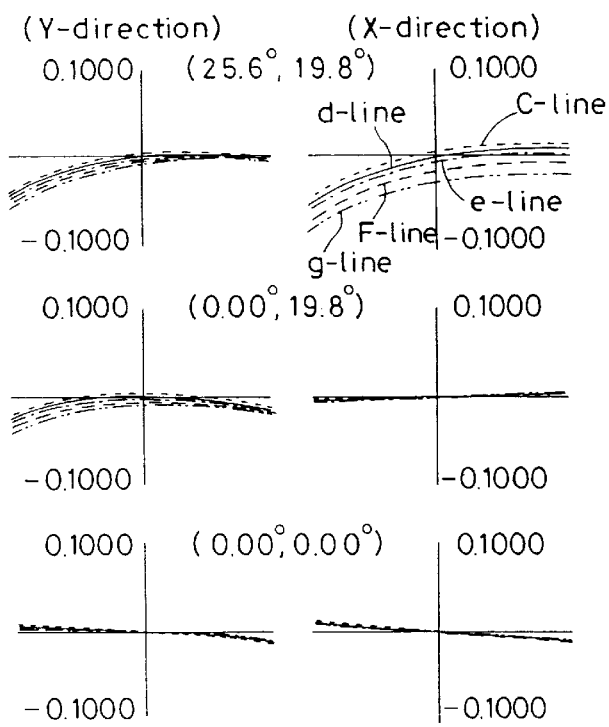
FIG. 13 is one part of an aberrational diagram illustrating lateral aberrations in the image-forming optical system according to Example 6 of the present invention.
Figure 14:
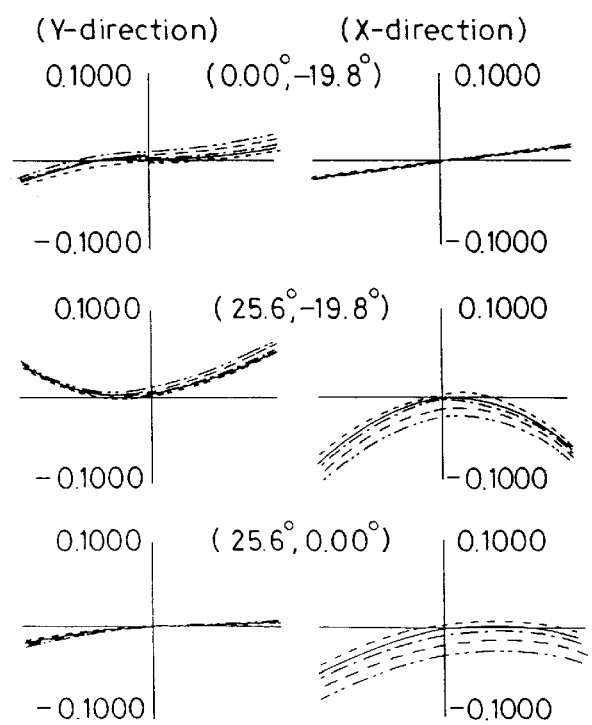
FIG. 14 is the other part of the aberrational diagram illustrating lateral aberrations in the image-forming optical system according to Example 6 of the present invention.
Figure 15:
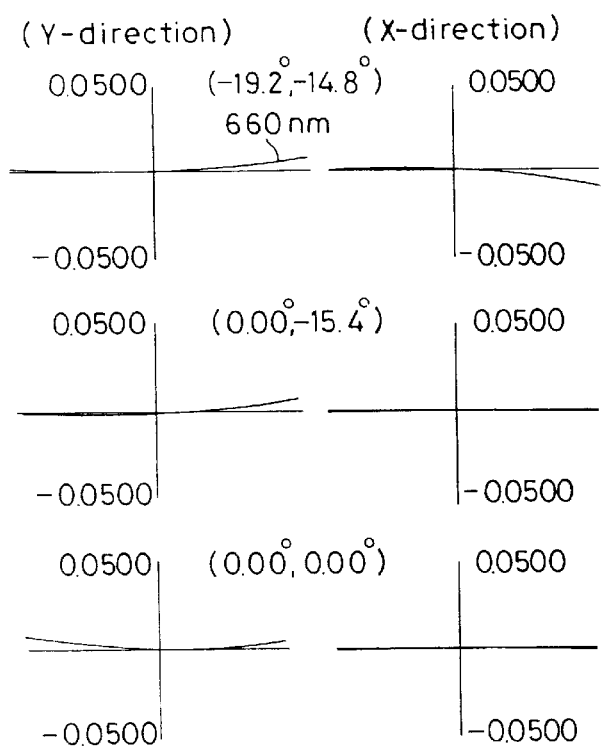
FIG. 15 is one part of an aberrational diagram illustrating lateral aberrations in the image-forming optical system according to Example 7 of the present invention.
Figure 16:
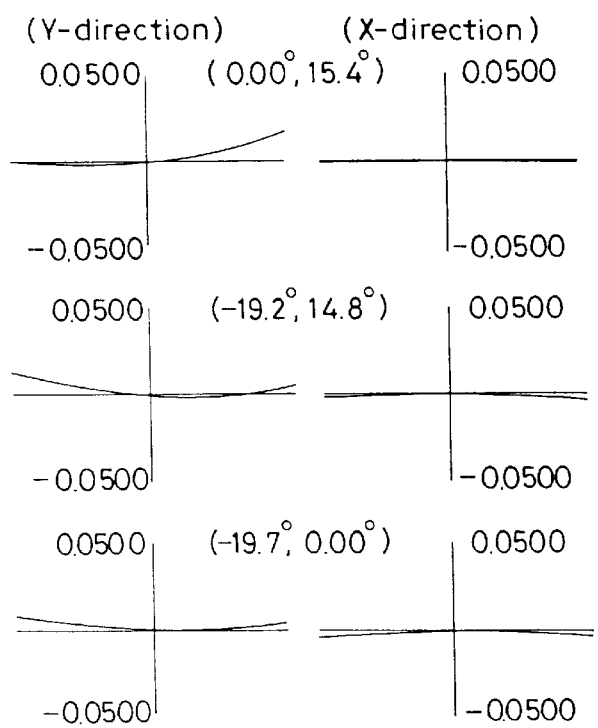
FIG. 16 is the other part of the aberrational diagram illustrating lateral aberrations in the image-forming optical system according to Example 7 of the present invention.
Figure 17:
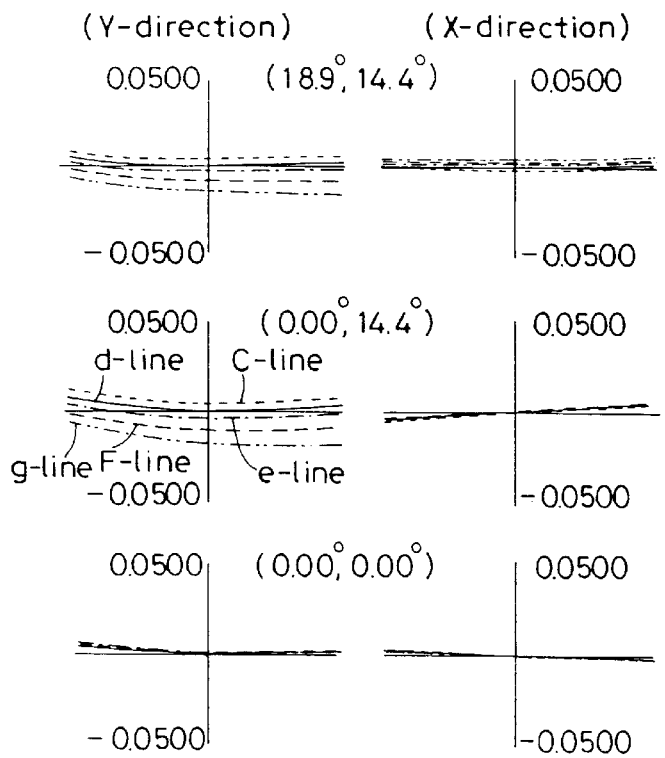
FIG. 17 is one part of an aberrational diagram illustrating lateral aberrations in the image-forming optical system according to Example 9 of the present invention.
Figure 18:
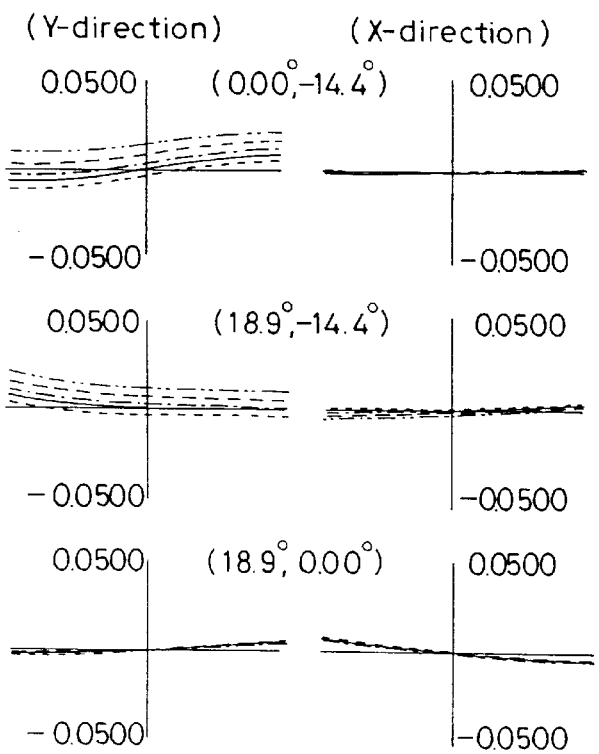
FIG. 18 is the other part of the aberrational diagram illustrating lateral aberrations in the image-forming optical system according to Example 9 of the present invention.

In constituent parameters of each example (described later), as shown in FIG. 7, an aperture 21 of an image-forming optical system 27 is defined as the origin of the optical system, and an optical axis 22 is defined by a light ray which emanates from the center of an object 28 and passes through the center (the origin) of the aperture 21. A Z-axis is taken in a direction in which light rays travel from the aperture 21 along the optical axis 22. A Y-axis is taken in a direction parallel to a plane in which light rays are bent by the image-forming optical system 27. An X-axis is taken in a direction which extends through the center of the aperture 21 at right angles to both the Z- and Y-axes. A direction in which the Z-axis extends from the aperture 21 toward the image-forming optical system 27 is defined as a positive direction of the Z-axis. A direction in which the Y-axis extends from the optical axis 22 toward an image pickup device 26 (i.e. the upward direction as viewed in the figure) is defined as a positive direction of the Y-axis. A direction in which the X-axis constitutes a right-handed system in combination with the Z- and Y-axes is defined as a positive direction of the X-axis. It should be noted that ray tracing is carried out by forward tracing from the aperture 21 of the image-forming optical system 27, which is defined as the object side, toward the image pickup device 26, which is defined as the image side.

Regarding each surface for which eccentricities Y and Z and tilt angle θ are shown, the eccentricity Y is an amount of displacement in the Y-axis direction from the aperture 21, which is the origin of the optical system, while the eccentricity Z is an amount of displacement in the Z-axis direction from the aperture 21, and the tilt angle θ is an angle of tilt with respect to the Z-axis. For the tilt angle, the counterclockwise direction is defined as a positive direction. It should be noted that the surface separation is a distance along the Z-axis.

The surface configuration of each three-dimensional surface is defined by the above-described equation (a). The Z-axis of the defining equation is the axis of the three-dimensional surface. It should be noted that those terms concerning three-dimensional surfaces for which no data is shown are zero. The refractive index is expressed by the refractive index for the spectral d-line (wavelength: 587.56 nanometers). Lengths are given in millimeters.

In any of the following Examples 7 to 10, the image-forming optical system 27 has three surfaces, i.e. a first surface 23, a second surface 24, and a third surface 25, and the space between the three surfaces is filled with a medium having a refractive index larger than 1. Light rays emanating from the object 28 travel along the optical axis 22, pass through the first surface 23 and are reflected by the second surface 24, which is a decentered reflecting surface disposed on the optical axis 22 to face the aperture 21. The reflected light rays are reflected by the first surface 23, which is disposed on the optical axis 22 to lie between the second surface 24 and the aperture 21. The reflected light rays exit from the third surface 25, which is a transmitting surface disposed to face the image pickup device 26, and enter the image pickup device 26 to form an image on the imaging plane. It should be noted that reference numeral 29 in the figures denotes a cover glass.

FIGS. 7 to 10 are sectional views of Examples 7 to 10, respectively, taken along the YZ-plane containing the optical axis 22. Constituent parameters of these examples are shown later. In Examples 7 to 10, the first surface 23, the second surface 24 and the third surface 25 are all three-dimensional surfaces defined by the above-described equation. In Example 7, imaging field angles are as follows: The horizontal field angle is 39.4 degrees, and the vertical field angle is 30.8 degrees. The pupil diameter is 1.2 millimeters. In Example 8, imaging field angles are as follows: The horizontal field angle is 45.8 degrees, and the vertical field angle is 36.2 degrees. The pupil diameter is 1.2 millimeters. In Examples 9 and 10, imaging field angles are as follows: The horizontal field angle is 37.8 degrees, and the vertical field angle is 28.8 degrees. The pupil diameter is 0.875 millimeter.

The constituent parameters of the above-described Examples 1 to 10 are as follows:

| | | Example 1 | | |
|---|---|---|---|---|
| Surface No. | Radius of curvature | Surface separation | Tilt angle | Refractive index |
| (object plane) | ∞ | 2 | | 1.51374 |
| 1 | ∞ | 0.1 | | |
| 2 | 5.14554 | 5 | | 1.52246 |
| 3 | Three-dimensional surface (1) (reflect surface; stop) | −4 | 22.5° | 1.52246 |
| 4 | Three-dimensional surface (2) (reflect surface) | 5 | 22.5° | 1.52246 |
| 5 | Three-dimensional surface (3) | 10 | | |
| (image plane) | ∞ | | 10.85° | |

Three-dimensional surface (1)

$C_5$ −1.7259 × 10$^{-2}$   $C_7$ −2.7401 × 10$^{-2}$   $C_8$ 1.1803 × 10$^{-3}$
$C_{10}$ 1.4324 × 10$^{-3}$   $C_{12}$ 5.2923 × 10$^{-4}$

Three-dimensional surface (2)

$C_5$ 2.4038 × 10$^{-2}$   $C_7$ 2.0287 × 10$^{-2}$   $C_8$ 1.8232 × 10$^{-3}$
$C_{10}$ 2.3734 × 10$^{-3}$   $C_{12}$ −4.2358 × 10$^{-5}$   $C_{14}$ −1.4306 × 10$^{-3}$
$C_{16}$ −2.1648 × 10$^{-4}$   $C_{17}$ −1.5709 × 10$^{-5}$   $C_{19}$ 2.5253 × 10$^{-4}$
$C_{21}$ −9.0495 × 10$^{-5}$

Three-dimensional surface (3)

$C_5$ 2.0512 × 10$^{-2}$   $C_7$ −6.8638 × 10$^{-3}$   $C_8$ 1.4451 × 10$^{-2}$
$C_{10}$ 1.1589 × 10$^{-2}$   $C_{12}$ 2.9399 × 10$^{-3}$   $C_{14}$ −7.5491 × 10$^{-4}$
$C_{16}$ 6.6724 × 10$^{-4}$   $C_{17}$ 1.4057 × 10$^{-4}$   $C_{19}$ −6.7043 × 10$^{-5}$
$C_{21}$ −1.4187 × 10$^{-4}$

| | | Example 2 | | |
|---|---|---|---|---|
| Surface No. | Radius of curvature | Surface separation | Tilt angle | Refractive index |
| (object plane) | ∞ | 2 | | 1.51374 |
| 1 | ∞ | 3.2357 | | |
| 2 | 4.138 (stop) | 8.0000 | | 1.52246 |
| 3 | Three-dimensional surface (1) (reflect surface) | −6.0000 | 22.5° | 1.52246 |
| 4 | Three-dimensional surface (2) (reflect surface) | 7.0000 | 22.5° | 1.52246 |
| 5 | Three-dimensional surface (3) | 9.7955 | | |
| (image plane) | ∞ | | 6.57° | |

Three-dimensional surface (1)

$C_5$ −1.3741 × 10$^{-2}$   $C_7$ −1.5219 × 10$^{-2}$   $C_8$ 4.1326 × 10$^{-4}$
$C_{10}$ −1.1718 × 10$^{-4}$   $C_{12}$ 2.7049 × 10$^{-4}$   $C_{14}$ 4.1434 × 10$^{-4}$
$C_{16}$ 2.7833 × 10$^{-4}$   $C_{17}$ −7.9413 × 10$^{-6}$   $C_{19}$ −3.9758 × 10$^{-6}$
$C_{21}$ −9.7917 × 10$^{-5}$

Three-dimensional surface (2)

$C_5$ 8.8248 × 10$^{-3}$   $C_7$ 1.2101 × 10$^{-2}$   $C_8$ 9.7701 × 10$^{-4}$
$C_{10}$ 3.0621 × 10$^{-4}$   $C_{12}$ 1.1704 × 10$^{-4}$   $C_{14}$ 5.0194 × 10$^{-5}$
$C_{16}$ 4.4158 × 10$^{-5}$   $C_{17}$ −2.2647 × 10$^{-5}$   $C_{19}$ −2.2923 × 10$^{-5}$

-continued

Example 2

$C_{21}$ -9.9488 × $10^{-6}$

Three-dimensional surface (3)

$C_5$ 4.8179 × $10^{-2}$     $C_7$ 4.8589 × $10^{-2}$     $C_8$ 6.3509 × $10^{-3}$
$C_{10}$ 2.1715 × $10^{-3}$  $C_{12}$ 1.0285 × $10^{-3}$

Example 3

| Surface No. | Radius of curvature | Surface separation | Tilt angle | Refractive index |
|---|---|---|---|---|
| (object plane) | ∞ | 22.1708 | | |
| 1 | 4.390 | 4.000 | | 1.52246 |
| 2 | Three-dimensional surface (1) (reflect surface; stop) | -3.0000 | | 1.52246 |
| 3 | Three-dimensional surface (2) (reflect surface) | 4.0000 | 22.5° | 1.52246 |
| 4 | -42.808 | 1.0000 | 22.5° | |
| 5 | ∞ | 2.0000 | | 1.51374 |
| (image plane) | ∞ | | -0.21° | |

Three-dimensional surface (1)

$C_5$ -4.4927 × $10^{-3}$    $C_7$ -5.0638 × $10^{-3}$    $C_8$ 1.1087 × $10^{-4}$
$C_{10}$ 6.7113 × $10^{-5}$  $C_{19}$ 7.2815 × $10^{-3}$

Three-dimensional surface (2)

$C_5$ 5.9327 × $10^{-3}$       $C_7$ 7.3558 × $10^{-3}$       $C_8$ 2.4745 × $10^{-4}$
$C_{10}$ 2.6009 × $10^{-4}$    $C_{12}$ -1.0058 × $10^{-3}$   $C_{14}$ -1.0969 × $10^{-3}$
$C_{16}$ -1.3196 × $10^{-3}$   $C_{17}$ 8.6909 × $10^{-5}$    $C_{19}$ 2.2790 × $10^{-4}$
$C_{21}$ 7.8089 × $10^{-5}$    $C_{23}$ 1.0124 × $10^{-3}$    $C_{25}$ -1.4448 × $10^{-3}$
$C_{27}$ 8.5070 × $10^{-4}$    $C_{29}$ 6.4542 × $10^{-4}$

Example 4

| Surface No. | Radius of curvature | Surface separation | Tilt angle | Refractive index |
|---|---|---|---|---|
| (object plane) | ∞ | ∞ | | |
| 1 | -15.445 | 10.0000 | | 1.5254 |
| 2 | Three-dimensional surface (1) (reflect surface; stop) | -8.0000 | | 1.5254 |
| 3 | Three-dimensional surface (2) (reflect surface) | 10.0000 | 22.5° | 1.5254 |
| 4 | Three-dimensional surface (3) | 2.0000 | 22.5° | |
| 5 | ∞ | 2.0000 | | 1.51633 |
| (image plane) | ∞ | | | |

Three-dimensional surface (1)

$C_5$ -2.1823 × $10^{-3}$     $C_7$ -7.2575 × $10^{-3}$    $C_8$ 5.3928 × $10^{-5}$
$C_{10}$ -2.2392 × $10^{-4}$

Three-dimensional surface (2)

$C_5$ 1.3258 × $10^{-2}$       $C_7$ 8.2532 × $10^{-3}$       $C_8$ 1.1914 × $10^{-4}$
$C_{10}$ 1.9741 × $10^{-4}$    $C_{12}$ -5.4958 × $10^{-5}$   $C_{14}$ -6.2520 × $10^{-5}$
$C_{16}$ 2.9156 × $10^{-5}$    $C_{17}$ 3.0366 × $10^{-5}$    $C_{19}$ 7.1622 × $10^{-5}$
$C_{21}$ -1.7677 × $10^{-5}$   $C_{23}$ -2.2836 × $10^{-6}$   $C_{25}$ -1.0994 × $10^{-5}$
$C_{27}$ 8.0997 × $10^{-6}$    $C_{29}$ -2.6965 × $10^{-5}$   $C_{30}$ -2.0544 × $10^{-6}$
$C_{32}$ 6.4715 × $10^{-6}$    $C_{34}$ -1.1104 × $10^{-5}$   $C_{35}$ 3.6881 × $10^{-5}$

Three-dimensional surface (3)

$C_5$ 1.3951 × $10^{-1}$       $C_7$ -1.8229 × $10^{-1}$     $C_8$ 5.8170 × $10^{-4}$
$C_{10}$ 3.6935 × $10^{-3}$    $C_{12}$ 2.8695 × $10^{-3}$   $C_{14}$ 6.2821 × $10^{-3}$
$C_{15}$ 3.6956 × $10^{-3}$    $C_{17}$ 4.3385 × $10^{-4}$   $C_{19}$ 1.0779 × $10^{-4}$

-continued

Example 4

| | | |
|---|---|---|
| $C_{21}$ −2.6104 × $10^{-4}$ | $C_{23}$ −7.1825 × $10^{-5}$ | $C_{25}$ −1.2960 × $10^{-4}$ |
| $C_{27}$ −1.6079 × $10^{-4}$ | $C_{29}$ −7.7523 × $10^{-5}$ | $C_{30}$ −2.7657 × $10^{-4}$ |
| $C_{32}$ 1.5948 × $10^{-5}$ | $C_{34}$ −1.3703 × $10^{-5}$ | $C_{36}$ 7.5755 × $10^{-6}$ |

Example 5

| Surface No. | Radius of curvature | Surface separation | Tilt angle | Refractive index |
|---|---|---|---|---|
| (object plane) | ∞ | ∞ | | |
| 1 | Three-dimensional surface (1) | 12.0000 | | 1.5254 |
| 2 | Three-dimensional surface (2) (reflect surface; stop) | −8.0000 | | 1.5254 |
| 3 | Three-dimensional surface (3) (reflect surface) | 12.0000 | 22.5° | 1.5254 |
| 4 | −9.002 | 2.0000 | 22.5° | |
| 5 | ∞ | 2.0000 | | 1.51633 |
| (image plane) | ∞ | | −4.49° | |

Three-dimensional surface (1)

| | | |
|---|---|---|
| $C_5$ 1.5730 × $10^{-2}$ | $C_7$ −7.8390 × $10^{-2}$ | $C_8$ 4.5149 × $10^{-4}$ |
| $C_{10}$ 2.9787 × $10^{-4}$ | $C_{12}$ −5.5892 × $10^{-5}$ | $C_{14}$ 4.5865 × $10^{-4}$ |
| $C_{16}$ 3.1477 × $10^{-4}$ | $C_{17}$ 6.4385 × $10^{-6}$ | $C_{19}$ −8.3800 × $10^{-5}$ |
| $C_{21}$ −1.0065 × $10^{-5}$ | | |

Three-dimensional surface (2)

| | | |
|---|---|---|
| $C_5$ 3.2524 × $10^{-2}$ | $C_7$ −1.0185 × $10^{-2}$ | $C_8$ −1.7137 × $10^{-3}$ |
| $C_{10}$ −6.8674 × $10^{-4}$ | $C_{12}$ −3.9125 × $10^{-4}$ | $C_{14}$ −5.1878 × $10^{-4}$ |
| $C_{15}$ 2.0601 × $10^{-5}$ | | |

Three-dimensional surface (3)

| | | |
|---|---|---|
| $C_5$ 2.7073 × $10^{-2}$ | $C_7$ 1.3793 × $10^{-2}$ | $C_8$ −3.6082 × $10^{-4}$ |
| $C_{10}$ −3.8227 × $10^{-5}$ | $C_{12}$ 1.0380 × $10^{-5}$ | $C_{14}$ −1.4753 × $10^{-4}$ |
| $C_{16}$ −5.0446 × $10^{-5}$ | $C_{17}$ −2.2375 × $10^{-6}$ | $C_{19}$ −1.2995 × $10^{-5}$ |
| $C_{21}$ 3.1799 × $10^{-7}$ | | |

Example 6

| Surface No. | Radius of curvature | Surface separation | Tilt angle | Refractive index |
|---|---|---|---|---|
| (object plane) | ∞ | ∞ | | |
| 1 | ∞ (stop) | 1.0000 | | |
| 2 | −4.932 | 12.0000 | | 1.5254 |
| 3 | Three-dimensional surface (1) (reflect surface) | −8.0000 | | 1.5254 |
| 4 | Three-dimensional surface (2) (reflect surface) | 10.0000 | 22.5° | 1.5254 |
| 5 | Three-dimensional surface (3) | 2.0000 | 22.5° | |
| 6 | ∞ | 2.0000 | | 1.51633 |
| (image plane) | ∞ | | | |

Three-dimensional surface (1)

| | | |
|---|---|---|
| $C_5$ −7.2939 × $10^{-3}$ | $C_7$ −1.4353 × $10^{-2}$ | $C_8$ −3.5114 × $10^{-4}$ |
| $C_{10}$ −3.3815 × $10^{-4}$ | $C_{12}$ 3.1703 × $10^{-5}$ | $C_{14}$ −2.6397 × $10^{-5}$ |
| $C_{16}$ 3.2783 × $10^{-5}$ | $C_{17}$ 2.1756 × $10^{-6}$ | $C_{19}$ 5.8039 × $10^{-6}$ |
| $C_{21}$ −5.2429 × $10^{-6}$ | | |

Three-dimensional surface (2)

| | | |
|---|---|---|
| $C_5$ 1.7055 × $10^{-2}$ | $C_7$ 1.2235 × $10^{-2}$ | $C_8$ −2.9021 × $10^{-5}$ |
| $C_{10}$ −1.8169 × $10^{-4}$ | $C_{12}$ 3.4015 × $10^{-5}$ | $C_{14}$ 1.4158 × $10^{-5}$ |
| $C_{16}$ 3.8495 × $10^{-5}$ | $C_{17}$ 1.1846 × $10^{-5}$ | $C_{19}$ 5.3599 × $10^{-6}$ |
| $C_{21}$ −4.2183 × $10^{-6}$ | | |

Three-dimensional surface (3)

| | | |
|---|---|---|
| $C_5$ 1.4365 × $10^{-2}$ | $C_7$ −5.2713 × $10^{-2}$ | $C_8$ −6.0365 × $10^{-4}$ |

-continued

Example 6

| | | |
|---|---|---|
| $C_{10}$ $-2.1749 \times 10^{-3}$ | $C_{12}$ $1.0886 \times 10^{-3}$ | $C_{14}$ $2.4072 \times 10^{-3}$ |
| $C_{16}$ $1.1789 \times 10^{-3}$ | $C_{17}$ $2.5576 \times 10^{-4}$ | $C_{19}$ $1.4731 \times 10^{-4}$ |
| $C_{21}$ $-2.1692 \times 10^{-4}$ | | |

Example 7

| Surface No. | Radius of curvature | Surface separation | Refractive index | Abbe's No. |
|---|---|---|---|---|
| | | | (Eccentricity) | (Tilt angle) |
| 1 | ∞ (object plane) | 2 | 1.5163 | 64.1 |
| 2 | ∞ | 1.23 | | |
| 3 | ∞ (aperture) | | | |
| 4 (first surface) | Three-dimensional surface (1) | | 1.5254 | 56.25 |
| | | | (from aperture position) | |
| | | Y | 2.363 | θ  −4.77° |
| | | Z | 0.766 | |
| 5 (second surface) (reflecting surface) | Three-dimensional surface (2) | | 1.5254 | 56.25 |
| | | | (from aperture surface) | |
| | | Y | −0.350 | θ  −20.521° |
| | | Z | 4.478 | |
| 6 (first surface) (reflecting surface) | Three-dimensional surface (1) | | 1.5254 | 56.25 |
| | | | (from aperture position) | |
| | | Y | 2.363 | θ  −4.77° |
| | | Z | 0.766 | |
| 7 (third surface) | Three-dimensional surface (3) | | (from aperture position) | |
| | | Y | 4.213 | θ  26.161° |
| | | Z | 4.457 | |
| 8 (imaging plane) | ∞ | | (from aperture position) | |
| | | Y | 9.210 | θ  2.532° |
| | | Z | 14.270 | |

Three-dimensional surface (1)

| | | |
|---|---|---|
| $C_5$ $-29.527 \times 10^{-2}$ | $C_7$ $-4.8238 \times 10^{-2}$ | $C_8$ $1.3305 \times 10^{-3}$ |
| $C_{10}$ $2.4417 \times 10^{-3}$ | | |

Three-dimensional surface (2)

| | | |
|---|---|---|
| $C_5$ $-4.6876 \times 10^{-2}$ | $C_7$ $-5.4964 \times 10^{-2}$ | $C_8$ $2.0115 \times 10^{-3}$ |
| $C_{10}$ $2.3652 \times 10^{-3}$ | | |

Three-dimensional surface (3)

| | |
|---|---|
| $C_5$ $-1.2504 \times 10^{-1}$ | $C_7$ $-1.1816 \times 10^{-1}$ |

Example 8

| Surface No. | Radius of curvature | Surface separation | Refractive index | Abbe's No. |
|---|---|---|---|---|
| | | | (Eccentricity) | (Tilt angle) |
| 1 | ∞ (object plane) | 2 | 1.5163 | 64.1 |
| 2 | ∞ | 0.823 | | |
| 3 | ∞ (aperture) | | | |
| 4 (first surface) | Three-dimensional surface (1) | | 1.5254 | 56.25 |
| | | | (from aperture position) | |
| | | Y | 3.734 | θ  −3.569° |
| | | Z | 0.997 | |
| 5 (second surface) (reflecting surface) | Three-dimensional surface (2) | | 1.5254 | 56.25 |
| | | Y | −0.619 | θ  −23.901° |
| | | Z | 5.917 | |
| 6 (first surface) (reflecting surface) | Three-dimensional surface (1) | | 1.5254 | 56.25 |
| | | | (from apertures position) | |
| | | Y | 3.734 | θ  −3.569° |
| | | Z | 0.997 | |
| 7 | Three-dimensional surface (3) | | (from aperture position) | |

-continued

Example 8

| | | | | | |
|---|---|---|---|---|---|
| (third surface) | | | Y | 6.151 | θ 59.154° |
| | | | Z | 4.532 | |
| 8 | ∞ | | | (from aperture position) | |
| (imaging plane) | | | Y | 9.442 | θ 6.673° |
| | | | Z | 13.965 | |

Three-dimensional surface (1)

$C_5$ −2.5028 × $10^{-2}$    $C_7$ −4.8759 × $10^{-2}$    $C_8$ 1.6355 × $10^{-3}$
$C_{10}$ 2.8131 × $10^{-3}$

Three-dimensional surface (2)

$C_5$ −3.9920 × $10^{-2}$    $C_7$ −4.8922 × $10^{-2}$    $C_8$ 2.3119 × $10^{-3}$
$C_{10}$ 2.4299 × $10^{-3}$

Three-dimensional surface (3)

$C_5$ −7.7079 × $10^{-2}$    $C_7$ −9.2542 × $10^{-2}$    $C_8$ 2.7353 × $10^{-3}$
$C_{10}$ 3.1196 × $10^{-3}$

Example 9

| Surface No. | Radius of curvature | Surface separation | Refractive index (Eccentricity) | Abbe's No. (Tilt angle) |
|---|---|---|---|---|
| 1 | ∞(object plane) | ∞ | | |
| 2 | μ(aperture) | | | |
| 3 (first surface) | Three-dimensional surface (1) | | 1.5254 (from aperture position) Y −8.833 Z 7.300 | 56.25 θ 26.068° |
| 4 (second surface) (reflecting surface) | Three-dimensional surface (2) | | 1.5254 (from aperture position) Y 4.249 Z 7.754 | 56.25 θ 5.868° |
| 5 (first surface) (reflecting surface) | Three-dimensional surface (1) | | 1.5254 Y −8.833 Z 7.300 | 56.25 θ 26.068° |
| 6 (third surface) | Three-dimensional surface (3) | | (from aperture position) Y 3.014 Z 7.696 | θ 96.730° |
| 7 | ∞ | | (from aperture position) | |

-continued

Example 9

| | | | | | |
|---|---|---|---|---|---|
| (imaging plane) | | | Y | 5.116 | θ 51.793° |
| | | | Z | 7.289 | |

Three-dimensional surface (1)

| | | | | | |
|---|---|---|---|---|---|
| $C_5$ | 2.0181 × $10^{-2}$ | $C_7$ | −8.8163 × $10^{-2}$ | $C_8$ | 6.0028 × $10^{-4}$ |
| $C_{10}$ | 1.3118 × $10^{-2}$ | $C_{12}$ | 5.4409 × $10^{-5}$ | $C_{14}$ | −1.3941 × $10^{-3}$ |
| $C_{16}$ | 1.0778 × $10^{-3}$ | $C_{17}$ | −9.3095 × $10^{-6}$ | $C_{19}$ | 6.7120 × $10^{-5}$ |
| $C_{21}$ | −1.6643 × $10^{-4}$ | | | | |

Three-dimensional surface (2)

| | | | | | |
|---|---|---|---|---|---|
| $C_5$ | −5.8595 × $10^{-2}$ | $C_7$ | −4.5514 × $10^{-2}$ | $C_8$ | −4.4606 × $10^{-3}$ |
| $C_{10}$ | −2.1234 × $10^{-3}$ | $C_{12}$ | −8.9557 × $10^{-4}$ | $C_{14}$ | −8.1709 × $10^{-4}$ |
| $C_{16}$ | −1.2325 × $10^{-4}$ | $C_{17}$ | −6.0121 × $10^{-5}$ | $C_{19}$ | −1.9125 × $10^{-5}$ |
| $C_{21}$ | 4.7085 × $10^{-5}$ | | | | |

Three-dimensional surface (3)

| | | | | | |
|---|---|---|---|---|---|
| $C_5$ | 4.5407 × $10^{-1}$ | $C_7$ | 1.8185 × $10^{-2}$ | $C_8$ | −1.3142 × $10^{-1}$ |
| $C_{10}$ | 6.1294 × $10^{-2}$ | $C_{12}$ | 9.2625 × $10^{-3}$ | $C_{14}$ | −8.2125 × $10^{-3}$ |
| $C_{16}$ | 1.0519 × $10^{-2}$ | | | | |

Example 10

| Surface No. | Radius of curvature | Surface separation | Refractice index (Eccentricity) | Abbe's No. (Tilt angle) |
|---|---|---|---|---|
| 1 | ∞ (object plane) | ∞ | | |
| 2 | ∞ (aperture) | | | |
| 3 (first surface) | Three-dimensional surface (1) | | 1.5254 (from aperture position) Y 1.540 Z 1.634 | 56.25 θ 19.053° |
| 4 (second surface) (reflecting surface) | Three-dimensional surface (2) | | 1.5254 (from aperture position) Y 0.337 Z 3.849 | 56.25 θ −12.011° |
| 5 (first surface) | Three-dimensional surface (3) | | 1.5254 (from aperture position) | 56.25 |

-continued

Example 10

| (reflecting surface) | | Y | 1.540 | θ | 19.053° |
|---|---|---|---|---|---|
| | | Z | 1.634 | | |
| 6 | Three-dimensional surface (3) | (from aperture position) | | | |
| (third surface) | | Y | 3.545 | θ | 88.404° |
| | | Z | 1.834 | | |
| 7 | ∞ | (from aperture position) | | | |
| (imaging plane) | | Y | 6.492 | θ | 62.548° |
| | | Z | 4.314 | | |

Three-dimensional surface (1)

$C_5$ −9.4313 × 10⁻³    $C_7$ −1.2240 × 10⁻²    $C_8$ 3.4467 × 10⁻⁴
$C_{10}$ 1.6850 × 10⁻³    $C_{12}$ −2.7559 × 10⁻⁴    $C_{14}$ −7.4167 × 10⁻⁴
$C_{16}$ 3.0621 × 10⁻⁵

Three-dimensional surface (2)

$C_5$ −3.1609 × 10⁻²    $C_7$ −3.6090 × 10⁻²    $C_8$ 1.1920 × 10⁻³
$C_{10}$ 1.2018 × 10⁻³    $C_{12}$ −4.2669 × 10⁻⁴    $C_{14}$ −4.9528 × 10⁻⁴
$C_{16}$ 1.8471 × 10⁻⁴

Three-dimensional surface (3)

$C_5$ 6.7068 × 10⁻³    $C_7$ 5.0952 × 10⁻²    $C_8$ −4.1853 × 10⁻³
$C_{10}$ 4.2567 × 10⁻³

Lateral aberrations in Examples 2, 6, 7 and 9 are graphically shown in FIGS. 11 to 12, FIGS. 13 to 14, FIGS. 15 to 16, and FIGS. 17 to 18, respectively. In these aberrational diagrams, the parenthesized numerals denote [horizontal field angle (field angle in a direction perpendicular to the plane of the drawing), vertical field angle (field angle in a direction parallel to the plane of the drawing)], and lateral aberrations at the field angles are shown.

Values of parameters concerning the conditions (A-1), (B-1), (1-1) to (9-1) in Examples 1 to 6 relating to the first image-forming optical system are shown below [regarding the conditions other than the condition (9-1), values relating to the first reflecting surface 2 are shown in the upper row, and values relating to the second reflecting surface 3 are shown in the lower row; regarding the condition (9-1), the minimum values of the two reflecting surfaces are shown in the upper row, and the maximum values are shown in the lower row].

| Cond. | Ex. 1 | Ex. 2 | Ex. 3 | Ex. 4 | Ex. 5 | Ex. 6 |
|---|---|---|---|---|---|---|
| A-1 | −0.0550 | −0.0304 | −0.0101 | −0.0145 | −0.1568 | −0.0288 |
|  | 0.0405 | 0.0242 | 0.0147 | 0.0165 | −0.0204 | 0.0244 |
| B-1 | −0.0349 | −0.0274 | −0.009 | −0.0044 | 0.0315 | −0.0148 |
|  | 0.0480 | 0.0178 | 0.0199 | 0.0265 | 0.0650 | 0.0341 |
| 1-1 | 0.8900 | 1.4118 | 0.4068 | 1.6822 | 1.8107 | 3.7759 |
|  | 0.9893 | 2.5310 | 0.4338 | 1.7280 | 1.7572 | 6.9310 |

-continued

| Cond. | Ex. 1 | Ex. 2 | Ex. 3 | Ex. 4 | Ex. 5 | Ex. 6 |
|---|---|---|---|---|---|---|
| 2-1 | 1.3469 | 1.2120 | 0.7420 | 1.4009 | 3.8929 | 2.3504 |
|  | 0.8186 | 2.7659 | 0.4491 | 1.5756 | 1.3649 | 5.1697 |
| 3-1 | −0.0056 | −0.0021 | 0.0019 | −0.0028 | −0.0117 | −0.0332 |
|  | 0.0063 | 0.0022 | 0.0002 | −0.0019 | −0.0087 | −0.0292 |
| 4-1 | 0 | 0.0064 | 0 | 0 | 0.0226 | −0.0097 |
|  | −0.0038 | 0.0018 | −0.0004 | −0.0012 | −0.0117 | 0.0077 |
| 5-1 | 0.0460 | −0.0465 | −0.0051 | −0.0258 | −0.3070 | −0.1235 |
|  | 0.0382 | 0.0594 | 0.0064 | 0.0278 | −0.0358 | 0.1515 |
| 6-1 | 0.0029 | −0.0004 | 0 | −0.0007 | 0.0014 | −0.0106 |
|  | 0.0018 | 0.0014 | 0.0001 | −0.0007 | −0.0022 | −0.0083 |
| 7-1 | 0.0068 | 0.0122 | 0.0038 | 0.0026 | 0.0413 | 0.0182 |
|  | 0.0088 | 0.0040 | 0.0028 | 0.0087 | 0.0066 | 0.0186 |
| 8-1 | 0.0154 | 0.0102 | 0.0116 | 0.0011 | 0.0233 | 0.0121 |
|  | 0.0193 | 0.0169 | 0.0026 | 0.0083 | 0.0386 | 0.0129 |
| 9-1 | 1.5707 | 0.8251 | 0.8130 | 2.7743 | 3.5045 | 1.2245 |
|  | 2.6540 | 1.5061 | 2.5817 | 4.0419 | 4.9803 | 7.4388 |
|  | 0.7252 | 0.8173 | 1.0634 | 0.2742 | 0.3132 | 0.5762 |
|  | 0.9258 | 1.7190 | 1.2755 | 0.7092 | 0.8921 | 1.1886 |

Next, values of parameters concerning the conditions (10-1) to (18-1) in Examples 7 to 10 relating to the second image-forming optical system are shown below [regarding the conditions (10-1) to (16-1), values relating to the two reflecting surfaces are shown, respectively].

| Cond. | Ex. 7 | Ex. 8 | Ex. 9 | Ex. 10 |
|---|---|---|---|---|
| 10-1 | 1.173 | 1.226 | 1.098 | 1.125 |
|  | 1.634 | 1.948 | 0.711 | 1.300 |
| 11-1 | −0.022 | −0.054 | −0.059 | 0.001 |
|  | −0.028 | −0.066 | −0.071 | −0.013 |
| 12-1 | 0.007 | 0.018 | 0.021 | 0.002 |
|  | 0.008 | 0.016 | 0.019 | 0.003 |
| 13-1 | 0.005~0.007 | 0.007~0.012 | −0.009~−0.008 | 0.003~0.004 |
|  | 0.003~0.005 | 0.004~0.010 | 0.039~−0.012 | 0.001~0.001 |
| 14-1 | 0.001~0.002 | 0.001~0.005 | −0.004~−0.001 | −0.001~−0.001 |

-continued

| Cond. | Ex. 7 | Ex. 8 | Ex. 9 | Ex. 10 |
|---|---|---|---|---|
|  | 0~0.001 | 0~0.003 | 0.002~0.009 | −0.003~−0.003 |
| 15-1 | −0.012~−0.010 | −0.019~−0.013 | −0.011~−0.010 | −0.001~−0.001 |
|  | −0.016~−0.014 | −0.0274~−0.021 | −0.043~−0.016 | −0.010.~−0.010 |
| 16-1 | −0.031~−0.030 | −0.053~−0.049 | 0.030~0.034 | 0.021~0.021 |
|  | −0.025~−0.025 | −0.047~−0.044 | 0.161~0.168 | −0.005~−0.005 |
| 17-1 | 1.139 | 1.00 | 1.90 | 2.94 |
| 18-1 | 1.588 | 1.60 | 1.23 | 3.40 |

Although the image-forming optical systems in the above examples are formed by using three-dimensional surfaces defined by the equation (a), curved surfaces defined by any defining equation can be used in the present invention. No matter which defining equation is used, an image-forming optical system or an image pickup optical system which is considerably favorably corrected for aberrations can be obtained by satisfying any or some of the conditions shown in the present invention. It should be noted that conditional expressions which are used in conventional non-decentered systems, e.g. those for the curvature of a surface defined on the basis of the center of a coordinate system for defining a surface in which decentration is ignored, and those for the focal length of a surface, are meaningless in a case where each surface is decentered to a considerable extent as in the present invention.

In examples shown in FIGS. 19 and 20 (described later), the image-forming optical systems according to Examples 1 and 7 of the present invention are used, respectively, with the object and image points disposed in reverse relation to the arrangements according to Examples 1 and 7. Thus, it will be apparent that the above-described numerical examples of the present invention show the basic concept and conditional expressions, and that the examples are applicable in various ways, for example, by changing the decentering direction or the object point, or by coefficient-multiplying the constituent parameters.

In the foregoing, the image-forming optical systems according to the present invention have been described in detail. The following is a description of an example in which an image-forming optical system as described above is incorporated into an image read apparatus, and an example of an information reproducing system using the image read apparatus.

Figure 19:
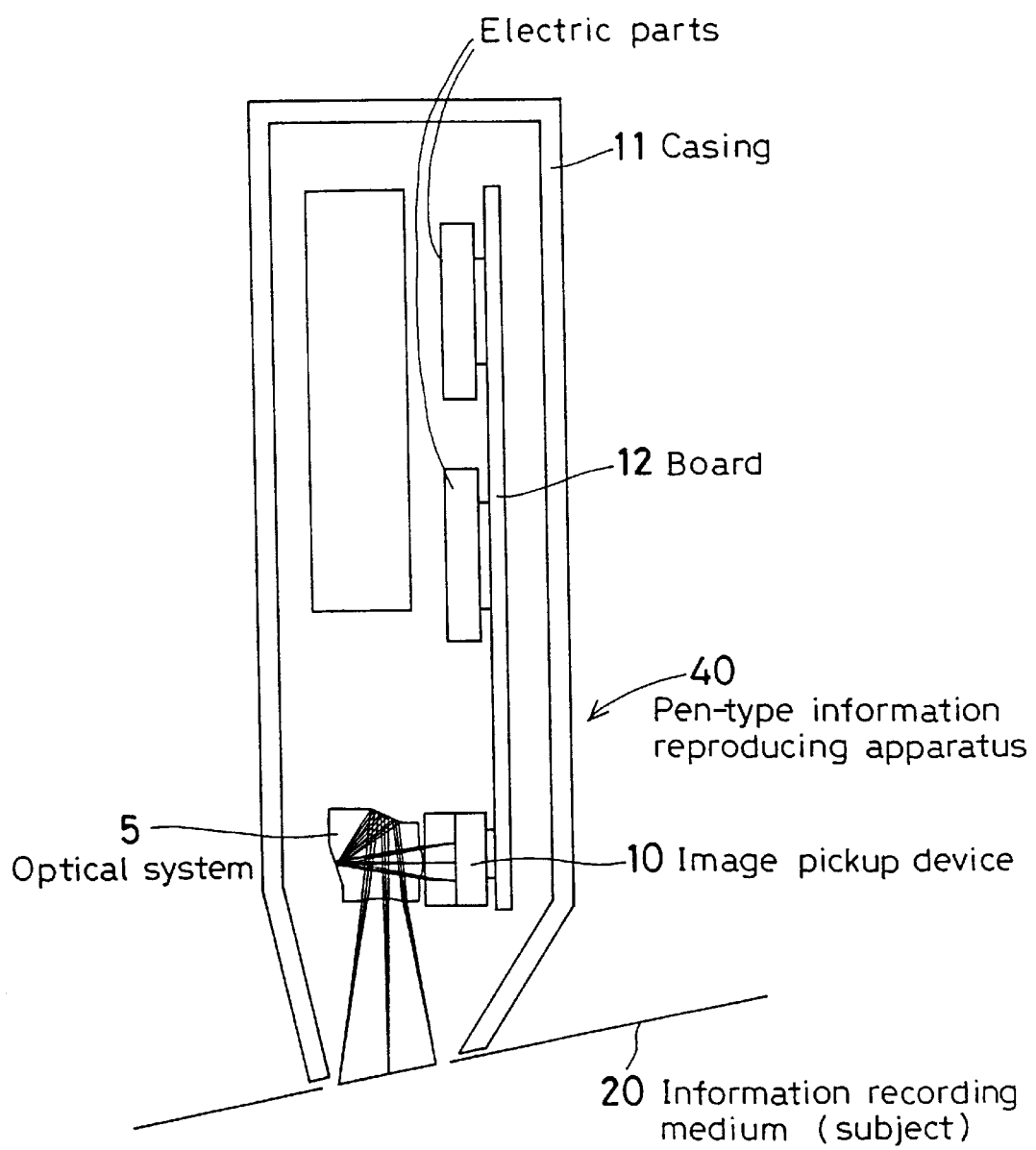
FIG. 19 is a sectional view showing one specific example of an image read apparatus using a first image-forming optical system according to the present invention.

FIG. 19 is a sectional view of an example in which the optical system 5 according to Example 1 is applied to an image read apparatus 40 according to the present invention. In the figure, reference numeral 5 denotes the prism member according to Example 1; 10 denotes an image pickup device; 11 denotes a casing; 12 denotes a board; 20 denotes an information recording medium (subject); and 40 denotes a pen-type information reproducing apparatus. As shown in FIG. 19, a single optical member (prism member) 5 is given both an image-forming action and an optical path bending action, thereby enabling the image pickup device 10 to be mounted on the same board 12, together with the other electric parts.

Figure 20:
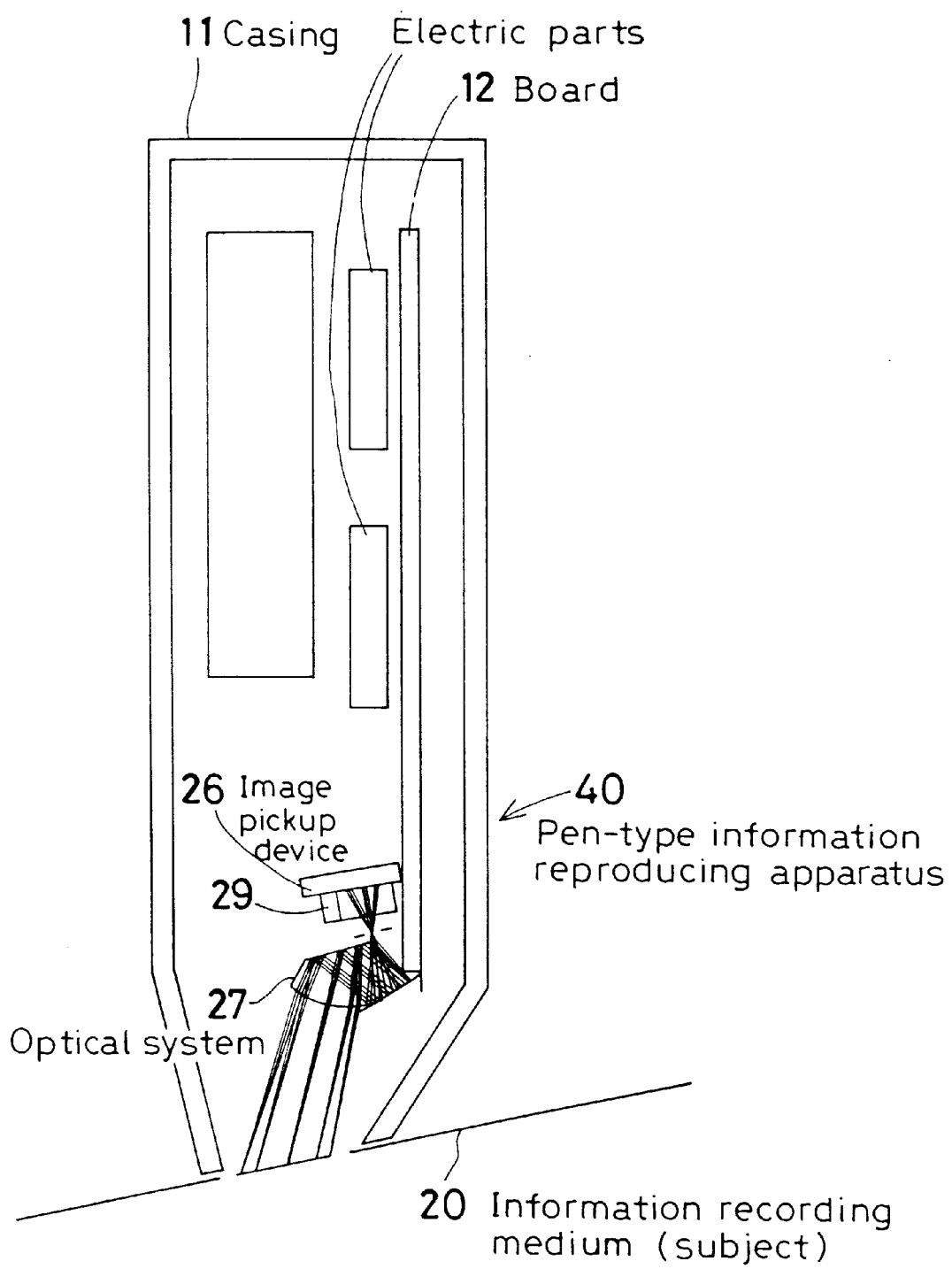
FIG. 20 is a sectional view showing one specific example of an image read apparatus using a second image-forming optical system according to the present invention.

FIG. 20 is a sectional view showing an example of an information reproducing system using an image read apparatus according to the present invention in which the optical system according to Example 7 is applied to the image read apparatus with the object and image planes disposed in reverse relation to the optical system according to Example 7. In the figure, reference numeral 27 denotes the optical system (prism member) according to Example 7; 26 denotes an image pickup device; 11 denotes a casing; 12 denotes a board; 20 denotes an information recording medium (subject); and 40 denotes a pen-type information reproducing apparatus. As shown in FIG. 20, a single optical system (prism member) 27 is given both an image-forming action and an optical path bending action, thereby enabling the image pickup device 26 to be mounted on the same board 12, together with the other electric parts.

Figure 21:
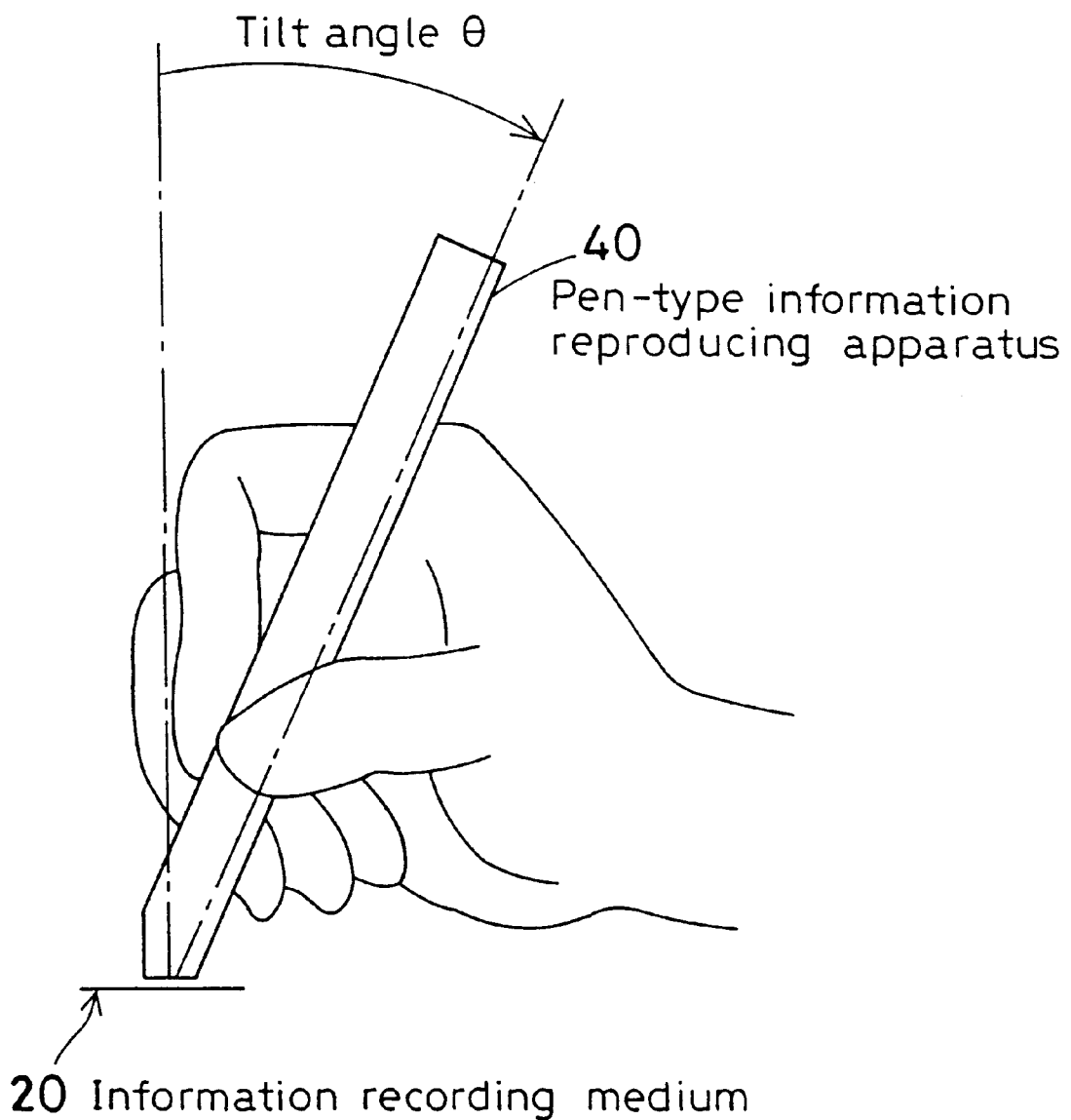
FIG. 21 illustrates the operability of a pen-type information reproducing apparatus used at a tilt with respect to an information recording medium.

Thus, the use of an image-forming optical system according to the present invention enables the mounting efficiency to improve. Moreover, because the number of necessary boards can be reduced (only one board is necessary in the case of FIGS. 19 and 20), the cost can be reduced. In addition, the pen-type information reproducing apparatus 40 can be arranged to tilt at a predetermined angle with respect to the information recording medium 20, as shown in FIG. 20. Regarding the operability of the pen-type information reproducing apparatus 40, it is preferable to arrange the pen-type information reproducing apparatus 40 such that it is used at a predetermined angle θ of tilt with respect to a line normal to the information recording medium 20, as shown in FIG. 21. With this arrangement, the pen-type information reproducing apparatus 40 can be used with excellent operability.

Thus, in-the case of the optical systems 5 and 27 according to the present invention, the degree of freedom with which the optical path can be bent at a desired angle is favorably high. Accordingly, it is possible to obtain advantageous effects in terms of operability in addition to the advantageous effects in terms of mounting. It should be noted that the actual information reproducing apparatus 40 is equipped with other members in addition to those shown in FIGS. 19 and 20. In these figures, however, only principal parts are shown for explanatory simplicity. The details of an information reproducing system using such an image read apparatus will be explained later.

Figure 22:
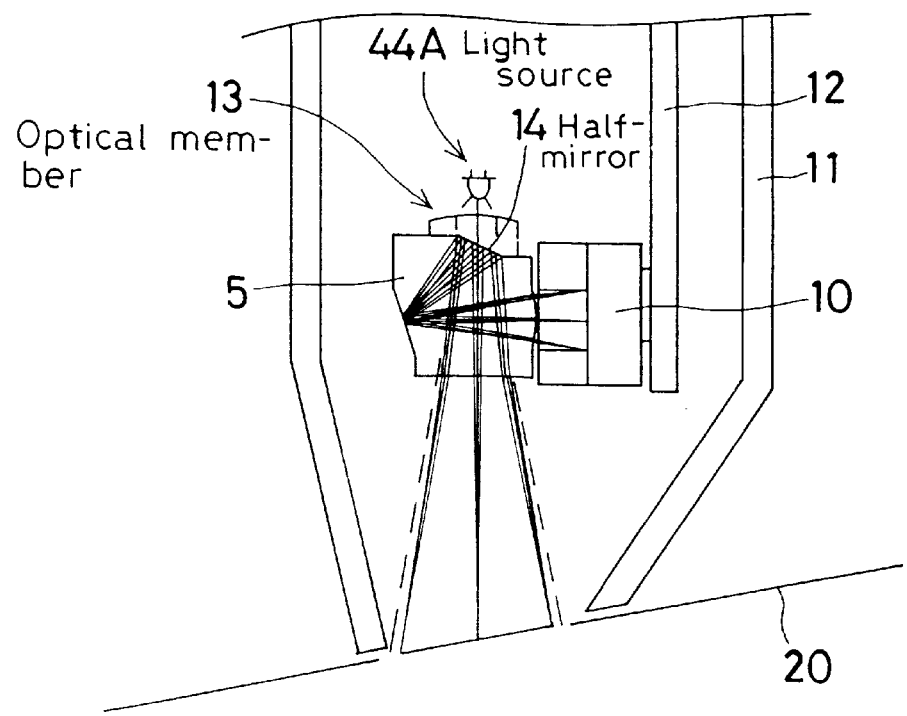
FIG. 22 is a fragmentary sectional view showing one specific example of the arrangement of an illumination optical system used in an image read apparatus.
Figure 23:
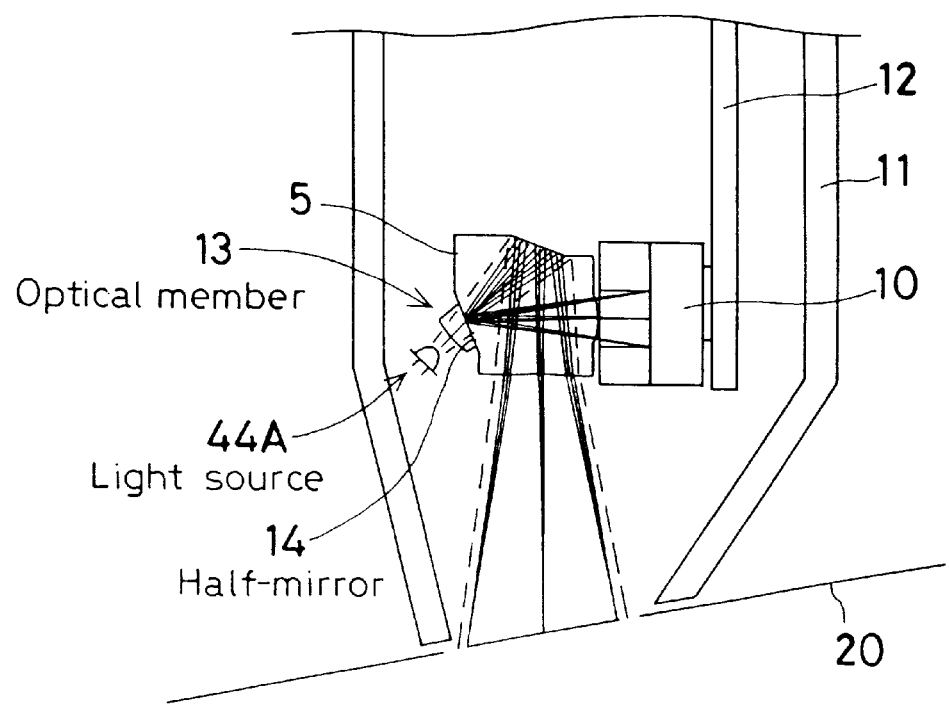
FIG. 23 is a fragmentary sectional view showing another specific example of the arrangement of the illumination optical system.
Figure 24:
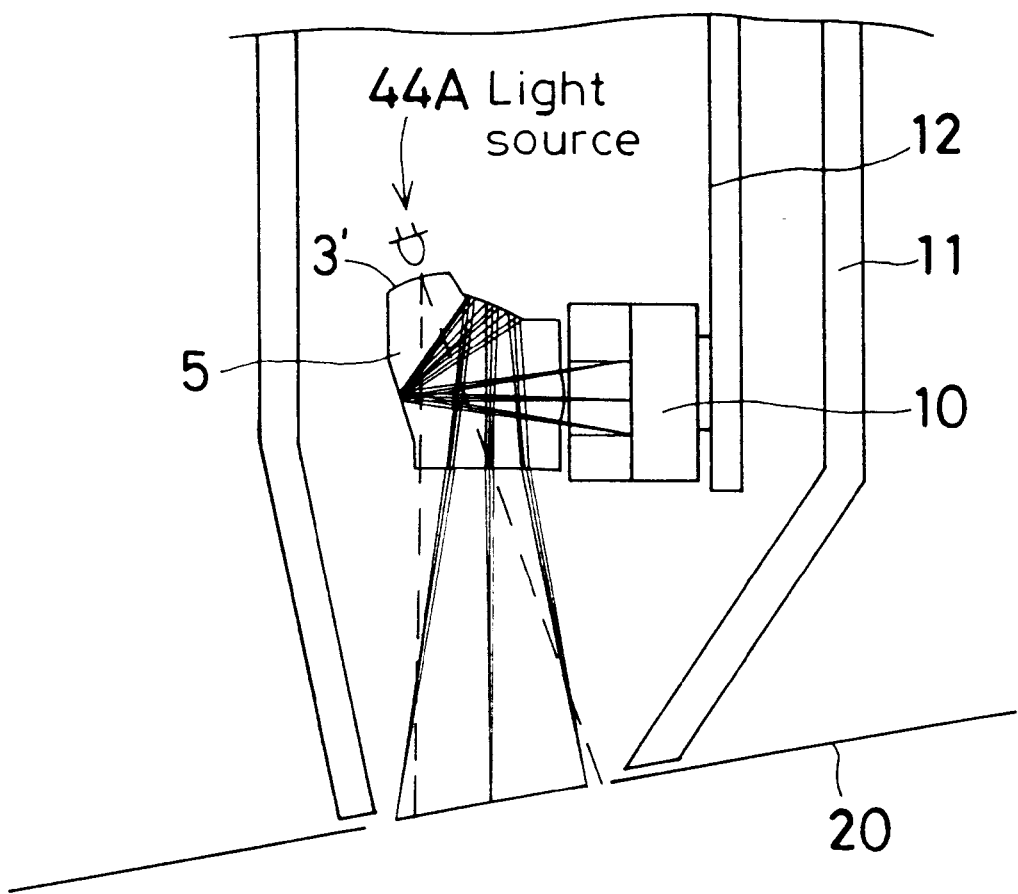
FIG. 24 is a fragmentary sectional view showing still another specific example of the arrangement of the illumination optical system.

Specific examples of the present invention, which are different from the example shown in FIG. 19. are shown in FIGS. 22 to 24, in which the optical path of an illumination optical system for illuminating an information recording medium 20 and the optical path of a photographic optical system are disposed to overlap each other in a photographic optical member 5. As shown in these figures, an entrance surface to which illuminating light from a light source 44A is led is provided within or outside an effective area of a photographing optical path of an optical member 5 constituting a photographic optical system, thereby forming an illuminating optical path that overlaps the photographing optical path.

In the example shown in FIG. 22, the second surface (i.e. the third surface 3 in FIG. 1) counted from the information recording medium (20) side has a half-mirror 14 to form a reflecting surface within the effective area of the photographing optical path. An optical member 13, e.g. an auxiliary lens or a prism, is disposed next to the half-mirror 14 to lead illuminating light from a light source 44A which is disposed in the vicinity of the optical member 13. Light rays from the light source 44A enter the optical member 13, e.g. an auxiliary lens or a prism, through a surface thereof which is closer to the light source 44A and then enter the optical member 5, which constitutes a photographic optical system, through the half-mirror 14. Thereafter, the light rays pass through an optical path overlapping the photographing optical path to illuminate the information recording medium 20. It should be noted that the light source-side surface of the optical member 13, e.g. an auxiliary lens or a prism, is given a lens action by forming it into a convex surface, for example. This is advantageous in achieving uniform illumination. By arranging the optical system such that the optical paths overlap each other as in this example, it becomes possible to reduce the overall size of the apparatus. Moreover, because the information recording medium 20 can be illuminated at approximately right angles to it, illumination nonuniformity is unlikely to occur.

The arrangement of the example shown in FIG. 23 is the same as that shown in FIG. 22 except that the third surface (i.e. the second surface 2 in FIG. 1) counted from the information recording medium (20) side has a half-mirror 14 to form a reflecting surface within the effective area of the photographing optical path.

In the example shown in FIG. 24, an illuminating optical path is formed by using that portion 3' of the second surface (i.e. the third surface 3 in FIG. 1), counted from the information recording medium (20) side, which is outside the effective area of the photographing optical path. The use of the portion 3' outside the effective area makes it unnecessary to provide a half-mirror and enables the entrance surface of the illuminating optical path to be formed integral with the optical member 5 constituting the photographic optical system. This is advantageous from the viewpoint of cost.

Figure 25:
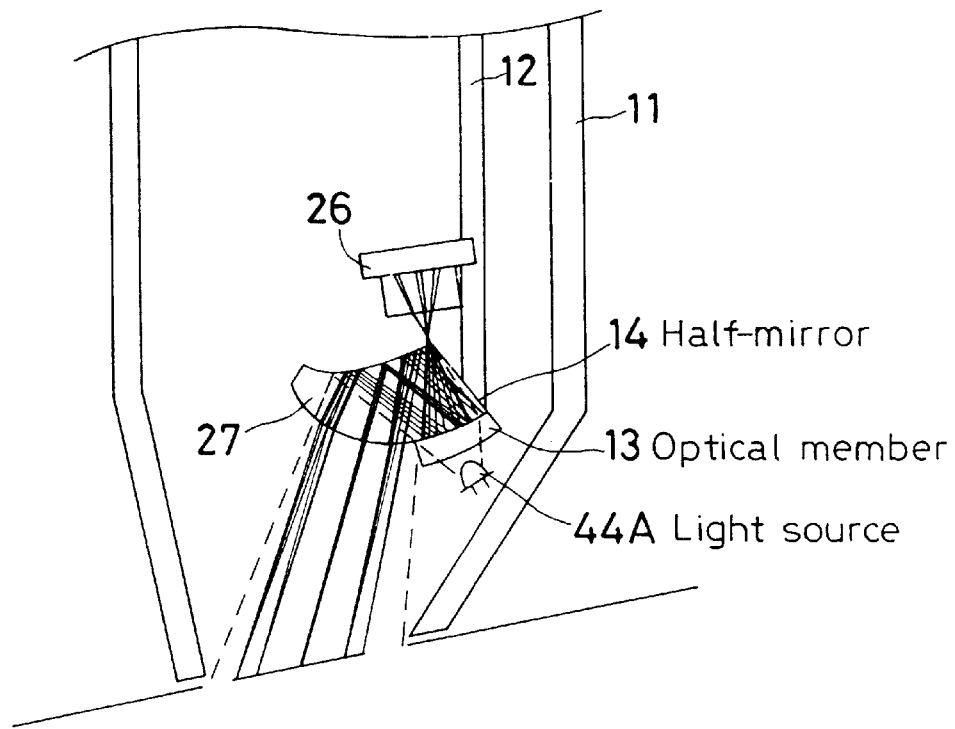
FIG. 25 is a fragmentary sectional view showing a further specific example of the arrangement of the illumination optical system.
Figure 26:
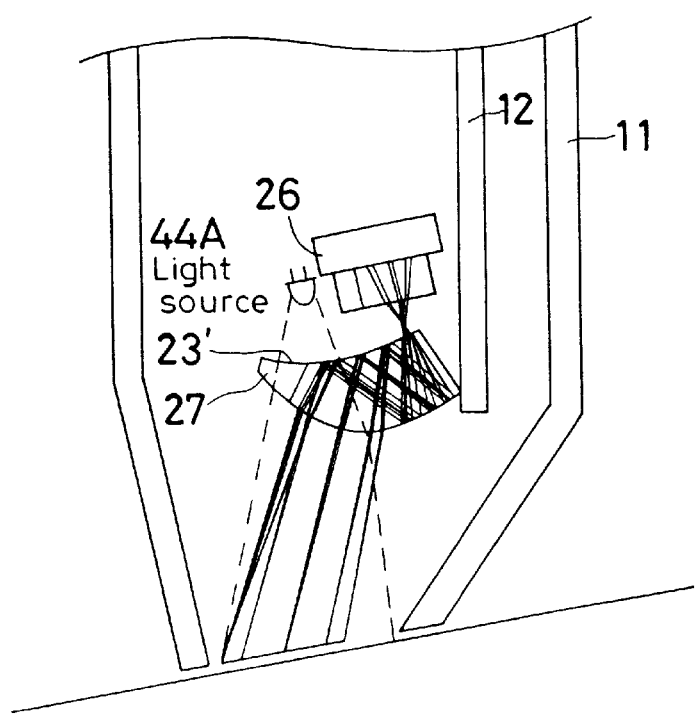
FIG. 26 is a fragmentary sectional view showing a still further specific example of the arrangement of the illumination optical system.

Specific examples of the present invention, which are different from the example shown in FIG. 20, are shown in FIGS. 25 and 26, in which the optical path of an illumination optical system for illuminating an information recording medium 20 and the optical path of a photographic optical system are disposed to overlap each other in a photographic optical member 27. As shown in these figures, an entrance surface to which illuminating light from a light source 44A is led is provided within or outside an effective area of a photographing optical path of an optical member 27 constituting a photographic optical system, thereby forming an illuminating optical path that overlaps the photographing optical path.

In the example shown in FIG. 25, the third surface (i.e. the second surface 24 in FIG. 7) counted from the information recording medium (20) side has a half-mirror 14 to form a reflecting surface within the effective area of the photographing optical path. An optical member 13, e.g. an auxiliary lens or a prism, is disposed next to the half-mirror 14 to lead illuminating light from a light source 44A which is disposed in the vicinity of the optical member 13. Light rays from the light source 44A enter the optical member 13, e.g. an auxiliary lens or a prism, through a surface thereof which is closer to the light source 44A and then enter the optical member 27, which constitutes a photographic optical system, through the half-mirror 14. Thereafter, the light rays pass through an optical path overlapping the photographing optical path to illuminate the information recording medium 20. It should be noted that the light source-side surface of the optical member 13, e.g. an auxiliary lens or a prism, is given a lens action by forming it into a convex surface, for example. This is advantageous in achieving uniform illumination. By arranging the optical system such that the optical paths overlap each other as in this example, it becomes possible to reduce the overall size of the apparatus. Moreover, because the information recording medium 20 can be illuminated at approximately right angles to it, illumination nonuniformity is unlikely to occur.

In the example shown in FIG. 26, an illuminating optical path is formed by using that portion 23' of the second surface (i.e. the first surface 23 in FIG. 7), counted from the information recording medium (20) side, which is outside the effective area of the photographing optical path. The use of the portion 23' outside the effective area makes it unnecessary to provide a half-mirror and enables the entrance surface of the illuminating optical path to be formed integral with the optical member 27 constituting the photographic optical system. This is advantageous from the viewpoint of cost.

Thus, problems characteristic of information reproducing systems can be solved by incorporating an optical system as shown in each example into an image read apparatus or an information reproducing system. It is a matter of course that the present invention is applicable not only to pen-type information reproducing apparatuses but also other types of information reproducing system.

An information reproducing system using an image read apparatus as described above will be described below in detail. A more detailed description of such an information reproducing system is given in JP(A) 6-231466. Therefore, only an outline of a specific arrangement of an information reproducing system, together with the operation thereof, will be given below.

Examples of the present invention which are concerned with an information reproducing system will be described below. The following are examples relating to audio information, e.g. speech and music, among multimedia information.

An audio information recoding apparatus for recording audio information, e.g. speech and music, on a sheet of paper as optically readable digital signals is shown in the drawing of JP-(A) 6-231466; therefore, a description thereof is omitted.

As shown in FIG. 27(A), 27(C) and 27(D), information is recorded on a sheet of paper 30 in a format such as that shown in the figure by the audio information recording apparatus. More specifically, sound data converted into digital signals, together with an image 32 and characters 34, is printed as record data 36. The record data 36 consists essentially of a plurality of blocks 36. Each block 36 includes a marker 38A, an error correcting code 38B, audio data 38C, x-address data 38D, y-address data 38E, and an error decision code 38F.

It should be noted that the marker 38A also functions as a synchronizing signal, and it uses a pattern that does not usually appear in recording modulation such as DAT. The error correcting code 38B is used for error correction of the audio data 38C. The audio data 38C corresponds to microphone or audio signals. The x-address data 38D and y-address data 38E are data that indicates the position of the block 38 concerned. The error decision code 38F is used for error decision concerning the x- and y-addresses.

The record data 36 prepared in the format described above is printed and thus recorded by a printer system or a photoengraving system for printing in such a manner that data "1" is represented as a black dot, and data "0" as no black dot, for example, as in the case of a bar code. Such record data will be hereinafter referred to as "dot code".

FIG. 27(B) shows a way in which sound data recorded on a sheet of paper 30 such as that shown in FIG. 27(A), 27(C) and 27(D), is read with a pen-type information reproducing apparatus (information reproducing system) 40. A dot code 36 can be detected and converted into sound by tracing it with a pen-type information reproducing apparatus 40 such as those shown in FIGS. 19, 20, 22 to 26, and it is possible to listen to the sound by using a sound output device 42, e.g. an earphone.

Figure 28:
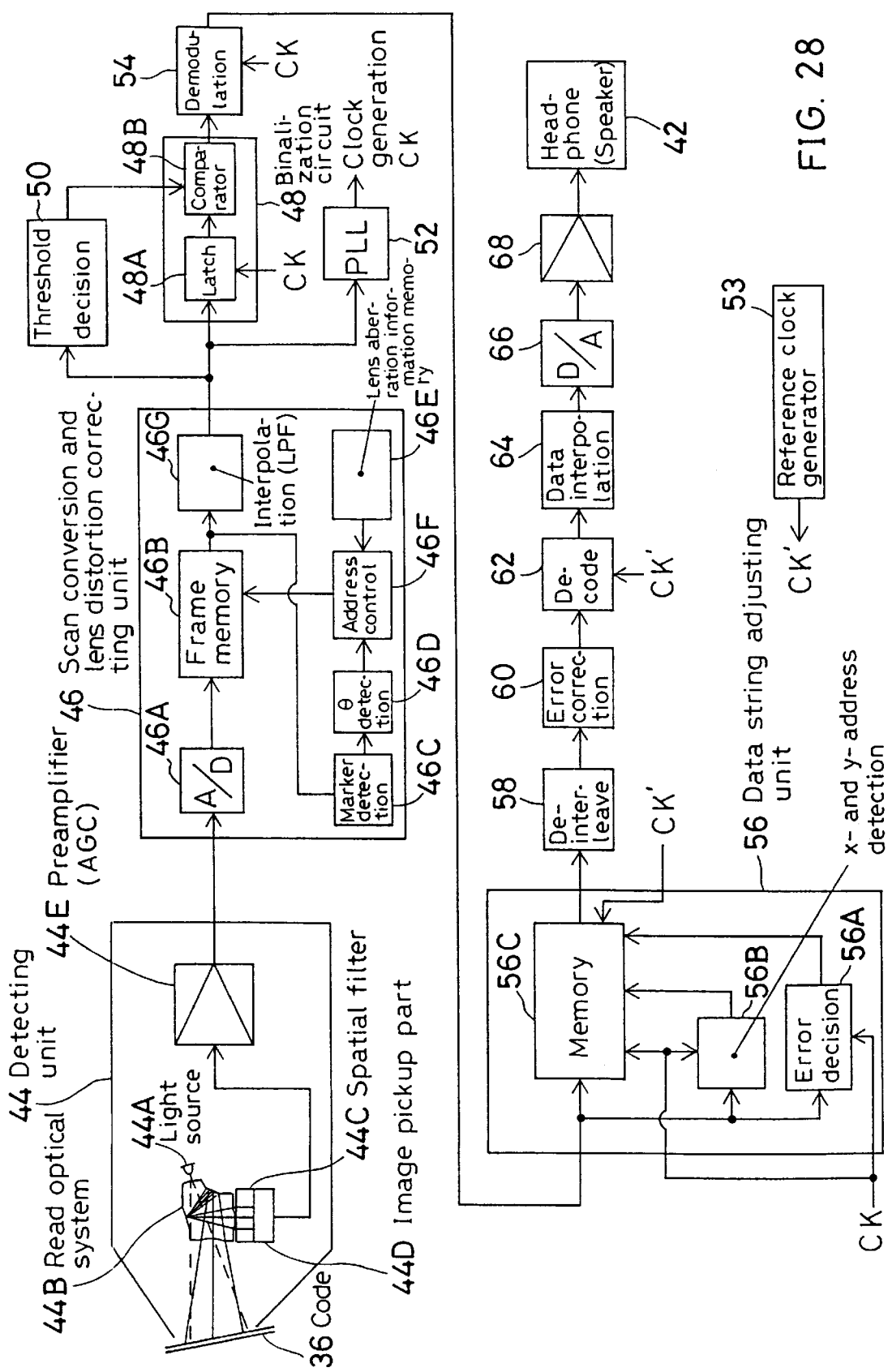
FIG. 28 is a block diagram of an information reproducing apparatus according to one embodiment of the present invention.

FIG. 28 is a block diagram of an information reproducing apparatus 40 according to one embodiment of the present invention. The information reproducing apparatus 40 according to this embodiment has a portable pen-type casing (not shown) accommodating all the constituent elements other than a sound output device 42, e.g. a headphone or an earphone. Alternatively, a speaker may be incorporated into the casing.

A detecting unit 44 illuminates a dot code 36 on a sheet of paper as a subject by light from a light source 44A, receives reflected light from the dot code 36 through a read optical system 44B (prism member 5) and a spatial filter 44C, detects the reflected light as an image signal by an image pickup part 44D (image pickup device 10), e.g. a semiconductor area sensor, and outputs the image signal after amplifying it through a preamplifier 44E.

The pixel pitch of the area sensor 44D has been set to a value not larger than the dot pitch of the dot code 36 on the imaging plane according to the sampling theorem. The spatial filter 44C, which is installed on the imaging plane, is inserted in order to prevent the occurrence of a moiré phenomenon (aliasing noise) on the imaging plane on the basis of the sampling theorem.

The image signal detected by the detecting unit 44 as described above is converted into a digital signal through an A/D converter 46A and stored in a frame memory 46B. The frame memory 46B has 8 bits for gradation.

A marker detecting circuit 46C detects a marker 38A by scanning the image signal stored in the frame memory 46B in a specific direction. A θ detecting circuit 46D detects an address value on the imaging plane to which each marker 38A detected by the marker detecting circuit 46C corresponds, and calculates a tilt θ of the imaging plane with respect to the dot code array direction from the detected address value.

Meanwhile, a lens aberration information memory 46E contains premeasured aberration-information about the read optical system 44B, which is used as the image-forming optical system in the detecting unit 44, to effect distortion correction of the read optical system. This correcting process can be readily executed because the optical system according to the present invention is favorably corrected for aberrations. An address control circuit 46F operates as follows: To read out data stored in the frame memory 46B subsequently, the address control circuit 46F gives the frame memory 46B a read address according to the value of the tilt θ calculated by the θ detecting circuit 46D and the lens aberration information stored in the lens aberration information memory 46E, and executes scan conversion into the array direction of data while performing data interpolation in an interpolating circuit 46G.

The dot code 36 read out from the frame memory 46B through the scan conversion is binalized in a binalization circuit 48 including a latch 48a and a comparator 48B. A threshold value used for the binalization is determined in a threshold decision circuit 50 by utilizing values of a histogram for each image frame or each block in the image frame. That is, a threshold value is determined according to the size of stain on the dot code 36, the degree of distortion of the paper 30, the accuracy of an internal clock, etc. As the threshold decision circuit 50, it is preferable to use a circuit that utilizes the neural network disclosed in JP(B) 4-131051, filed by the present applicant, for example.

In parallel to the above-described processing, the dot code 36 read out from the frame memory 46B is inputted to a PLL circuit 52 to generate a clock pulse CK synchronized with the reproduced data. The clock pulse CK is used as a reference clock for binalization and demodulation after the scan conversion and also in an error decision circuit 56A, an x- and y-address detecting circuit 56B and a memory 56C in a data string adjusting unit 56.

The binalized data is demodulated in a demodulator 54 and then inputted to the error decision circuit 56A and the x- and y-address detecting circuit 56B in the data string adjusting unit 56. The error decision circuit 56A makes a decision as to whether or not there is an error in the x-address data 38D or the y-address data 38E by using the error decision-code 38F in the block 38. When there is no error, the audio data 38C is not recorded in the memory 56C for audio data string adjustment according to the addresses detected by the x- and y-address detecting circuit 56B.

The purpose of the data string adjusting unit 56 is to correct a slight displacement between the data array direction and the scan direction after the scan conversion due to the above-described scan conversion and the accuracy of scan conversion in the lens distortion correcting unit 46 (the accuracy being dependent on the accuracy of the reference clock and the S/N of the image pickup device) and the distortion of the paper.

Each audio data 38C is stored in the memory 56C for data string adjustment according to the x- and y-addresses 38D and 38E in its block 38.

Then, the detecting unit 44 is manually scanned. By doing so, all the speech dot codes 36 on the paper 30 can be stored in the memory 56C for data string adjustment.

The speech dot codes subjected to the data string adjustment in the data string adjusting unit 56 are read out from the memory 56C for data string adjustment according to a reference clock CK' generated from a reference clock generator 53 which is separate from the PLL circuit 52. At this time, the speech dot codes are converted into a proper data string through de-interleaving by a de-interleaving circuit 58. Next, an error correction is made by an error correcting circuit 60 using the error correcting code 38B in the block 38. Then, decoding of the compressed data is executed by a decoder 62. Further, interpolation of audio data incapable of error correction is executed by a data interpolating circuit 64. Thereafter, the audio data is converted into an analog audio signal by a D/A converter 66, amplified by an amplifier 68 and converted into sound by a sound output device (e.g. an earphone, a headphone, or a speaker) 42.

Thus, audio information, e.g. speech and music, can be recorded on a sheet of paper, and an information reproducing apparatus is formed into a compact, portable apparatus. Accordingly, it is possible to listen to audio information, e.g. speech or music, which is printed out or transmitted by facsimile or printed in the form of a book by photoengraving in any place any number of times.

It should be noted that the memory 56C for data string adjustment in the data string adjusting unit 56 is not necessarily limited to a semiconductor memory. It is also possible to use other recording mediums, e.g. a floppy disk, or an optical disk, as the memory 56C.

This embodiment has the image-forming optical system 44B that images a dot code 36 indicating digital code data, as described above, on the image pickup part 44D, which is an image pickup device. Digital information obtained from the pattern of the dot code 36 is converted into reproduced information through the data processing section (46, 48, 50. 52, 54, 56, 58, 60, 62, 64, 66, etc.) and reproduced as sound information through the headphone 42, which is a reproducing device, thereby providing information to the auditory sense.

Various examples of application of audio information recorded as described above are conceivable. Examples of general use application include language teaching materials, sheets of music, various kinds of text such as those for correspondence courses, specifications of merchandise, manuals for repair and so forth, books such as dictionaries of foreign languages and so forth, encyclopedias and picture books, merchandise catalogs, tourist guidebooks, direct mails, invitation cards, newspapers, magazines, fliers or handbills, albums, congratulatory telegrams, and postcards. Examples of business application include FAX (voice and fax) work instructions, proceedings, electronic blackboards or whiteboards, OHP, identification cards, (voice prints), visiting or business cards, telephone memorandums, tags or labels, and supply commodities (expendable supplies) in the form of rolls of wood free paper.

Although in the foregoing description audio information, e.g. speech and music, has been taken as an example of recorded information, it should be noted that the present invention is not necessarily limited to audio information, but may also be applied to apparatuses that handle multimedia information including image information obtained from cameras, video equipment, etc., and digital code data obtained from personal computers, word processors, etc., as shown in JP(A) 6-231466.

The reproducing device is not necessarily limited to a speaker, a headphone, etc., but may be a TV or a head-mounted display (HMD), which displays an image, or a device that performs print display using a printer.

Next, an embodiment in which an image-forming optical system featuring the present invention is applied to an image pickup apparatus will be described.

Figure 29:
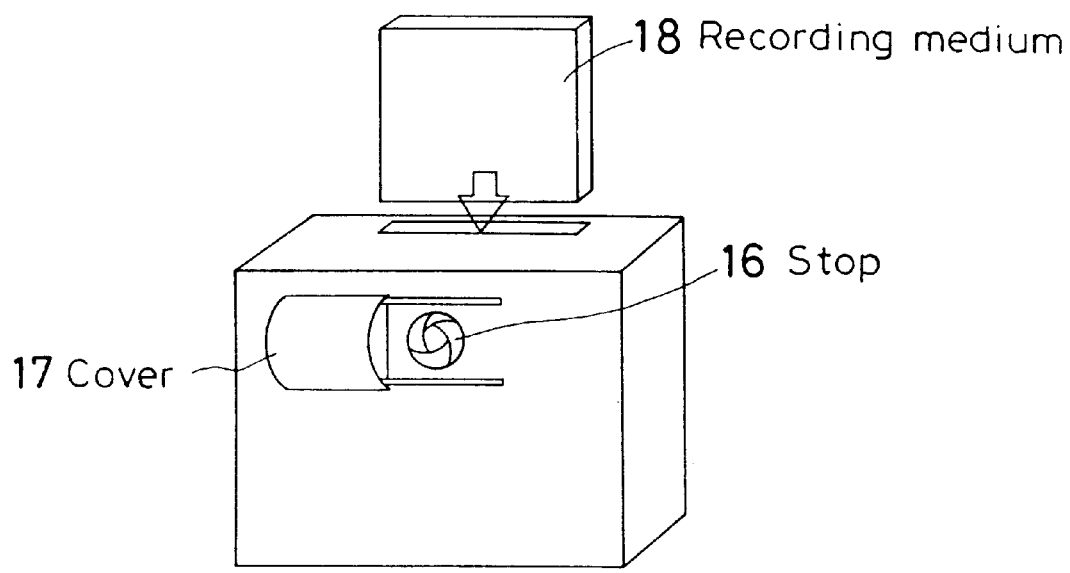
FIG. 29 is a conceptual view of an embodiment in which an image-forming optical system according to the present invention is used in an image pickup apparatus.

FIG. 29 is a conceptual view of an embodiment in which the second image-forming optical system according to the present invention is used in an image pickup apparatus. A stop 16 is disposed at the position of the aperture 21 of the image-forming optical system 27 according to the present invention, and a cover 17 for the optical system is disposed in front of the stop 16 such that the cover 17 can be closed when the image pickup apparatus is not used. In the optical system 27 according to the present invention, wherein the optical path is folded, it is possible to reduce the thickness in the optical axis direction of the image pickup apparatus. Accordingly, a recording medium 18, e.g. a magnetic recording medium (floppy disk) or a recording device (memory card), can be detachably disposed on the back of the apparatus.

Figure 30:
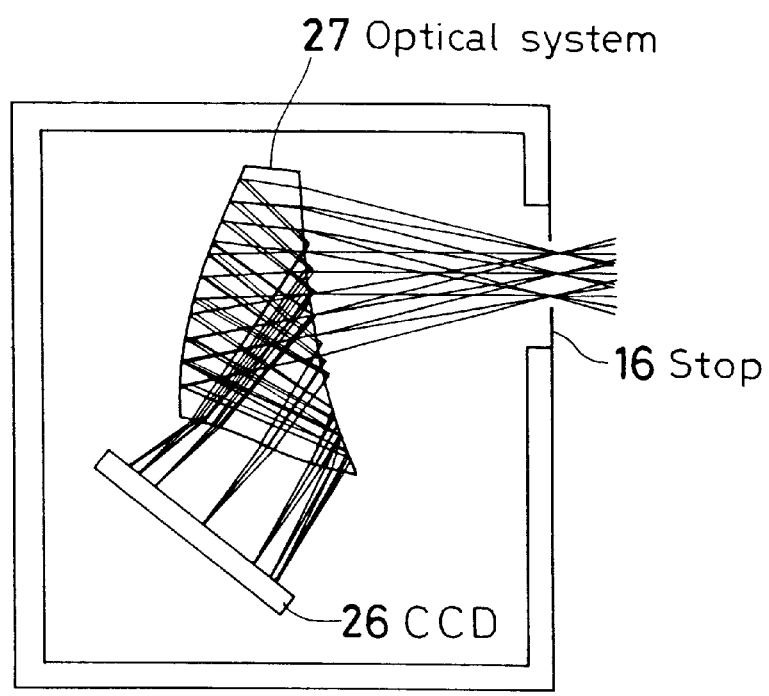
FIG. 30 is a sectional view of the image pickup apparatus shown in FIG. 29.

FIG. 30 is a sectional view of the above-described image pickup apparatus, which shows the disposition of the optical system 27, the image pickup device (CCD) 26 and the stop 16. The illustration of the arrangement of the rest of the apparatus is omitted.

It is important not only in this embodiment but also in the other embodiments to dispose a flare stop in an appropriate position in order to prevent the occurrence of ghost or the like which would otherwise be caused by light passing through the aperture 21 and reaching the imaging plane without passing through the normal reflecting optical path in the optical system 27.

As will be clear from the foregoing description, the present invention uses a plane-symmetry three-dimensional surface having only one plane of symmetry and thus provides a distortion-free and compact image-forming optical system with a minimal number of optical components which provides a wide image area and which is favorably corrected for ray aberrations and arranged in a compact structure by folding an optical path.

According to the present invention, it is possible to provide a compact image read apparatus with a simple arrangement and an information reproducing system that uses the image read apparatus.

According to the present invention, it is possible to provide an image pickup apparatus which gives a clear image with a minimal distortion even at a wide field angle. Furthermore, it is possible according to the present invention to provide a compact image read apparatus with a simple arrangement and an information reproducing apparatus that uses the image read apparatus.

What we claim is:

1. An image-forming optical system comprising:

a decentered optical system constructed and arranged to image light from an object onto a surface of an image pickup device, said image-forming optical system having at least one reflecting surface; and a stop placed on said reflecting surface, wherein said reflecting surface is a plane-symmetry three-dimensional surface which has no axis of rotational symmetry into or out of the surface and which has only one plane of symmetry.

2. An image-forming optical system according to claim 1, wherein a Z-axis is an optical axis defined by a straight line along which an axial principal ray passing through a center of a pupil of said image-forming optical system from an object side thereof and reaching a center of an image-formation position of said image pickup device travels until it intersects a first surface of said image-forming optical system, and an axis perpendicularly intersecting said Z-axis in a decentration plane of each surface constituting said image-forming optical system is defined as a Y-axis, and further an axis perpendicularly intersecting both said Z- and Y-axes is defined as an X-axis, said reflecting surface satisfies the following condition (A-1):

$$|RX|<0.5 \text{ (1/millimeter)} \quad (A\text{-}1)$$

where RX is a curvature in an X-axis direction of a portion of said reflecting surface which is struck by said axial principal ray.

3. An image-forming optical system according to claim 1, wherein a Z-axis is an optical axis defined by a straight line along which an axial principal ray passing through a center of a pupil of said image-forming optical system from an object side thereof and reaching a center of an image-formation position of said image pickup device travels until it intersects a first surface of said image-forming optical system, and an axis perpendicularly intersecting said Z-axis in a decentration plane of each surface constituting said image-forming optical system is defined as a Y-axis, and further an axis perpendicularly intersecting both said Z- and Y-axes is defined as an X-axis, said reflecting surface satisfies the following condition (B-1):

$$|RY|<0.5 \text{ (1/millimeter)} \quad (B\text{-}1)$$

where RY is a curvature in a Y-axis direction of a portion of said reflecting surface which is struck by said axial principal ray.

4. An image-forming optical system according to claim 1, wherein a Z-axis is an optical axis defined by a straight line along which an axial principal ray passing through a center of a pupil of said image-forming optical system from an object side thereof and reaching a center of an image-formation position of said image pickup device travels until it intersects a first surface of said image-forming optical system, and an axis perpendicularly intersecting said Z-axis in a decentration plane of each surface constituting said image-forming optical system is defined as a Y-axis, and further an axis perpendicularly intersecting both said Z- and Y-axes is defined as an X-axis, said reflecting surface satisfies the following conditions (A-1) and (B-1):

$$|RX|<0.5 \text{ (1/millimeter)} \quad (A\text{-}1)$$

$$|RY|<0.5 \text{ (1/millimeter)} \quad (B\text{-}1)$$

where RX and RY are curvatures in X- and Y-axis directions, respectively, of a portion of said reflecting surface which is struck by said axial principal ray.

5. An image-forming optical system according to claim 2 or 4, wherein said reflecting surface satisfies the following condition (A-2):

$$|RX|<0.1 \text{ (1/millimeter)} \quad (A\text{-}2).$$

6. An image-forming optical system according to claim 2 or 4, wherein said reflecting surface satisfies the following condition (A-3):

$$|RX|<0.05 \text{ (1/millimeter)} \quad (A\text{-}3).$$

7. An image-forming optical system according to claim 3 or 4, wherein said reflecting surface satisfies the following condition (B-2):

$$|RY|<0.1 \text{ (1/millimeter)} \quad (B\text{-}2).$$

8. An image-forming optical system according to claim 3 or 4, wherein said reflecting surface satisfies the following condition (B-3):

$$|RY|<0.05 \text{ (1/millimeter)} \quad (B\text{-}3).$$

9. An image-forming optical system according to claim 1, wherein a Z-axis is an optical axis defined by a straight line along which an axial principal ray passing through a center of a pupil of said image-forming optical system from an object side thereof and reaching a center of an image-formation position of said image pickup device travels until it intersects a first surface of said image-forming optical system, and an axis perpendicularly intersecting said Z-axis in a decentration plane of each surface constituting said image-forming optical system is defined as a Y-axis, and further an axis perpendicularly intersecting both said Z- and Y-axes is defined as an X-axis, the plane of symmetry of said plane-symmetry three-dimensional surface lies in at least one of a YZ-plane and a plane parallel to it.

10. An image-forming optical system according to any one of claims 2 to 4, wherein at least one of a reflective refracting power in a YZ-plane of a region of said reflecting surface where said axial principal ray is reflected and a reflective refracting power of said region in a plane perpendicular to said YZ-plane is positive.

11. An image-forming optical system according to any one of claims 2 to 4, wherein both a reflective refracting power in a YZ-plane of a region of said reflecting surface where said axial principal ray is reflected and a reflective refracting power of said region in a plane perpendicular to said YZ-plane are positive.

12. An image-forming optical system according to claim 1, wherein a Z-axis is an optical axis defined by a straight line along which an axial principal ray passing through a center of a pupil of said image-forming optical system from an object side thereof and reaching a center of an image-formation position of said image pickup device travels until it intersects a first surface of said image-forming optical system, and an axis perpendicularly intersecting said Z-axis in a decentration plane of each surface constituting said image-forming optical system is defined as a Y-axis, and further an axis perpendicularly intersecting both said Z- and Y-axes is defined as an X-axis, said reflecting surface satisfies the following condition:

$$|DX_{max1}|<100.0 \text{ (millimeter)} \quad (1\text{-}1)$$

where $DX_{max1}=MAX((DX-DX_{axis})/RX)$ and DX denotes a value of each of DX1, DX4, DX5, DX6 and DX3 when an effective area is defined for said reflecting surface as being an area defined by intersection of said reflecting surface and six principal rays, which are, with a Y-axis direction defined as a vertical direction, an axial principal ray passing through a center of an image field, a principal ray in a field angle direction corresponding to a center of an upper edge of the image field, a principal ray in a field angle direction corresponding to an upper-right corner of the image field, a principal ray in a field angle direction corresponding to a center of a right-hand edge of the image field, a principal ray in a field angle direction corresponding to a lower-right corner of the image field, and a principal ray in a field angle direction corresponding to a center of a lower edge of the image field, and an equation which defines a configuration of said reflecting surface is differentiated once with respect to the X-axis, which corresponds to a direction perpendicularly intersecting a decentering direction of said surface, thereby determining values $DX_{axis}$, DX1, DX4, DX5, DX6 and DX3 at portions where said six principal rays strike said reflecting surface, respectively, and RX denotes a curvature in an X-axis direction of a portion of said reflecting surface on which said axial principal ray impinges.

13. An image-forming optical system according to claim 1, wherein a Z-axis is an optical axis defined by a straight line along which an axial principal ray passing through a center of a pupil of said image-forming optical system from an object side thereof and reaching a center of an image-formation position of said image pickup device travels until it intersects a first surface of said image-forming optical system, and an axis perpendicularly intersecting said Z-axis in a decentration plane of each surface constituting said image-forming optical system is defined as a Y-axis, and further an axis perpendicularly intersecting both said Z- and Y-axes is defined as an X-axis, said reflecting surface satisfies the following condition:

$$|DY_{max2}|<100.0 \text{ (millimeter)} \quad (2\text{-}1)$$

where $DY_{max2}=MAX((DY-DY_{axis})/RY)$ and DY denotes a value of each of DY1, DY4, DY5, DY6 and DY3 when an effective area is defined for said reflecting surface as being an area defined by intersection of said reflecting surface and six principal rays, which are, with a Y-axis direction defined as a vertical direction, an axial principal ray passing through a center of an image field, a principal ray in a field angle direction corresponding to a center of an upper edge of the image field, a principal ray in a field angle direction corresponding to an upper-right corner of the image field, a principal ray in a field angle direction corresponding to a center of a right-hand edge of the image field, a principal ray in a field angle direction corresponding to a lower-right corner of the image field, and a principal ray in a field angle direction corresponding to a center of a lower edge of the image field, and an equation which defines a configuration of said reflecting surface is differentiated once with respect to the Y-axis, which corresponds to a decentering direction of said surface, thereby determining values $DY_{axis}$, DY1, DY4, DY5, DY6 and DY3 at portions where said six principal rays strike said reflecting surface, respectively, and RY denotes a curvature in the Y-axis direction of a portion of said reflecting surface on which said axial principal ray impinges.

14. An image-forming optical system according to claim 1, wherein a Z-axis is an optical axis defined by a straight line along which an axial principal ray passing through a center of a pupil of said image-forming optical system from an object side thereof and reaching a center of an image-formation position of said image pickup device travels until it intersects a first surface of said image-forming optical system, and an axis perpendicularly intersecting said Z-axis in a decentration plane of each surface constituting said image-forming optical system is defined as a Y-axis, and further an axis perpendicularly intersecting both said Z- and Y-axes is defined as an X-axis, said reflecting surface satisfies the following condition:

$$|DX_3|<0.4 \qquad (3\text{-}1)$$

where $DX_3=(DX4-DX1)-(DX6-DX3)$ when an effective area is defined for said reflecting surface as being an area defined by intersection of said reflecting surface and six principal rays, which are, with a Y-axis direction defined as a vertical direction, an axial principal ray passing through a center of an image field, a principal ray in a field angle direction corresponding to a center of an upper edge of the image field, a principal ray in a field angle direction corresponding to an upper-right corner of the image field, a principal ray in a field angle direction corresponding to a center of a right-hand edge of the image field, a principal ray in a field angle direction corresponding to a lower-right corner of the image field, and a principal ray in a field angle direction corresponding to a center of a lower edge of the image field, and an equation which defines a configuration of said reflecting surface is differentiated once with respect to the X-axis, which corresponds to a direction perpendicularly intersecting a decentering direction of said surface, thereby determining values $DX_{axis}$, DX1, DX4, DX5, DX6 and DX3 at portions where said six principal rays strike said reflecting surface, respectively.

15. An image-forming optical system according to claim 1, wherein a Z-axis is an optical axis defined by a straight line along which an axial principal ray passing through a center of a pupil of said image-forming optical system from an object side thereof and reaching a center of an image-formation position of said image pickup device travels until it intersects a first surface of said image-forming optical system, and an axis perpendicularly intersecting said Z-axis in a decentration plane of each surface constituting said image-forming optical system is defined as a Y-axis, and further an axis perpendicularly intersecting both said Z- and Y-axes is defined as an X-axis, said reflecting surface satisfies the following condition:

$$|DY_4|<0.4 \qquad (4\text{-}1)$$

where $DY4=(DY4-DY1)-(DY6-DY3)$ when an effective area is defined for said reflecting surface as being an area defined by intersection of said reflecting surface and six principal rays, which are, with a Y-axis direction defined as a vertical direction, an axial principal ray passing through a center of an image field, a principal ray in a field angle direction corresponding to a center of an upper edge of the image field, a principal ray in a field angle direction corresponding to an upper-right corner of the image field, a principal ray in a field angle direction corresponding to a center of a right-hand edge of the image field, a principal ray in a field angle direction corresponding to a lower-right corner of the image field, and a principal ray in a field angle direction corresponding to a center of a lower edge of the image field, and an equation which defines a configuration of said reflecting surface is differentiated once with respect to the Y-axis, which corresponds to a decentering direction of said surface, thereby determining values $DY_{axis}$, DY1, DY4, DY5, DY6 and DY3 at portions where said six principal rays strike said reflecting surface, respectively.

16. An image-forming optical system according to claim 1, wherein a Z-axis is an optical axis defined by a straight line along which an axial principal ray passing through a center of a pupil of said image-forming optical system from an object side thereof and reaching a center of an image-formation position of said image pickup device travels until it intersects a first surface of said image-forming optical system, and an axis perpendicularly intersecting said Z-axis in a decentration plane of each surface constituting said image-forming optical system is defined as a Y-axis, and further an axis perpendicularly intersecting both said Z- and Y-axes is defined as an X-axis, said reflecting surface satisfies the following condition:

$$|DX_{max5}|<0.5 \qquad (5\text{-}1)$$

where $DX_{max5}=(DX5-DX_{axis})$ when an effective area is defined for said reflecting surface as being an area defined by intersection of said reflecting surface and six principal rays, which are, with a Y-axis direction defined as a vertical direction, an axial principal ray passing through a center of an image field, a principal ray in a field angle direction corresponding to a center of an upper edge of the image field, a principal ray in a field angle direction corresponding to an upper-right corner of the image field, a principal ray in a field angle direction corresponding to a lower-right corner of the image field, and a principal ray in a field angle direction corresponding to a center of a lower edge of the image field, and an equation which defines a configuration of said reflecting surface is differentiated once with respect to the X-axis, which corresponds to a direction perpendicularly intersecting a decentering direction of said surface, thereby determining values $DX_{axis}$, DX1, DX4, DX5, DX6 and DX3 at portions where said six principal rays strike said reflecting surface, respectively.

17. An image-forming optical system according to claim 1, wherein a Z-axis is an optical axis defined by a straight line along which an axial principal ray passing through a center of a pupil of said image-forming optical system from an object side thereof and reaching a center of an image-formation position of said image pickup device travels until it intersects a first surface of said image-forming optical system, and an axis perpendicularly intersecting said Z-axis in a decentration plane of each surface constituting said image-forming optical system is defined as a Y-axis, and further an axis perpendicularly intersecting both said Z- and Y-axes is defined as an X-axis, said reflecting surface satisfies the following condition:

$$|DY_{max6}|<0.5 \quad (6\text{-}1)$$

where $DY_{max6}=(DY5-DY_{axis})$ when an effective area is defined for said reflecting surface as being an area defined by intersection of said reflecting surface and six principal rays, which are, with a Y-axis direction defined as a vertical direction, an axial principal ray passing through a center of an image field, a principal ray in a field angle direction corresponding to a center of an upper edge of the image field, a principal ray in a field angle direction corresponding to an upper-right corner of the image field, a principal ray in a field angle direction corresponding to a center of a right-hand edge of the image field, a principal ray in a field angle direction corresponding to a lower-right corner of the image field, and a principal ray in a field angle direction corresponding to a center of a lower edge of the image field, and an equation which defines a configuration of said reflecting surface is differentiated once with respect to the Y-axis, which corresponds to a decentering direction of said surface, thereby determining values $DY_{axis}$, DY1, DY4, DY5, DY6 and DY3 at portions where said six principal rays strike said reflecting surface, respectively.

18. An image-forming optical system according to claim 1, wherein a Z-axis is an optical axis defined by a straight line along which an axial principal ray passing through a center of a pupil of said image-forming optical system from an object side thereof and reaching a center of an image-formation position of said image pickup device travels until it intersects a first surface of said image-forming optical system, and an axis perpendicularly intersecting said Z-axis in a decentration plane of each surface constituting said image-forming optical system is defined as a Y-axis, and further an axis perpendicularly intersecting both said Z- and Y-axes is defined as an X-axis, said reflecting surface satisfies the following condition:

$$DDX_{max7}<0.5 \text{ (1/millimeter)} \quad (7\text{-}1)$$

wherein $DDX_{max7}$ denotes a difference between maximum and minimum values of curvatures in an X-axis direction within an effective area defined for said reflecting surface as being an area defined by intersection of said reflecting surface and six principal rays, which are, with a Y-axis direction defined as a vertical direction, an axial principal ray passing through a center of an image field, a principal ray in a field angle direction corresponding to a center of an upper edge of the image field, a principal ray in a field angle direction corresponding to an upper-right corner of the image field, a principal ray in a field angle direction corresponding to an upper-right corner of the image field, a principal ray in a field angle direction corresponding to a center of a right-hand edge of the image field, a principal ray in a field angle direction corresponding to a lower-right corner of the image field, and a principal ray in a field angle direction corresponding to a center of a lower edge of the image field.

19. An image-forming optical system according to claim 1, wherein a Z-axis is an optical axis defined by a straight line along which an axial principal ray passing through a center of a pupil of said image-forming optical system from an object side thereof and reaching a center of an image-formation position of said image pickup device travels until it intersects a first surface of said image-forming optical system, and an axis perpendicularly intersecting said Z-axis in a decentration plane of each surface constituting said image-forming optical system is defined as a Y-axis, and further an axis perpendicularly intersecting both said Z- and Y-axes is defined as an X-axis, said reflecting surface satisfies the following condition:

$$DDY_{max8}<0.5 \text{ (1/millimeter)} \quad (8\text{-}1)$$

wherein $DDY_{max8}$ denotes a difference between maximum and minimum values of curvatures in a Y-axis direction within an effective area defined for said reflecting surface as being an area defined by intersection of said reflecting surface and six principal rays, which are, with the Y-axis direction defined as a vertical direction, an axial principal ray passing through a center of an image field, a principal ray in a field angle direction corresponding to a center of an upper edge of the image field, a principal ray in a field angle direction corresponding to an upper-right corner of the image field, a principal ray in a field angle direction corresponding to a center of a right-hand edge of the image field, a principal ray in a field angle direction corresponding to a lower-right corner of the image field, and a principal ray in a field angle direction corresponding to a center of a lower edge of the image field.

20. An image-forming optical system according to claim 1, wherein a Z-axis is an optical axis defined by a straight line along which an axial principal ray passing through a center of a pupil of said image-forming optical system from an object side thereof and reaching a center of an image-formation position of said image pickup device travels until it intersects a first surface of said image-forming optical system, and an axis perpendicularly intersecting said Z-axis in a decentration plane of each surface constituting said image-forming optical system is defined as a Y-axis, and further an axis perpendicularly intersecting both said Z- and Y-axes is defined as an X-axis, said reflecting surface satisfies the following condition:

$$0.01<DD_{xy9}<40 \quad (9\text{-}1)$$

where $DD_{xy9}=|DDXn|/|DDYn|$ (n is 1 to 6) when an effective area is defined for said reflecting surface as being an area defined by intersection of said reflecting surface and six principal rays, which are with a Y-axis direction defined as a vertical direction, an axial principal ray passing through a center of an image field, a principal ray in a field angle direction corresponding to a center of an upper edge of the image field, a principal ray in a field angle direction corresponding to an upper-right corner of the image field, a principal ray in a field angle direction corresponding to a center of a right-hand edge of the image field, a principal ray in a field angle direction corresponding to a lower-right corner of the image field, and a principal ray in a field angle direction corresponding to a center of a lower edge of the image field, and DDX2, DDX1, DDX4, DDX5, DDX6 and DDX3 denote curvatures of an equation defining a configuration of said reflecting surface with respect to the X-axis, which perpendicularly intersects a decentering direction of said surface, at portions where said six principal rays strike said reflecting surface, respectively, and DDY2, DDY1, DDY4, DDY5, DDY6 and DDY3 denote curvatures of said equation with respect to the Y-axis, which corresponds to the decentering direction of said surface, at said portions, respectively.

21. An image-forming optical system according to claim 1, wherein said reflecting surface is formed from a back-coated reflecting mirror having a medium whose refractive index (n) is larger than 1 (n>1).

22. An image-forming optical system comprising a decentered optical system constructed and arranged to image light from an object onto a surface of an image pickup device,
wherein said image-forming optical system has at least one reflecting surface,
said reflecting surface being a plane-symmetry three-dimensional surface which has no axis of rotational symmetry into or out of the surface and which has only one plane of symmetry,
wherein said reflecting surface constitutes a reflecting surface of a prism member,
said prism member being arranged such that optical paths in said prism member intersect each other crosswise.

23. An image pickup apparatus comprising:
an aperture;
an image-forming optical system according to claim 1 or 22 that images a bundle of light rays entering through said aperture; and
an image pickup device disposed at or near a position where the bundle of light rays is imaged by said image-forming optical system,
wherein said image-forming optical system has at least one reflecting surface of a non-rotationally symmetric surface configuration having no axis of rotational symmetry into or out of the surface, and
wherein a light ray emanating from a center of an object and passing through a center of said aperture to reach a center of said image pickup device is defined as an axial principal ray, and a Z-axis is taken in a direction of the axial principal ray emanating from the center of said object and reaching the center of said aperture, and further a Y-axis is taken in a direction perpendicular to said Z-axis in a plane containing a folded line segment along which said axial principal ray is reflected by said at least one reflecting surface, and further that an X-axis is taken in a direction perpendicular to both said Z-axis and said Y-axes, said at least one reflection surface of said image-forming optical system satisfies the following condition:

$$1 < CX2/CY2 < 5 \qquad (10\text{-}1)$$

where a Y-axis direction is a vertical direction, CX2 is a curvature of an equation that defines the configuration of said reflecting surface at a portion of said reflecting surface where said axial principal ray intersects said reflecting surface, in a plane containing a line normal to said reflecting surface and the X-axis, which corresponds to a direction perpendicular to a decentering direction of said reflecting surface, and CY2 is a curvature at said portion in a plane containing the line normal to said reflecting surface and the Y-axis, which corresponds to the decentering direction.

24. An image pickup apparatus comprising:
an aperture;
an image-forming optical system according to claim 1 or 22 that images a bundle of light rays entering through said aperture; and
an image pickup device disposed at or near a position where the bundle of light rays is imaged by said image-forming optical system,
wherein said image-forming optical system has a folded optical path formed from at least two reflecting surfaces, and
wherein at least one of said at least two reflecting surfaces has a non-rotationally symmetric surface configuration having no axis of rotational symmetry into or out of the surface.

25. An image pickup apparatus comprising:
an aperture;
an image-forming optical system according to claim 1 or 22 that images a bundle of light rays entering through said aperture; and
an image pickup device disposed at or near a position where the bundle of light rays is imaged by said image-forming optical system,
wherein said image-forming optical system has at least one reflecting surface of a non-rotationally symmetric surface configuration having no axis of rotational symmetry into or out of the surface,
wherein a light ray emanating from a center of an object and passing through a center of said aperture to reach a center of said image pickup device is defined as an axial principal ray, and a Z-axis is taken in a direction of the axial principal ray emanating from the center of said object and reaching the center of said aperture, and further a Y-axis is taken in a direction perpendicular to said Z-axis in a plane containing a folded line segment along which said axial principal ray is reflected by said at least one reflecting surface, and further an X-axis is taken in a direction perpendicular to both said Z-axis and said Y-axis, said at least one reflecting surface of said image-forming optical system satisfies the following condition:

$$-0.1 < DXn2 < 0 \qquad (11\text{-}1)$$

where DXn2 denotes DX4-DX6 on an assumption that, with a Y-axis direction defined as a vertical direction, a principal ray in a field angle direction corresponding to a center of an upper edge of an image field is defined as ①; a principal ray in a field angle direction corresponding to an upper-right corner of the image field as defined as ④; a principal ray in a field angle direction corresponding to a center of a right-hand edge of the image field is defined as ⑤; a principal ray in a field angle direction corresponding to a lower-right corner of the image field is defined as ⑥; and a principal ray in a field angle direction corresponding to a center of a lower edge of the image field is defined as ③, and that DY1 to DY6 denote tilts of an equation defining the configuration of said reflecting surface in the Y-axis direction, which corresponds to a decentering direction of said surface, at portions where said rays ① to ⑥ intersect said reflecting surface, respectively, and DX1 to DX6 denote tilts of said equation in an X-axis direction, which corresponds to a direction perpendicularly intersecting said decentering direction, at said portions, respectively.

26. An image pickup apparatus comprising:

an aperture;

an image-forming optical system according to claim 1 or 22 that images a bundle of light rays entering through said aperture; and an image pickup device disposed at or near a position where the bundle of light rays is imaged by said image-forming optical system, wherein said image-forming optical system has at least one reflecting surface of a non-rotationally symmetric surface configuration having no axis of rotational symmetry into or out of the surface, wherein, assuming that a light ray emanating from a center of an object and passing through a center of said aperture to reach a center of said image pickup device is defined as an axial principal ray, and that a Z-axis is taken in a direction of the axial principal ray emanating from the center of said object and reaching the center of said aperture, and further that a Y-axis is taken in a direction perpendicular to said Z-axis in a plane containing a folded line segment along which said axial principal ray is reflected by said at least one reflecting surface, and further that an X-axis is taken in a direction perpendicular to both said Z-axis and said Y-axis, said at least one reflecting surface of said image-forming optical system satisfies the following condition:

$$0 < DY5 - DY2 < 0.1 \tag{12-1}$$

where, assuming a Y-axis direction to be a vertical direction, a principal ray in a field angle direction corresponding to a center of an upper edge of an image field is defined as ①; a principal ray in a field angle direction corresponding to an upper-right corner of the image field is defined as ④; a principal ray in a field angle direction corresponding to a center of a right-hand edge of the image field is defined as ⑤; a principal ray in a field angle direction corresponding to a lower-right corner of the image field is defined as ⑥; and a principal ray in a field angle direction corresponding to a center of a lower edge of the image field is defined as ③; and where DY1 to DY6 denote tilts of an equation defining the configuration of said reflecting surface in the Y-axis direction, which corresponds to a decentering direction of said surface, at portions where said rays ① to ⑥ intersect said reflecting surface, respectively, and DX1 to DX6 denote tilts of said equation in an X-axis direction, which corresponds to a direction perpendicularly intersecting said decentering direction, at said portions, respectively.

27. An image pickup apparatus comprising:

an aperture;

an image-forming optical system according to claim 1 or 22 that images a bundle of light rays entering through said aperture; and an image pickup device disposed at or near a position where the bundle of light rays is imaged by said image-forming optical system, wherein said image-forming optical system has at least one reflecting surface of a non-rotationally symmetric surface configuration having no axis of rotational symmetry into or out of the surface, wherein a light ray emanating from a center of an object and passing through a center of said aperture to reach a center of said image pickup device is defined as an axial principal ray, and a Z-axis is taken in a direction of the axial principal ray emanating from the center of said object and reaching the center of said aperture, and further a Y-axis is taken in a direction perpendicular to said Z-axis in a plane containing a folded line segment along which said axial principal ray is reflected by said at least one reflecting surface, and further an X-axis is taken in a direction perpendicular to both said Z-axis and said Y-axis, said at least one reflecting surface of said image-forming optical system satisfies the following condition:

$$-0.1 < CXn4M < 0.1 \ (1/\text{millimeter}) \tag{13-1}$$

where CXn4M denotes each value of differences CX4−CX1, CX5−CX2, and CX6−CX3 with, with a Y-axis direction defined as a vertical direction, a principal ray in a field angle direction corresponding to a center of an upper edge of an image field is defined as ①; a principal ray in a field angle direction corresponding to an upper-right corner of the image field is defined as ④; a principal ray in a field angle direction corresponding to a center of a right-hand edge of the image field is defined as ⑤; a principal ray in a field angle direction corresponding to a lower-right corner of the image field is defined as ⑥; and a principal ray in a field angle direction corresponding to a center of a lower edge of the image field is defined as ③, and CX1 to CX6 denote curvatures of an equation defining the configuration of said reflecting surface in a plane containing the X-axis, which corresponds to a direction perpendicular to a decentering direction of said surface, and a line normal to said surface at portions where said rays ① to ⑥ intersect said reflecting surface, respectively, and CY1 to CY6 denote curvatures of said equation at said portions, respectively, in a plane containing the Y-axis, which corresponds to said decentering direction, and the line normal to said surface.

28. An image pickup apparatus comprising:

an aperture;

an image-forming optical system according to claim 1 or 22 that images a bundle of light rays entering through said aperture; and an image pickup device disposed at or near a position where the bundle of light rays is imaged by said image-forming optical system, wherein said image-forming optical system has at least one reflecting surface of a non-rotationally symmetric surface configuration having no axis of rotational symmetry into or out of the surface, wherein a light ray emanating from a center of an object and passing through a center of said aperture to reach a center of said image pickup device is defined as an axial principal ray, and a Z-axis is taken in a direction of the axial principal ray emanating from the center of said object and reaching the center of said aperture, and further a Y-axis is taken in a direction perpendicular to said Z-axis in a plane containing a folded line segment along which said axial principal ray is reflected by said at least one reflecting surface, and further an X-axis is taken in a direction perpendicular to both said Z-axis and said Y-axis, said at least one reflecting surface of said image-forming optical system satisfies the following condition:

$$-0.1 < CYn4M < 0.1 \text{ (1/millimeter)} \qquad (14\text{-}1)$$

where CYn4M denotes each value of differences CY4−CY1, CY5−CY2, and CY6−CY3 on an assumption that, with a Y-axis direction defined as a vertical direction, a principal ray in a field angle direction corresponding to a center of an upper edge of an image field is defined as ①; a principal ray in a field angle direction corresponding to an upper-right corner of the image field is defined as ④; a principal ray in a field angle direction corresponding to a center of a right-hand edge of the image field is defined as ⑤; a principal ray in a field angle direction corresponding to a lower-right corner of the image field is defined as ⑥; and a principal ray in a field angle direction corresponding to a center of a lower edge of the image field is defined as ③, and that CX1 to CX6 denote curvatures of an equation defining the configuration of said reflecting surface in a plane containing the X-axis, which corresponds to a direction perpendicular to a decentering direction of said surface, and a line normal to said surface at portions where said rays ① to ⑥ intersect said reflecting surface, respectively, and CY1 to CY6 denote curvatures of said equation at said portions, respectively, in a plane containing the Y-axis, which corresponds to said decentering direction, and the line normal to said surface.

29. An image pickup apparatus comprising:

an aperture;

an image-forming optical system according to claim 1 or 22 that images a bundle of light rays entering through said aperture; and an image pickup device disposed at or near a position where the bundle of light rays is imaged by said image-forming optical system, wherein said image-forming optical system has at least one reflecting surface of a non-rotationally symmetric surface configuration having no axis of rotational symmetry into or out of the surface, wherein a light ray emanating from a center of an object and passing through a center of said aperture to reach a center of said image pickup device is defined as an axial principal ray, and a Z-axis is taken in a direction of the axial principal ray emanating from the center of said object and reaching the center of said aperture, and further a Y-axis is taken in a direction perpendicular to said Z-axis in a plane containing a folded line segment along which said axial principal ray is reflected by said at least one reflecting surface, and further an X-axis is taken in a direction perpendicular to both said Z-axis and said Y-axes, said at least one reflecting surface of said image-forming optical system satisfies the following condition:

$$-0.1 < CXn6M < 0 \text{ (1/millimeter)} \qquad (15\text{-}1)$$

where CXn6M denotes each value of differences CX3−CX1, and CX6−CX4 with a Y-axis direction defined as a vertical direction, a principal ray in a field angle direction corresponding to a center of an upper edge of an image field is defined as ①; a principal ray in a field angle direction corresponding to an upper-right corner of the image field is defined as ④; a principal ray in a field angle direction corresponding to a center of a right-hand edge of the image field is defined as ⑤; a principal ray in a field angle direction corresponding to a lower-right corner of the image field is defined as ⑥; and a principal ray in a field angle direction corresponding to a center of a lower edge of the image field is defined as ③, and CX1 to CX6 denote curvatures of an equation defining the configuration of said reflecting surface in a plane containing the X-axis, which corresponds to a direction perpendicular to a decentering direction of said surface, and a line normal to said surface at portions where said rays ① to ⑥ intersect said reflecting surface, respectively, and CY1 to CY6 denote curvatures of said equation at said portions, respectively, in a plane containing the Y-axis, which corresponds to said decentering direction, and the line normal to said surface.

30. An image pickup apparatus comprising:

an aperture;

an image-forming optical system according to claim 1 or 22 that images a bundle of light rays entering through said aperture; and an image pickup device disposed at or near a position where the bundle of light rays is imaged by said image-forming optical system, wherein said image-forming optical system has at least one reflecting surface of a non-rotationally symmetric surface configuration having no axis of rotational symmetry into or out of the surface, wherein a light ray emanating from a center of an object and passing through a center of said aperture to reach a center of said image pickup device is defined as an axial principal ray, and a Z-axis is taken in a direction of the axial principal ray emanating from the center of said object and reaching the center of said aperture, and further a Y-axis is taken in a direction perpendicular to said Z-axis in a plane containing a folded line segment along which said axial principal ray is reflected by said at least one reflecting surface, and further an X-axis is taken in a direction perpendicular to both said Z-axis and said Y-axis, said at least one reflecting surface of said image-forming optical system satisfies the following condition:

$$-0.1 < CYn6M < 0 \text{ (1/millimeter)} \qquad (16\text{-}1)$$

where CYn6M denotes each value of differences CY3−CY1, and CY6−CY4, with a Y-axis direction defined as a vertical direction, a principal ray in a field angle direction corresponding to a center of an upper edge of an image field is defined as ①; a principal ray in a field angle direction corresponding to an upper-right corner of the image field is defined as ④; a principal ray in a field angle direction corresponding to a center of a right-hand edge of the image field is defined as ⑤; a principal ray in a field angle direction corresponding to a lower-right corner of the image field is defined as ⑥; and a principal ray in a field angle direction corresponding to a center of a lower edge of the image field is defined as ③, and CX1 to CX6 denote curvatures of an equation defining the configuration of said reflecting surface in a plane containing the X-axis, which corresponds to a direction perpendicular to a decentering direction of said surface, and a line normal to said surface at portions where said rays ① to ⑥ intersect said reflecting surface, respectively, and CY1 to CY6 denote curvatures of said equation at said portions, respectively, in a plane containing the Y-axis, which corresponds to said decentering direction, and the line normal to said surface.

31. An image pickup apparatus comprising:

an aperture;

an image-forming optical system according to claim 1 or 22 that images a bundle of light rays entering through said aperture; and an image pickup device disposed at or near a position where the bundle of light rays is imaged by said image-forming optical system, wherein said image-forming optical system has at least one reflecting surface of a non-rotationally symmetric surface configuration having no axis of rotational symmetry into or out of the surface, wherein a light ray emanating from a center of an object and passing through a center of said aperture to reach a center of said image pickup device is defined as an axial principal ray, and a Z-axis is taken in a direction of the axial principal ray emanating from the center of said object and reaching the center of said aperture, and further a Y-axis is taken in a direction perpendicular to said Z-axis in a plane containing a folded line segment along which said axial principal ray is reflected by said at least one reflecting surface, and further an X-axis is taken in a direction perpendicular to both said Z-axis and said Y-axis, two reflecting surfaces in said image-forming optical system satisfy the following condition:

$$0<CXab \tag{17-1}$$

where CXab denotes CX2a/CX2b, with a Y-axis direction defined as a vertical direction, CX2a denotes a curvature of an equation defining a configuration of one of said two reflecting surfaces that is closer to an aperture side than the other in a plane containing the X-axis, which corresponds to a direction perpendicular to a decentering direction of the surface, and a line normal to said surface at a portion where said axial principal ray intersects said surface, and CX2b denotes a curvature of an equation defining a configuration of the other of said two reflecting surfaces in a plane containing said X-axis and a line normal to the surface at a portion where said axial principal ray intersects said surface.

32. An image pickup apparatus comprising:

an aperture;

an image-forming optical system according to claim 1 or 22 that images a bundle of light rays entering through said aperture; and an image pickup device disposed at or near a position where the bundle of light rays is imaged by said image-forming optical system, wherein said image-forming optical system has at least one reflecting surface of a non-rotationally symmetric surface configuration having no axis of rotational symmetry into or out of the surface, wherein a light ray emanating from a center of an object and passing through a center of said aperture to reach a center of said image pickup device is defined as an axial principal ray, and a Z-axis is taken in a direction of the axial principal ray emanating from the center of said object and reaching the center of said aperture, and further a Y-axis is taken in a direction perpendicular to said Z-axis in a plane containing a folded line segment along which said axial principal ray is reflected by said at least one reflecting surface, and further an X-axis is taken in a direction perpendicular to both said Z-axis and said Y-axis, two reflecting surfaces in said image-forming optical system satisfy the following condition:

$$0<CYab \tag{18-1}$$

where CYab denotes CY2a/CY2b, with a Y-axis direction defined as a vertical direction, CY2a denotes a curvature of an equation defining a configuration of one of said two reflecting surfaces that is closer to an aperture side than the other in a plane containing the Y-axis, which corresponds to a decentering direction of the surface, and a line normal to said surface at a portion where said axial principal ray intersects said surface, and CY2b denotes a curvature of an equation defining a configuration of the other of said two reflecting surfaces in a plane containing said Y-axis and a line normal to the surface at a portion where said axial principal ray intersects said surface.

33. An image-forming optical system according to claim 22, wherein said prism member comprises:

an entrance surface through which a light beam enters said prism member;

a first reflecting surface;

a second reflecting surface; and an exit surface, wherein an optical path connecting said entrance surface and said first reflecting surface intersects an optical path connecting said second reflecting surface and said exit surface.

34. An electronic camera apparatus comprising:

an image-forming optical system having at least a decentered optical system to image light from an object on a surface of an image pickup device, said image-forming optical system including at least one reflecting surface having a reflecting action, said reflecting surface being a plane-symmetry three-dimensional surface which has no axis of rotational symmetry in nor out of the surface and which has only one plane of symmetry;

an electronic image pickup device for receiving an image formed by said image-forming optical system; and a recording medium accommodated in said apparatus to record information concerning the image received by said electronic image pickup device.

35. An electronic camera according to claim 34, wherein said recording medium is adapted to be removed from said camera.

36. An electronic image pickup apparatus comprising:

an image-forming optical system having at least a decentered optical system to image light from an object on a surface of an image pickup device, said image-forming optical system including at least one reflecting surface having a reflecting action, said reflecting surface being a plane-symmetry three-dimensional surface which has no axis of rotational symmetry in nor out of the surface and which has only one plane of symmetry;

an electronic image pickup device for receiving an image formed by said image forming optical system; and a board for integrally mounting said electronic image pickup device and other electric components as one unit.

* * * * *